United States Patent
Lansberry

(12) 
(10) Patent No.: US 6,220,377 B1
(45) Date of Patent: Apr. 24, 2001

(54) LOAD SUPPORT SHIFTING VEHICLE

(75) Inventor: John B. Lansberry, Woodland, PA (US)

(73) Assignee: Lansberry Tractor Company, Inc.

( * ) Notice: Subject to any disclaimer, the term of this patent is extended or adjusted under 35 U.S.C. 154(b) by 0 days.

(21) Appl. No.: 09/524,533

(22) Filed: Mar. 13, 2000

Related U.S. Application Data

(63) Continuation of application No. 09/292,673, filed on Apr. 16, 1999, now Pat. No. 6,044,921.
(60) Provisional application No. 60/082,184, filed on Apr. 17, 1998.

(51) Int. Cl.$^7$ .................................................. B62D 55/02
(52) U.S. Cl. ........................ 180/9.36; 180/9.38; 180/6.48
(58) Field of Search .................................... 180/6.2, 6.48, 180/6.62, 6.7, 9.1, 9.23, 9.38, 9.36, 16, 209, 9.48; 280/6.153, 6.15, 6.157, 43, 43.23, 43.17, 98; 301/128

(56) References Cited

U.S. PATENT DOCUMENTS

| | | |
|---|---|---|
| 1,287,261 | 12/1918 | Domer . |
| 1,292,047 | 1/1919 | Rackstraw . |
| 1,298,127 | 3/1919 | Wagenhals . |
| 1,324,974 | 12/1919 | Miller . |
| 1,366,413 | 1/1921 | Olin . |
| 2,161,760 | 6/1939 | Hacker . |
| 2,541,943 | 2/1951 | Sherman et al. . |
| 2,572,399 | 10/1951 | Sklovsky et al. . |
| 2,650,104 | 8/1953 | Grace ................................... 180/9.48 |
| 3,710,882 | 1/1973 | Marceau . |
| 3,812,926 | 5/1974 | Tidwell . |
| 3,840,084 | 10/1974 | Mantha . |
| 4,039,094 | 8/1977 | Grove ................................... 214/132 |
| 4,370,899 | 2/1983 | Swartout . |
| 4,865,142 | 9/1989 | Roy . |
| 4,888,949 | 12/1989 | Rogers . |

(List continued on next page.)

FOREIGN PATENT DOCUMENTS

| | | |
|---|---|---|
| 422842 | 3/1924 | (DE) . |
| 627092 | 3/1933 | (DE) . |
| 1 192 931 | 1/1959 | (DE) . |
| 0 165 062 | 12/1985 | (EP) . |
| 355553 | 8/1931 | (GB) . |
| 97/29006 | 8/1997 | (WO) . |

*Primary Examiner*—Paul N. Dickson
*Assistant Examiner*—Avraham H. Lerner
(74) *Attorney, Agent, or Firm*—Pillsbury Winthrop LLP

(57) ABSTRACT

A vehicle with a driving track assembly and a pair of secondary driving and steering assemblies disposed on opposing lateral sides of the track. Each secondary driving and steering structure includes a ground engaging driving and steering structure that is preferably a ground engaging wheel. The driving track assembly includes an endless ground engaging track that drives the vehicle. The flanking driving and steering structures also engage the ground and are rotated to impart force to the vehicle. A steering device is operatively connected to the secondary driving and steering assemblies. the steering device control operation of the secondary driving and steering assemblies so as to affect a vehicle steering operation wherein the ground engaging driving and steering structures are operated to turn said vehicle with respect to said vehicle driving and steering direction. Preferably, the force imparted to the vehicle by one of said ground engaging driving and steering structures is greater than the force imparted to the vehicle by the other of the ground engaging driving and steering structures, thereby causing the vehicle to turn with respect to the vehicle driving and steering direction. Preferably, the steering device control is operable to transfer a substantial portion of the load support from the central driving track assembly during straight ahead movement onto the secondary driving and steering assemblies during turning movements.

41 Claims, 30 Drawing Sheets

U.S. PATENT DOCUMENTS

| | | | |
|---|---|---|---|
| 4,914,592 | 4/1990 | Callahan et al. | 180/6.48 |
| 4,951,767 | 8/1990 | Keagbine | 180/6.153 |
| 5,121,808 | 6/1992 | Visentini et al. | 280/638 |
| 5,124,605 | 6/1992 | Bitterly et al. . | |
| 5,268,608 | 12/1993 | Bitterly et al. . | |
| 5,464,243 | 11/1995 | Maiwald et al. | 280/638 |
| 5,535,840 | 7/1996 | Ishino et al. | 180/6.44 |
| 5,614,777 | 3/1997 | Bitterly et al. . | |
| 5,615,748 | 4/1997 | Lansberry . | |

LOAD SUPPORT SHIFTING VEHICLE

The present application claims priority from and is a continuation application of Lansberry, U.S. patent application Ser. No. 09/292,673, filed Apr. 14, 1999, now U.S. Pat. No. 6,044,921, and also claims priority to Lansberry U.S. Provisional Patent Appln. Ser. No. 60/082,184, filed Apr. 17, 1998, the entirety of each of which are hereby incorporated into the present application by reference.

The present application claims priority to U.S. Provisional Application of Lansberry, Ser. No. 60/082,184, filed Apr. 17, 1998, the entirety of which is hereby incorporated into the present application by reference.

FIELD OF THE INVENTION

The present invention relates to vehicles and, more particularly, to a vehicle for use on a wide range of terrain, including uneven and/or steep terrain having a variety of soil conditions. The vehicle of the present invention offers many advantages over conventional vehicles and can replace conventional vehicles in performing a variety of tasks.

BACKGROUND AND SUMMARY OF THE INVENTION

Most conventional vehicles such as loaders or bulldozers are either driven by four wheels or by two tracks. Typical track-propelled vehicles employ a pair of spaced steel or rubber endless tracks that are driven to move the vehicle over the ground. Vehicles that are solely wheel-propelled typically include a pair of front wheels and a pair of rear wheels that are rotatably driven to propel the vehicle. The wheels of the wheel-propelled vehicles are generally large and have tread designs that aid in moving the vehicle over sand, clay and mud. These conventional vehicles, although capable of moving over terrain having a variety of soil conditions, frequently become stuck because all of the tractional forces and propelling surfaces are not always put to the ground.

Conventional four wheel vehicles and conventional two track vehicles often cause environmental damage when used in natural areas. Recently, environmental concerns have been raised about the disruption of the topsoil which occurs when conventional loader/bulldozer-type vehicles are operated on the topsoil, sand or other soft terrain of sensitive natural areas. For example, in the tree harvesting industry, construction industry and/or the agricultural industry, the operation of conventional vehicles of the type described may cause significant damage to the topsoil, which in turn may result in the formation of ruts which may lead to soil erosion.

U.S. Pat. No. 5,615,748 discloses a vehicle that has a central track and a pair of flanking wheels disposed on opposing sides of the track. The flanking wheels are mounted for pivotal movement about a pair of generally vertically extending axes.

As discussed above, the advantage of a two-track tractor vehicle over a four-wheeled tractor vehicle is its traction and stability. On the other hand, the advantage of a four-wheel tractor vehicle over a two-track tractor vehicle is in its ease of handling and maneuverability.

To a considerable extent, the tractor vehicle of my '748 patent achieves the advantages of both two track and four wheeled tractor vehicles. This is because it provides a central track for traction and stability and two outrigger wheels for ease of handling and maneuverability.

The outrigger wheels of my '748 tractor vehicle were steerable wheels of the type having an upright steering axis and a steering mechanism capable of turning both wheels generally in unison about their steering axes to effect turning movement.

It has been found that enhanced ease of handling and maneuverability can be achieved by utilizing outrigger wheels which are steered by changing the relative driving speed between the two outrigger wheels rather than by moving them in unison about upright steering axes. Further enhancement can be obtained by mounting the outrigger wheels for vertical movement and utilizing hydraulic cylinders and a control system therefor to maintain them in ground contact.

It has also been understood that the '748 tractor vehicle enhanced as aforesaid because it includes a central track and two outrigger wheels is uniquely set up to enable a substantial portion of the load support to be shifted between the central track and the outrigger wheels. For example, if the hydraulic cylinders which keep the outrigger wheels in ground contact are adjusted so that a substantially low pressure condition exists, the central track will support most of the vehicle load on the ground. As the pressure conditions in the hydraulic cylinders are increased, more and more load will be assumed by the outrigger wheels. This substantial shift in load support occurs without any shifting of the load itself or any tilting of the frame. In contrast, the only way load support can be shifted between the two tracks of a two-track tractor or the four wheels of a four-wheel tractor is to shift the load itself or tilt the frame. It has been found this unique load support shifting capability made possible by the use of hydraulic cylinders to keep the independently driving outrigger wheels on opposite sides of the central track in ground contact, enables traction and stability to be enhanced while at the same time further enhancing the ease of handling and maneuverability of the tractor vehicle.

In accordance with the principles of the present invention, the advantages discussed above are achieved by providing a vehicle comprising a main frame; an engine assembly constructed and arranged to generate power; and a driving track assembly supporting the main frame. The driving track assembly includes an endless ground engaging track. The driving track assembly is connected to the engine assembly in power supplying relation and is constructed and arranged to move the track in driving engagement with the ground using power from the engine assembly so as to move the vehicle along the ground. A pair of secondary driving and steering assemblies are mounted on opposing lateral sides of the track assembly in flanking relation. The secondary driving and steering assemblies each include a ground engaging driving and steering structure. The ground engaging driving and steering structures and the track assembly are mounted within the vehicle so as to enable the track assembly and the driving and steering structures to be moved generally vertically relative to one another to shift a distribution of vehicle weight between the driving and steering structures and the track. In the illustrated embodiments, the ground engaging driving and steering structures are moved downwardly relative to the driving track assembly, but the scope of this aspect of the invention is not limited in such a manner. The secondary driving and steering assemblies are operatively connected to the engine assembly in power supplying relation and are constructed and arranged to move the ground engaging driving and steering structures in driving engagement with the ground using power from the engine assembly so as to assist the track assembly in moving the vehicle along the ground.

The vehicle of this aspect of the invention further comprises power-operated structure operatively connected to the engine assembly in power supplying relation. The power-operated structure is constructed and arranged to affect the generally vertical relative movement between the driving and steering structures and the track assembly using power from the engine assembly to shift the distribution of the vehicle weight. An electronic controller is communicated to the power-operated structure and each of the secondary driving and steering assemblies. A steering input device is communicated to the electronic controller. The steering input device is operable to transmit a steering signal to the controller indicative of a selected angle at which the vehicle is to be steered. The controller is operable to process the steering input signal and responsively control the secondary driving and steering assemblies and the power-operated structure to affect a vehicle steering operation wherein (1) the power-operated structure affects the generally vertical relative movement between the track assembly and the driving and steering structures so as to shift the distribution of vehicle weight from the track to the driving and steering structures, thereby providing the driving and steering structures with increased traction during movement thereof in driving engagement with the ground, and (2) the secondary driving assemblies move the driving and steering structures in driving engagement with the ground to thereby steer the vehicle at the selected angle. In the preferred embodiment, the steering is affected by as a result of the movement imparted to the vehicle by one of the driving and steering structures being different than the movement imparted to the vehicle by the other of the driving and steering structures to thereby turn the vehicle at the selected angle; however, in the broadest aspects of the invention, steering may be affected by pivoting the driving and steering structures about generally vertical axes.

A more preferred aspect of my invention provides a vehicle comprising a main frame; a driving track assembly mounted in supporting relation to the main frame, and a pair of secondary driving and steering assemblies mounted on opposing lateral sides of the track assembly in flanking relation. The driving track assembly includes an endless ground engaging track that extends in a vehicle driving direction and a track operating motor constructed and arranged to move the track in driving relation to the ground. Each of the secondary driving and steering assemblies comprises a vertically movable mounting structure constructed and arranged to be moved in a generally vertical direction relative to the main frame independently of the mounting structure of the other secondary driving and steering assembly; a ground engaging structure movable in driving and steering relation to the ground mounted on the mounting structure such that movement of the mounting structure in the generally vertical direction moves the ground engaging structure generally vertically relative to the main frame; a secondary operating motor mounted to the mounting structure for generally vertical movement therewith, the secondary operating motor being constructed and arranged to move the ground engaging structure in driving and steering relation to the ground; and a power-operated mounting structure mover constructed and arranged to move the mounting structure in the generally vertical direction so as to move the ground engaging structure thereon generally vertically to vary an amount of ground bearing pressure the ground engaging structure applies to the ground.

An engine assembly is constructed and arranged to supply power to each of (1) the track operating motor of the track assembly, (2) the secondary operating motors of the secondary driving and steering assemblies, and (3) the mounting structure movers of the secondary driving and steering assemblies. An electronic controller is operable to control (1) an amount of power supplied from the engine assembly to the track operating motor, (2) an amount of power supplied from the engine assembly to one of the secondary operating motors, (3) an amount of power supplied from the engine assembly to the other of the secondary operating motors, (4) an amount of power supplied from the engine assembly to one of the mounting structure movers, and (5) an amount of power supplied from the engine assembly to the other of the mounting structure movers. The controller is operable to receive speed signals indicative of a selected speed at which the vehicle is to be driven and responsively control the amount of power supplied from the engine assembly to the track operating motor of the driving track assembly and the secondary operating motors so as to move the vehicle at the selected speed during the vehicle driving operation.

A steering input device is communicated to the electronic controller. The steering input device is operable to transmit a steering signal to the controller indicative of a selected angle at which the vehicle is to be turned. The controller is operable to process the steering input signal and responsively control (1) the respective amounts of power supplied from the engine assembly to the secondary operating motors so as to affect a vehicle steering operation wherein the movement imparted to the vehicle by one of the ground engaging structures is different than the movement imparted to the vehicle by the other of the ground engaging structures to thereby turn the vehicle at the selected angle, and (2) the respective amounts of power supplied from the engine assembly to the mounting structure movers so as to affect a ground pressure varying operation wherein the ground bearing pressure applied by and the load support carried by the ground engaging structures is increased during the vehicle steering operation to thereby decrease the ground bearing pressure applied by and the load support carried by the track assembly.

Other objects, features, and advantages of the present invention will become apparent from the following detailed description, the accompanying drawings, and the appended claims.

DETAILED DESCRIPTION OF THE PREFERRED EMBODIMENTS OF THE INVENTION

Figure 1:
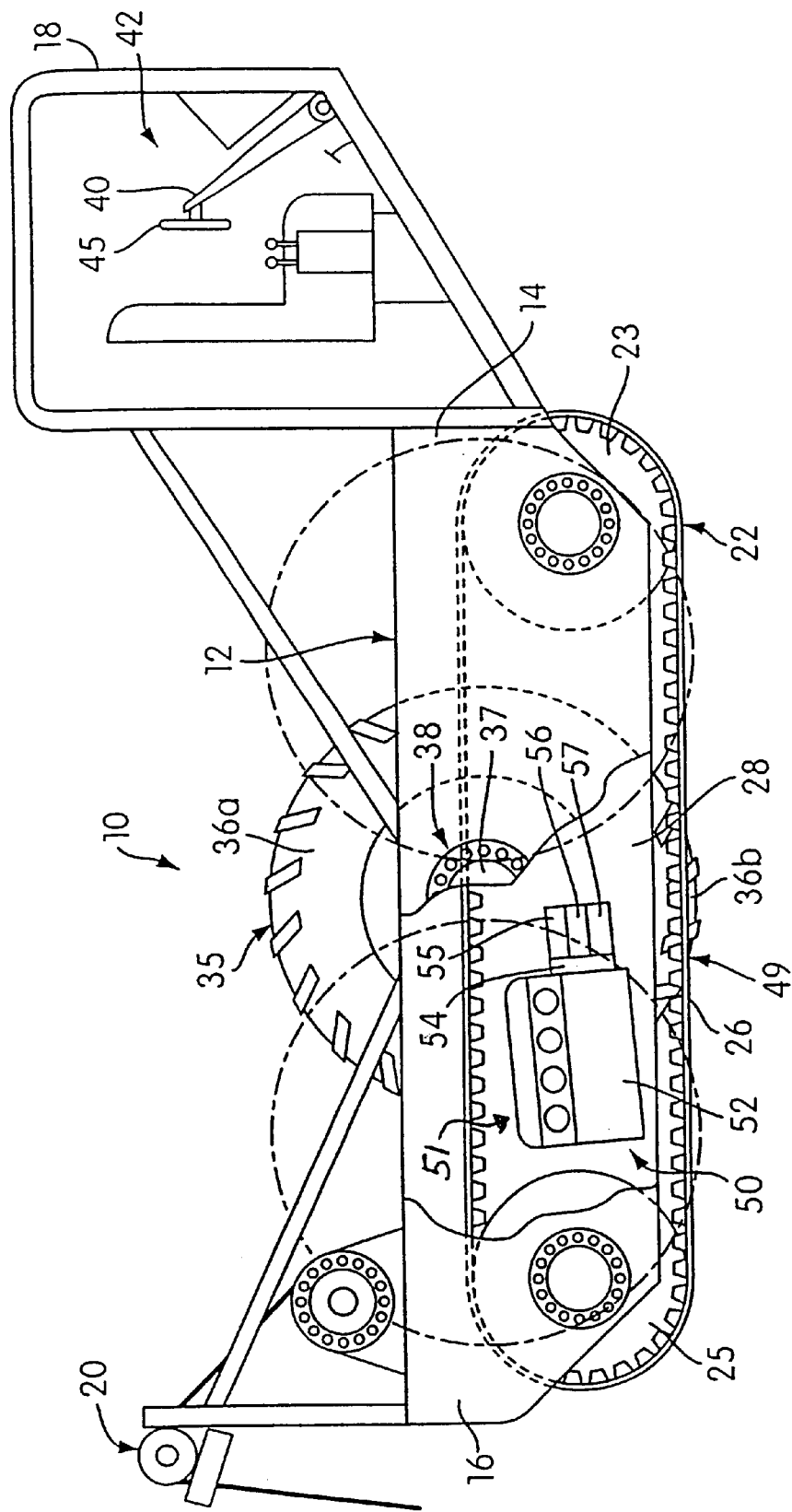
FIG. 1 is a fragmentary schematic side elevational view of a vehicle embodying the principles of the present invention, showing a wheel assembly comprising a central pair of wheels and a side portion of a track assembly in fragmentary view to illustrate a vehicle power source mounted within the track assembly.

Referring to the drawings, a vehicle, generally designated by the reference numeral 10, is shown therein embodying the principles of the present invention. The vehicle 10 includes a main frame structure, generally indicated at 12, in the form of a vehicle chassis, having fore and aft end portions, 14 and 16, respectively. In the illustrated embodiment, an operator compartment 18 is mounted to the fore end portion 14 of the frame structure 12 and a winch assembly, generally indicated at 20, is mounted to the aft end 16.

The vehicle 10 includes a driving track assembly, generally indicated at 22, mounted to the frame structure 12. The driving track assembly 22 may comprise one or more endless track belts. In the illustrated embodiment, the driving track assembly 22 is in the form of a single, centrally mounted track unit having a conventional ground engaging endless track or belt 26 extending in the longitudinal direction. The track assembly 22 may be of conventional configuration, such as the Trackman, manufactured by Goodyear Rubber and Tires may be employed.

Both a two wheel rear drive track assembly and an all wheel drive track assembly are within the scope of the invention. It is preferred that the track assembly be powered and rotated by a conventional lug and sprocket-type arrangement in which a plurality of track wheel sprockets engage lugs on the track or belt. Alternatively, the track assembly may be of the friction-type in which the track wheels of the track assembly frictionally engage the track or belt.

The track 26 may be a rubber track, a steel track or may be constructed using various resilient, elastomeric composite or synthetic materials, but rubber is preferred. The bounds or inner periphery of the track 26 defines an interior space or envelope 28 which will be described below in further detail. The track 26 may have various profiles, as shown by the track assemblies 22, 822, 922, 1022 and 1322 in the exemplary embodiments of the vehicle 10 depicted in FIGS. 1, 27, 30, 31 and 34, respectively.

In the embodiment illustrated in FIG. 1, a plurality of hydraulic motors are included in the vehicle 10, including at least one central hydraulic motor, generally designated MA (shown schematically in FIG. 14), that drives the track 26 of the driving track assembly 22. A single motor MA, for example, can be mechanically coupled to a forward drive wheel 23 of the track assembly 22 or to a rear drive wheel 25 of the track assembly. Likewise, both wheels 23, 25 can be provided with a motor MA for bi-directionally rotating the track 26 with respect to the main frame structure 12. The motor MA is conventional and can represent, for example, a Heavy Duty XL-1120cc radial piston motor, with hub mount, manufactured by Rotary Power. Preferably, however, the motor MA is a closed loop hydraulic motor such as a model MT50 hydraulic motor manufactured by Poclain. This Poclain motor has a 120 cubic inch/revolution displacement and generates a maximum hydraulic pressure of 6500 p.s.i. Each hydraulic motor in the vehicle, including motor MA, can be of the fixed displacement-type and capable of "free wheeling", unpowered operation.

It is within the contemplation of the invention to employ a conventional mechanical transmission to drive the track 26 in lieu of hydraulic power.

FIG. 1 also shows that a pair of secondary driving and steering assemblies, generally designated 35, is mounted centrally on opposing lateral sides of the track assembly 22. The secondary driving and steering assembly 35 is shown in fragmentary view therein to show an internal combustion engine 52 that is described hereinbelow.

Figure 2:
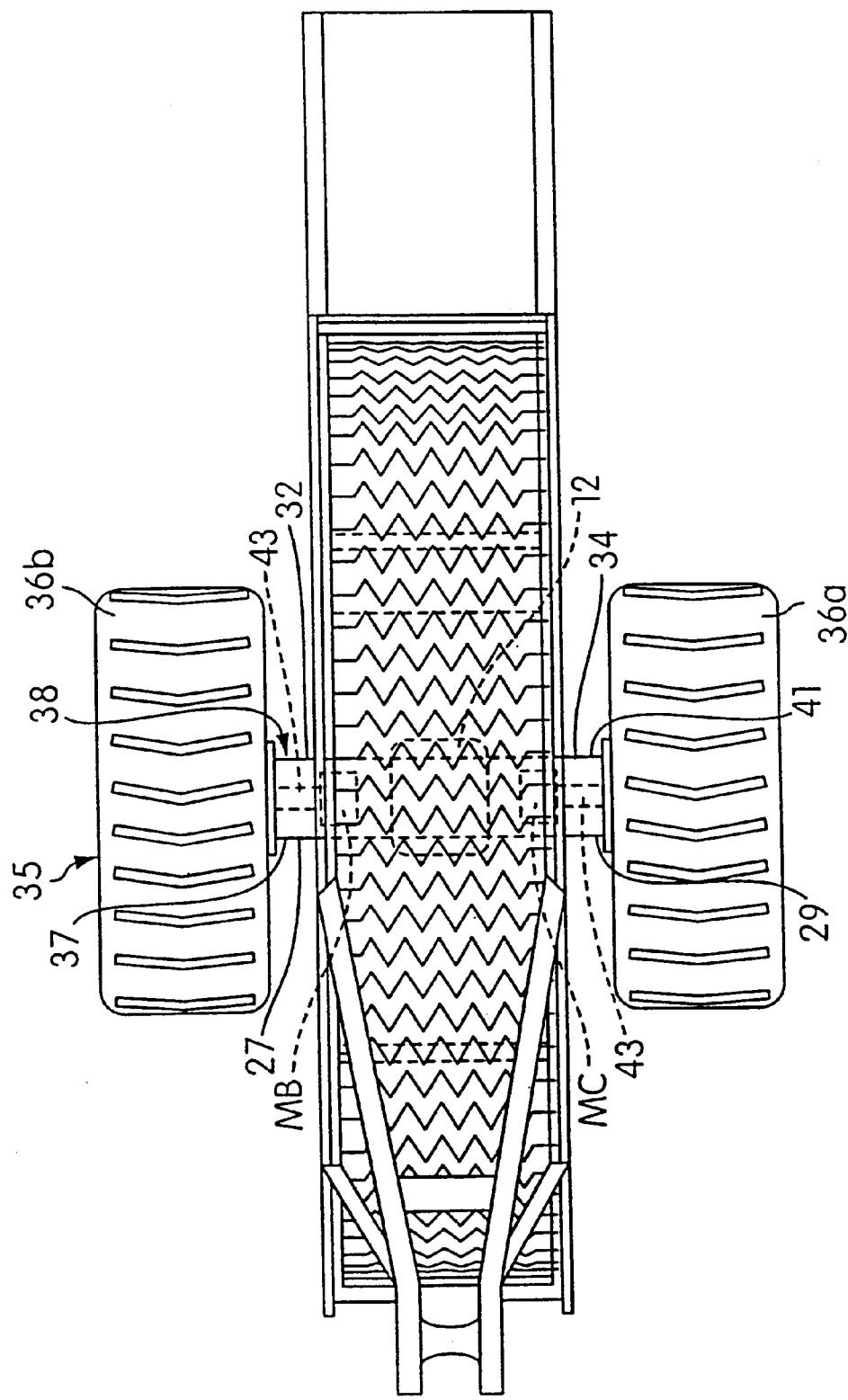
FIG. 2 is schematic top plan view of the vehicle of FIG. 1 showing the pair of wheels of the wheel assembly in flanking relation to the track assembly.
Figure 29:
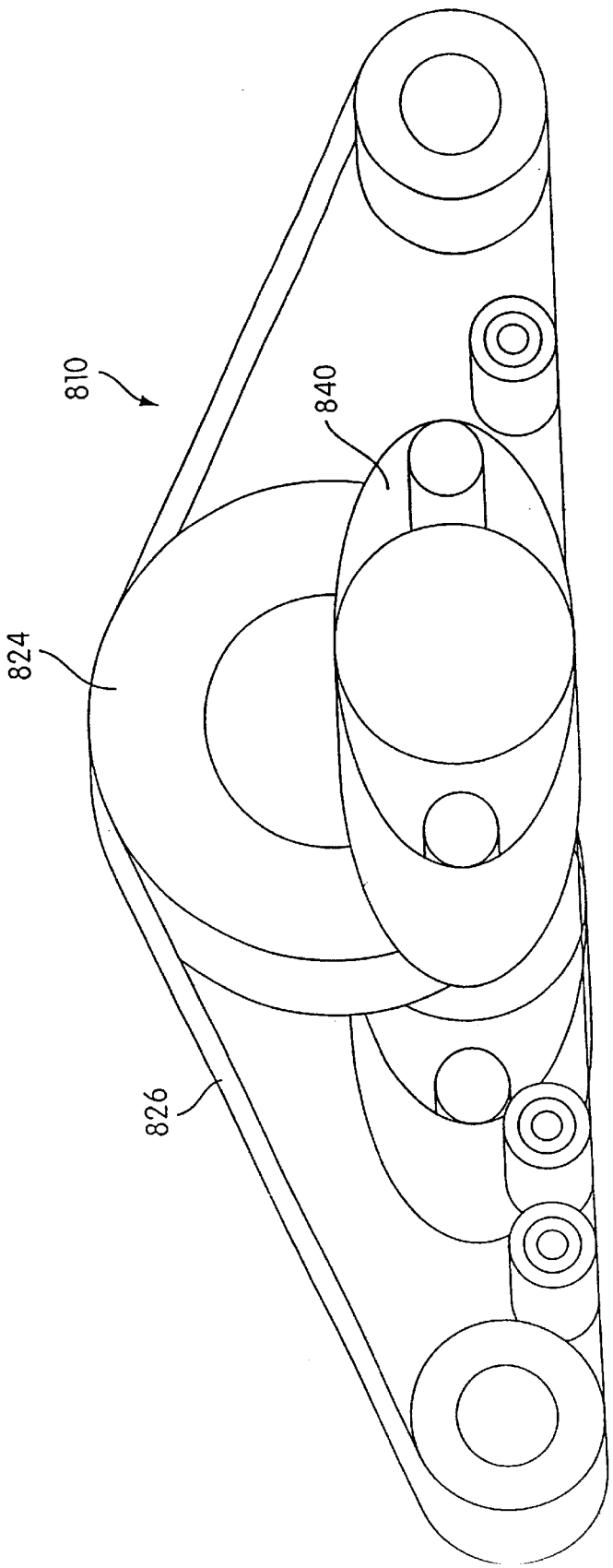
FIG. 29 is a schematic view of the track assembly and a flanking track assembly mounted to a central portion of the track assembly.

FIG. 2 shows a top plan view of the vehicle 10 of FIG. 1. It can be appreciated that each secondary driving and steering assembly 35 includes a ground engaging structure in the form of a rotatable wheel 36a and 36b, respectively. The wheels flank the track assembly 22. Wheels 36a, 36b are the preferred ground engaging structures, although a set of smaller tracks may be used as shown in FIG. 29. The wheels 36 are rotatably mounted on an axle assembly, generally designated 38. The axle assembly 38 is comprised of two axially aligned, independent first and second axle structures, generally designated 32 and 34, respectively. As set forth in detail below, it is contemplated to mount the axle assembly 38 in various ways to the track assembly 22 and in various positions with respect to the track assembly 22, but in the embodiment of the vehicle 10 shown in FIG. 2, axle assembly 38 of the wheel assembly 35 is mounted in fixed relation with respect to and in the general center of the frame structure 12.

The axle assembly 38 has opposing ends 37 and 41, respectively, that are disposed generally transverse to the longitudinal extent of the track 26 extending outside of the envelope 28 and adjacent the track 26. Each axle structure 32, 34 includes an axle housing designated 27 and 29, respectively. It can be appreciated from the phantom representation of a central portion of the axle assembly 38 in FIG. 2 that each axle structure 32, 34 is secured to a central portion of the main frame structure 12 which is also represented in phantom. Each wheel 36 is rotatably coupled to a respective end 37, 41 of the axle assembly 38 and each is provided with a hydraulic motor MB and MC, respectively, each of which is enclosed within a respective housing 27, 29 and engages a hub structure at the free ends 37, 41 of the axle assembly through a half axle drive shaft 43 to affect the independent, bi-directional rotation of each wheel 36.

As shown in the side elevation view of FIG. 1, the wheels 36 are slightly below the ground engagement portion 49 of the track 26 so that each wheel 36 engages the ground surface (not shown) at a position slightly lower than does the track 26. Because of this lower relative positioning, the wheels are deeper in the ground when the vehicle is traveling on a soft surface as, for example, on topsoil or snow, than the track 26. The functional advantage of the deeper positioning of the wheels than the track 26 with respect to the ground surface will become apparent below. It will also be explained below that it is within the scope of the invention to provide each wheel 36 with the ability to be horizontally and/or vertically repositioned with respect to the main frame structure 12. This repositioning of the wheels of the wheel assembly 35 can be effected by a suspension mechanism, a powered mechanism or a combination of both.

The wheels 36 preferably include rubber tires. However, it can be appreciated that steel wheels can also be employed. Thus, it is within the contemplation of the invention to employ a rubber track and rubber tires, or a steel track and steel wheels, or rubber tires and a steel track, or steel wheels and a rubber track. The material used for the track and wheels/tires may be selected based upon the particular vehicle application.

In the illustrated embodiment, a separate and independent hydraulic motor, generally designated MB and MC, respectively, in FIG. 2, is included respectively within each axle structure 32, 34 to power each wheel and to affect its independent, bidirectional rotation. The motors MB, MC are preferably identical and conventional, and each can be, for example, a Series 90 75cc 2-speed motor manufactured by Sauer Sundstrand Company of Ames, Iowa. The motors MB, MC can be variable displacement-type motors and can be operated at either maximum or minimum displacement as determined by the operator. Preferably, each motor MB, MC is a closed loop hydraulic motor, the preferred closed loop motor being a Series 90 hydraulic motor manufactured by the Ross Company. These Ross Series 90 motors have a 17 cubic inch/revolution displacement and generate a maximum fluid pressure of 3000 p.s.i. These motors are currently available from the Surplus Center of Lincoln, Nebr. as item number 9-1894-18.

Although two motors MB, MC are provided in the wheel assembly 35 of the embodiment of the vehicle 10 illustrated in FIGS. 1 and 2, it is within the scope of the invention to provide the appropriate number of hydraulic motor(s) to operate the particular axle assembly selected to affect the independent rotation of each wheel 36.

Although only a single pair of wheels 36 is provided in the illustrated embodiment, it is within the scope of the invention to provide the track assembly 22 with two or more pairs of wheels 36 on separate and operationally independent axle assemblies 38; for example, a front pair of wheels and a rear pair of wheels could be included in such arrangement as to provide both driving and steering functions.

It will also become apparent that it is within the scope of the invention to mount the wheel assembly on the track assembly 22 at the fore and/or aft ends as shown in phantom in FIG. 1.

As will be described hereinbelow, motors MA, MB, MC are powered by a central engine assembly and are generally controlled by a control assembly 42 located in the operator compartment 18. Control of the operation of the vehicle 10, including speed, steering and operation of the winch and other attachments (not shown), is affected through the control assembly 42. The control assembly 42 is in electrical communication with a conventional electronic control module 44 (shown schematically in FIGS. 14–15, but not shown in FIG. 1).

When the operator manipulates the control assembly 42 electronic signals are sent to the control module 44 as inputs. The control module 44, in response, sends command signals to appropriate hardware described herein to control the operation of the hydraulic motors, including motors MA, MB, MC.

As will be discussed below when the operation of the vehicle is considered, the vehicle is turned by rotating the wheels 36 at different rates of rotation by driving motors MB and MC at different rates relative to one another. In order to turn to the right, the left wheel 36b is rotated at a relatively faster rate than the right wheel 36a Likewise, turning to the left is accomplished by rotating the right wheel 36a at a relatively faster rate than the left wheel 36b. This steering is achieved by the manipulation of a steering assembly 40 located in the operator compartment that includes a steering wheel 45 mounted on a steering wheel shaft (not shown).

A rotary potentiometer is connected to the steering wheel shaft to communicate to the control module 44 (shown schematically in FIG. 14) the desired direction and turning radius of a turn. It can be appreciated, therefore, that there is no direct mechanical connection between the wheels 36 of the wheel assembly 35 and the steering wheel shaft. Any conventional rotary potentiometer can be used on the steering wheel to communicate the steering direction and turn radius to the control module. The potentiometer can be, for example, a 50,000 kΩ 0.5% Helipot potentiometer. As will become apparent, when the steering wheel is turned, the potentiometer indicates to the control module 44 the desired direction and magnitude of the turn. The control module 44 sends electrical signals to individual pumps associated with the wheel motors MB, MC that drive the wheels 36a, 36b to cause different wheel rotational speeds in the wheels 36a, 36b. Using an electronic control module like control module 44 to independently control hydraulic motor speed MA, MB, MC is conventional and well known to one skilled in the art.

A power drive structure or engine assembly, generally indicated at 50, is provided for the vehicle 10 and includes the power operated equipment necessary to drive the wheels 36 and the track 26. The engine assembly 50 is best seen in FIG. 1. In the illustrated embodiment, the engine assembly 50 includes a power unit, generally indicated at 51, comprised of an internal combustion engine 52, a pump drive gear box 54 coupled to the engine 52 and a plurality of hydraulic transmission pumps including pumps 55, 56, 57 and 234 (shown schematically in FIGS. 15–16) coupled to the gear box 54. In the embodiment shown in FIGS. 1 and 2, the power unit 51 is mounted within the envelope 28. It is to be understood, however, that this is exemplary only and that it is within the scope of the invention to mount the power unit 51 outside of the envelope 28. The power unit 51 could be mounted, for example above the track assembly 22, behind the track assembly, or in front of the track assembly. It can be appreciated, however, that mounting power unit 51 within the envelope 28 results in the vehicle generally having a lower and more centrally positioned center of gravity. As will be explained, when the power unit 51 is located within the envelope 28 it can be movably mounted for repositioning relative to the main frame structure 12. This movable mounting makes it possible to reposition the center of gravity of the vehicle, which may improve vehicle maneuverability in rugged terrain or may facilitate turning of the vehicle. The wheel assembly can also be movably mounted on the same platform within the envelope 28 as will be considered hereinbelow. When the power unit 51 is mounted outside of the envelope 28, the area within the envelope can be used for other purposes. For example, when the vehicle is used for harvesting crops, the power unit 51 can be mounted outside the envelope and a removable container or hopper can be mounted therein. In this configuration, the power unit 51 may be mounted above the envelope 28 so that the hopper can be mounted therein and a wheeled implement or attachment, such as a mechanical harvesting device, could be attached behind and pulled by the vehicle.

The internal combustion engine 52 drives the hydraulic pumps 55, 56, and 57 that are fluidly connected, respectively, to the track hydraulic motor MA to drive the track 26, and to the two hydraulic motors MB and MC of the axle assembly 38 to drive the wheels 36.

The internal combustion engine 52, the hydraulic pumps 55, 56, 57 and the gear box 54 may be conventional, commercially available parts. The engine 52 may be a conventional Model 4045T PowerTech 4.5L engine manufactured by Deere Power Systems of Waterloo, Iowa. The pump gear box 54 which is mounted to the engine 52 may be a Series 28000 Double 6 inch type, manufactured by Funk Manufacturing Company. The hydraulic pumps may be a Series 90, 4.5 cu in/rev displacement hydrostatic pumps, manufactured by Sauer Sundstrand Company. Each pump 55, 56, 57 is capable of 6500 p.s.i. maximum fluid pressure and each includes an integral charge pump and cross-over relief valves. The gear box 54 is powered by the engine 52 and operates a plurality of pumps, including pumps 55, 56 and 57. As will be explained and as one skilled in the art will understand, the vehicle 10 is driven by the hydrostatic pumps 55, 56, and 57 delivering hydraulic fluid, such as oil, to the motors MA, MB and MC.

As noted above, it can be appreciated that in lieu of or in combination with one or more of the hydrostatic pumps 55, 56 and 57 and the hydraulic motors MA, MB, MC, the power drive structure 50 may include a mechanical mechanism such as a mechanical transmission to facilitate driving the track 26 and/or the wheels 36. Also, it is contemplated that the hydraulic motors MA, MB, and MC may be driven from a single hydrostatic pump.

The axle assembly 38 of the wheel assembly 35 of the embodiment shown in FIGS. 1 and 2 is rigidly secured to the main frame structure 12 of the track assembly 22 and the wheels 36, thereof, are rotatably but non-pivotally attached thereto. It is within the scope of the invention, however, to provide an axle assembly having pivotally attached steerable wheels, to provide a wide range of axle assembly structures and to provide a wide variety of ways of mounting these various axle structures to the main frame structure 12 of the track assembly 22.

An example of the use of an axle assembly with pivotally attached, steerable wheels is disclosed in U.S. Pat. No. 5,615,748, issued Apr. 1, 1997 to the present inventor, which is hereby incorporated into the present application by reference in its entirety. An example of non-pivotally attached, rotatable wheels is shown in FIGS. 1 and 2 herein as noted above.

The axle assemblies contemplated include an axle assembly which has a single drive shaft that extends through the envelope 28 of the track assembly 22 (referred to as a single axle), a pair of half-shaft suspensioned or powered axles (referred to as a half-shaft axles) or a transaxle having two independent drive shafts which are engaged in a well known manner with a central gear box. The gear box allows differential rates of wheel rotation in a known manner.

Each of these axle types can be mounted to the main frame structure 12 of the vehicle 10 with various suspension systems that use, for example, coil springs, leaf springs, fluid filled cylinders or similar spring-like structures to provide improved control when maneuvering the vehicle 10 and improved traction between the wheels and the ground surface. Additionally or alternatively, each of these axle types can be mounted to the main frame structure 12 using various powered supports so that the axle assembly 38 can be repositioned within the envelope 28 to reposition the wheels for various applications of the vehicle 10, examples of which are considered hereinbelow.

Each axle type can, for example, be provided with a vertical axle moving device in the form of a hydraulic mechanism mounted between the axle structure and the main frame structure 12 of the track assembly 22 which hydraulic mechanism, when actuated vertically, repositions the axle structure with respect to the track assembly 22.

The advantages of repositionable wheels can be appreciated from consideration of the functions performed by the wheels 36 of the wheel assembly 35. The wheels generally provide lateral support, steering ability and propulsive force for the vehicle 10. In the illustrated embodiment of FIGS. 1 and 2, the wheels 36 are disposed at a position below the ground surface engagement portion 49 of the track 26 so that the wheels 36 will engage the ground at positions slightly deeper than the engagement portion 49 of the track 26. This lower position improves wheel ground contact and therefore wheel traction and steering.

Wheel contact with the ground, especially on an uneven or soft ground surface, can be improved by providing a suspension system that provides an axle biasing device to bias the axle assembly downwardly toward the ground or by a providing a powered axle moving device to reposition the wheels downwardly toward the ground to maintain ground contact even when the track assembly 22 is at an angle relative to the ground surface or the ground surface is uneven. Because the vehicle 10 frequently operates on uneven terrain or soft ground, it is desirable to provide further embodiments of the vehicle 10 that incorporate secondary driving or wheel assemblies that pivot, wheel assemblies that include suspension systems, secondary driving or wheel assemblies that move with respect to the track assembly 22 or various combinations thereof.

FIGS. 3–11 show exemplary alternative embodiments of some of the axle assemblies and various suspension systems or powered supports that can be used. These embodiments are intended to show some of the axle types, suspension mountings and wheel hub mountings that can be used in a secondary driving assembly, but it is understood by one skilled in the art that all possible combinations taught by these representative embodiments are within the scope of the present invention and are not shown because they are too numerous and would be readily apparent to one skilled in the art from examination of the illustrated embodiments.

Figure 3:
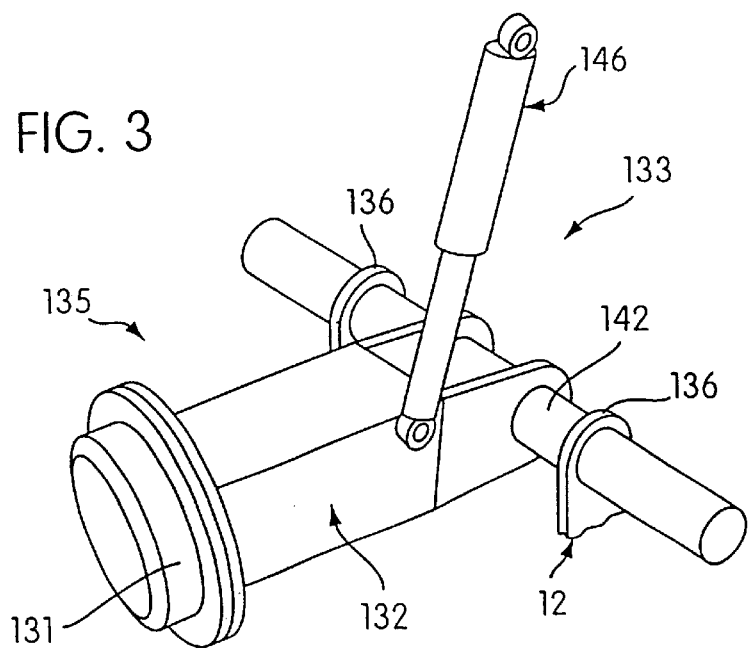
FIG. 3 is a schematic view of a portion of a second embodiment of the wheel assembly showing a half axle thereof pivotally mounted to a main frame structure of the track assembly shown in fragmentary view.

FIG. 3 shows an example of an independent wheel drive system, generally designated 133, that can be used to provide independent powered vertical movement of the wheels of the secondary driving assemblies 135 with respect to the main frame structure 12. The main frame structure is shown in fragmentary view and the tires and rims which are normally mounted on the hubs 131 are not shown in FIG. 3 to more clearly show portions of the system. Although only one axle assembly 132 is shown in FIG. 3, it can be appreciated that each secondary driving assembly 135 includes an axle assembly pivotally mounted to the tractor frame 12. The axle assembly on the opposite side of the track assembly 22 is a mirror image of the axle assembly 132 shown therein.

The axle assembly 132 is pivotally mounted on a rod member 142 that is rigidly mounted between two pivot ear members 136 rigidly attached to the main frame structure 12. A vertical axle moving device in the form of a conventional hydraulic cylinder 146 has a portion pivotally attached to the axle assembly 132 and a portion attached to an upper portion of the main frame structure 12 (not shown in FIG. 3). The hydraulic cylinder 146 is fluidly communicated with an hydraulic pump 234 (shown schematically in FIGS. 15–16) which is operatively connected to the gearbox 54 of the power unit 51. The hydraulic pump supplies pressurized fluid to the cylinder 146 in order to extend the cylinder and pivot the axle assembly 132 about the mounting rod member 142 to lower the vertical position of the wheel 36 associated therewith with respect to the ground engagement portion 49 of the track 26. The cylinder 146 also retracts to raise the wheel 36 associated therewith.

Each axle assembly 132 of the vehicle 10 pivots independently of the other axle assembly 132 (and of the other axle assemblies 132 if more than two are mounted to the track assembly 222). A hydraulic motor such as motor MB or MC is provided within the housing of the axle assembly 132 to independently bi-directionally rotate its associated wheel 36.

It is within the scope of the present invention for the independent hydraulic powered pivoting of each axle structure to be under the control of a human operator of the vehicle 10 or, alternatively, to be controlled by appropriate electrical and logic circuitry which may be included in the vehicle 10 for this purpose to control the pivoting of the wheels automatically in response to, for example, the rotation of the steering wheel 45 to steer the vehicle or a sensing of uneven ground conditions.

Alternatively, the cylinder 146 could be an axle biasing device in the form of a conventional suspension cylinder that provides damping and a spring force directed downwardly on the axle assembly 132 to thereby pivot the associated wheel arcuately downwardly in a biased manner to hold it in contact with the ground on uneven terrain. A plurality of fluids are known to provide damping; typical fluids used in these cylinders include air, inert gasses of various types and viscous liquids such as oil.

Figure 4:
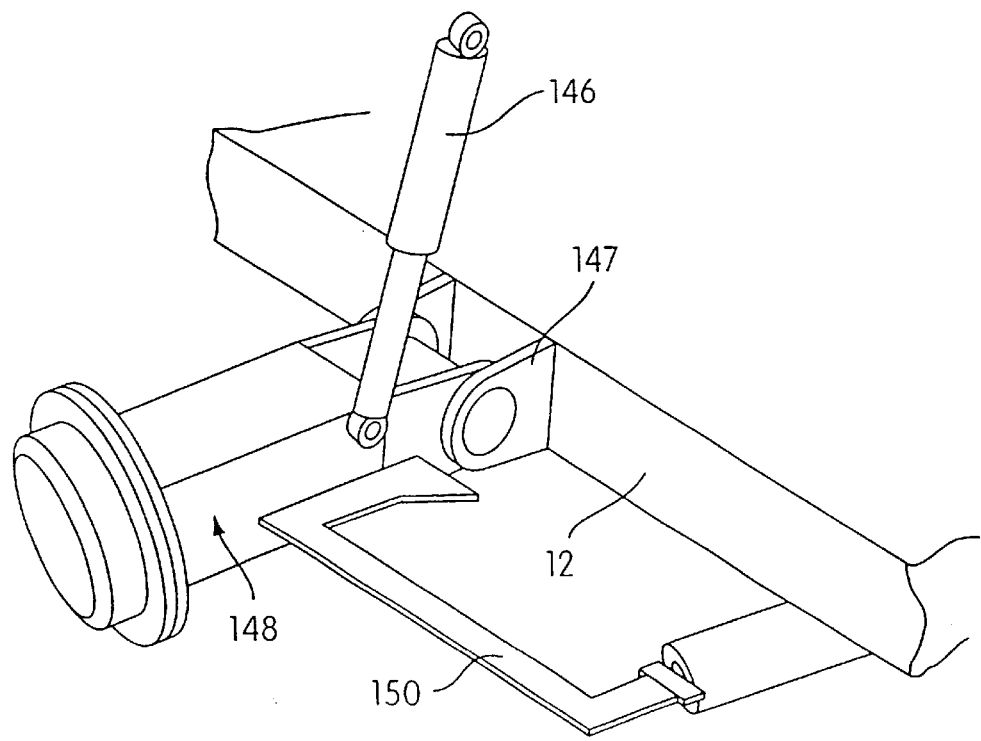
FIG. 4 is a view similar to FIG. 3 showing a half axle of a third embodiment of the wheel assembly pivotally mounted to a main frame structure of the track assembly shown in fragmentary view.

FIG. 4 shows another example of a suspension system for use with a wheel assembly. A first end of an axle assembly 148 is pivotally mounted on pivot ears 147 that are fixedly attached to the main frame structure 12. A vertical axle moving device in the form of a fluid filled cylinder 146, which may be a hydraulically powered cylinder, is connected between the axle assembly 148 and the frame structure 12 in a conventional manner to provide a mechanism for maintaining the wheel (not shown) on a second end of the axle assembly 148 in contact with the ground surface. Alternatively, the cylinder may be a biasing device that biases the wheel into ground engagement.

A suspension arm 150 is mounted between a central portion of the axle structure 148 and an edge portion of the main frame structure 12. The arm 150 is a metal spring structure and provides resilient spring support for the axle structure 148. A drive mechanism (not shown) such as a hydraulic motor MB or MC is mounted within the axle structure 148. This suspension arm 150 and fluid cylinder 146 could also be used with a transaxle on a single axle.

Figure 5:
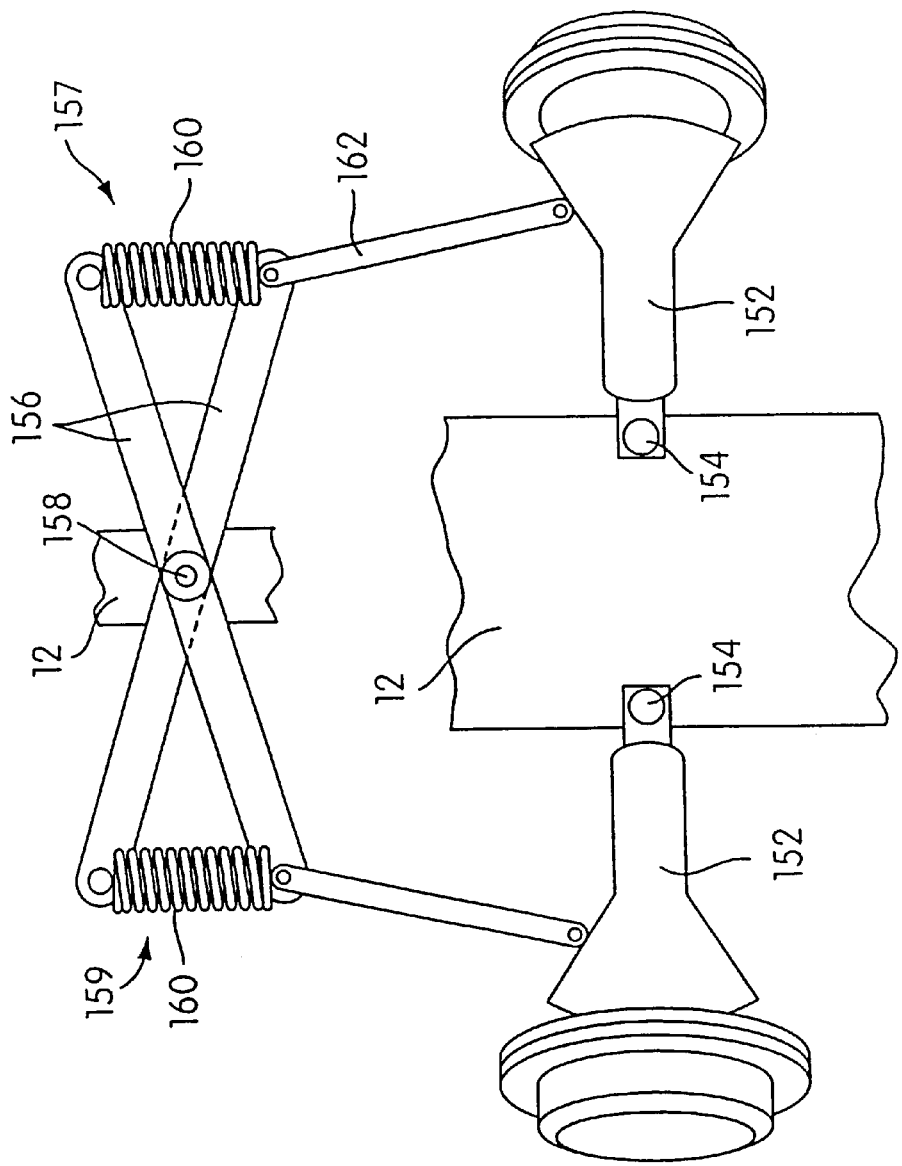
FIG. 5 is a schematic front view of a mechanical linkage suspension system for the wheel assembly mounted to the main frame structure shown in fragmentary view.

FIG. 5 shows a mechanical linkage suspension structure, generally designated 151, for a secondary driving assembly. Two axle assemblies 152 are pivotally mounted by pivot pins 154 to a portion of the frame structure 12 (shown schematically). A central portion of a pair of elongated arms 156 are pivotally secured to the frame structure 12 by a common pin 158 to form a scissors-like support structure 159. Spring or fluid filled damper members 160 are connected across each end of the scissors-like mounting structure 159. A rigid linkage bar member 162 is pivotally mounted between the mounting structure 159 and an adjacent axle structure 152. The bar members 162 cooperate with the mounting structure 159 to transmit the spring force of the springs or dampers 160 to the pivotally mounted axle structures 152. These springs or dampers may also be considered to be axle biasing devices that bias the axle downwardly in to ground contact.

Figure 6:
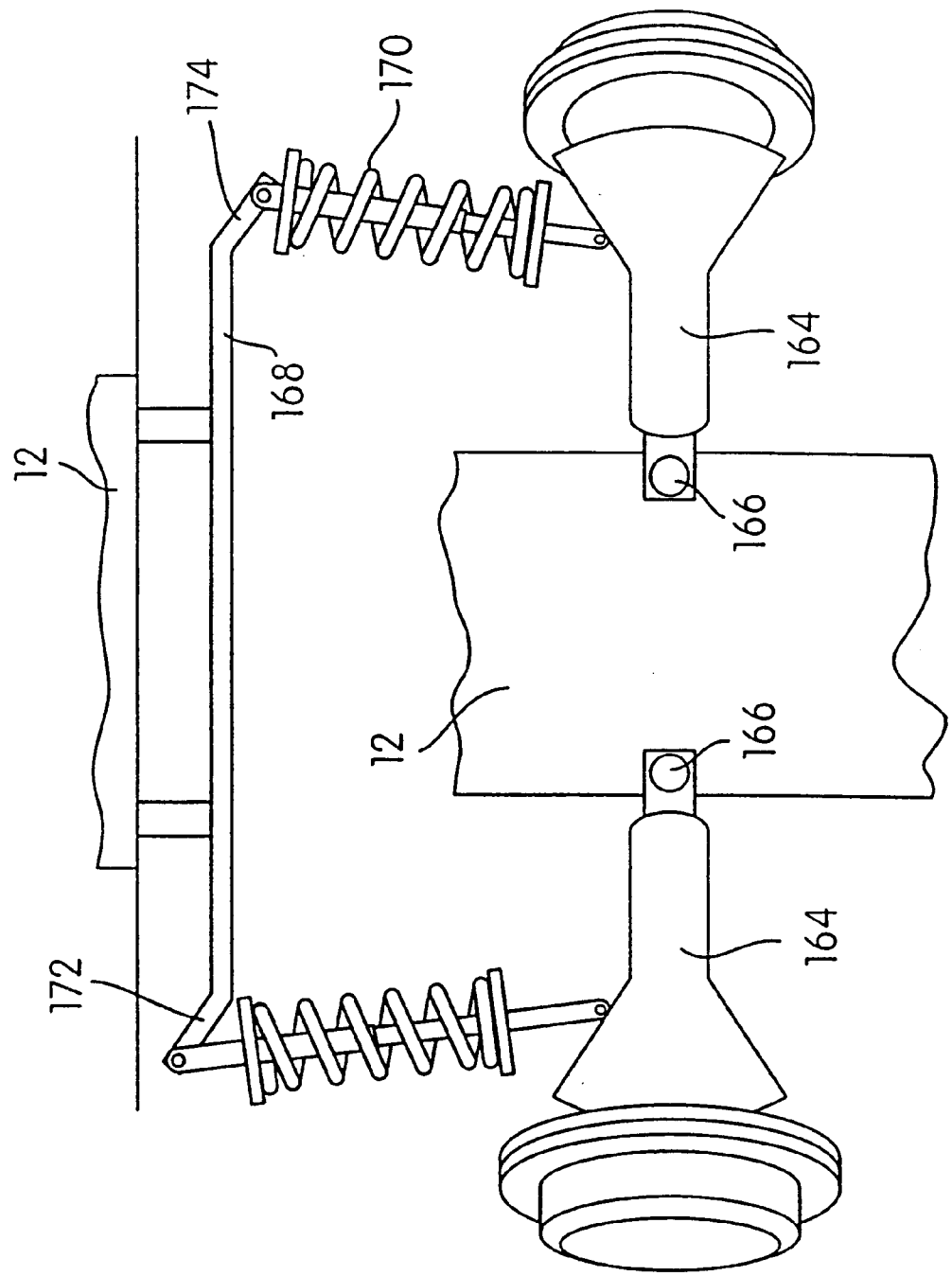
FIG. 6 is a view similar to FIG. 5 showing a torsion bar suspension system for the wheel assembly mounted to the main frame structure shown in fragmentary view.

FIG. 6 illustrates another spring-biased suspension arrangement for a wheel assembly. Axle assemblies 164 are pivotally mounted to the frame structure 12 by pins 166. A resiliently flexible torsion bar assembly 168 mounted to the main frame structure 12 is resiliently attached to the axle assemblies 164 by suspension spring members 170. More specifically, the spring members 170 are attached between, respectively, forwardly and rearwardly extending flange portions 172, 174 of the torsion bar assembly 168 and a portion of the axle structure 164 associated therewith. Again, these suspension spring members may be considered axle biasing devices that bias the axle assemblies downwardly to maintain the wheels in ground contact.

Figure 7:
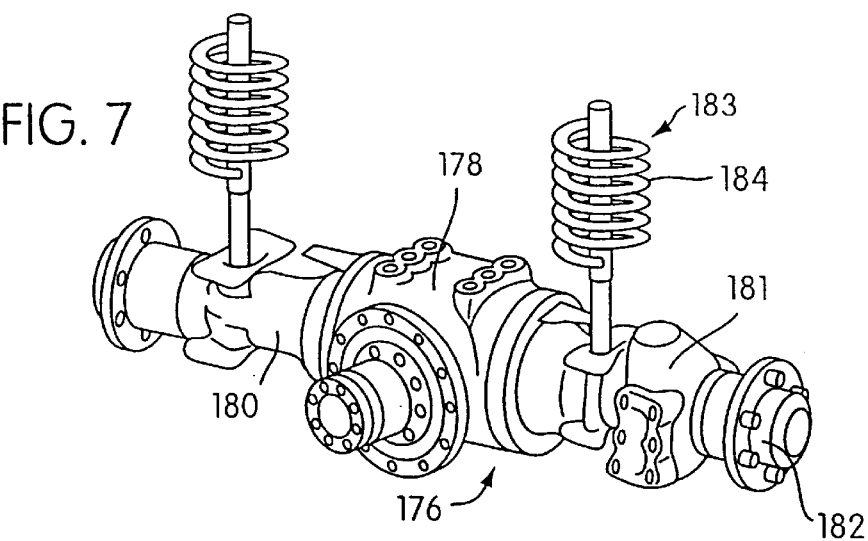
FIG. 7 is an isolated perspective view of a portion of a wheel assembly showing a transaxle thereof and a plurality of coil spring members of a coil spring suspension system mounted thereto.
Figure 8:
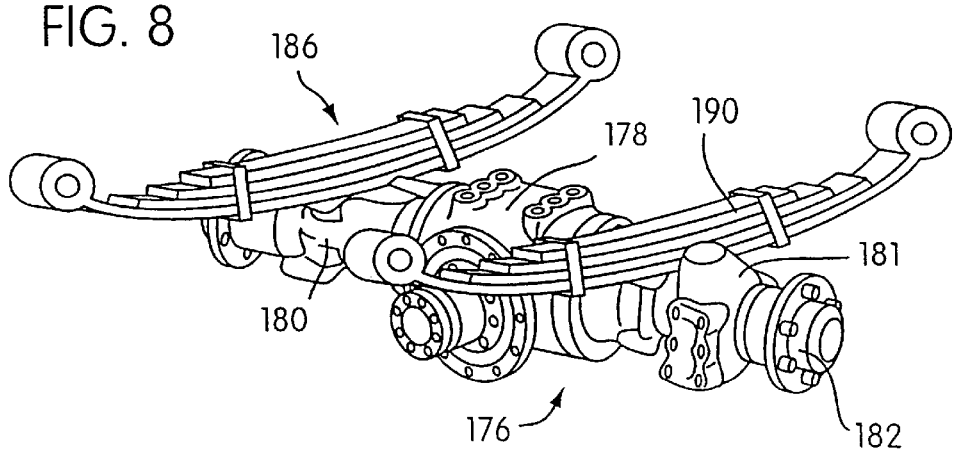
FIG. 8 is a view similar to FIG. 7 showing a plurality of leaf spring members of a leaf spring suspension system mounted to the wheel assembly.
Figure 9:
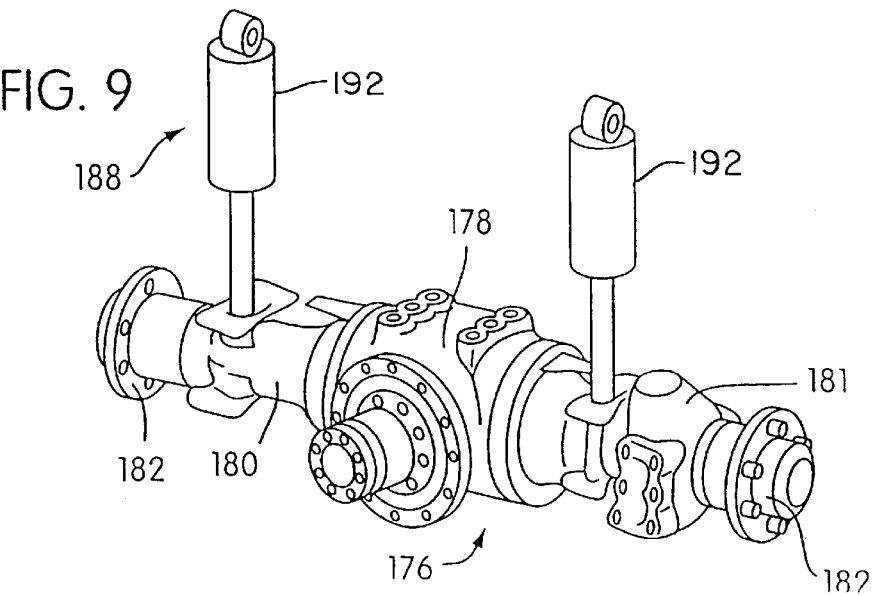
FIG. 9 is a view similar to FIG. 7 showing a plurality of fluid filled cylinders of a suspension system mounted to the wheel assembly.

FIGS. 7–9 show isolated perspective views of three suspension systems that can be included in a transaxle-type axle assembly, generally designated at 176. The tires and rims are not shown in these figures to more clearly illustrate the axle assembly 176. Many conventional, commercially available transaxles can be used in the vehicle and examples of specific embodiments are cited hereinbelow. The transaxles and suspension systems associated therewith shown in FIGS. 7–9 can be constructed entirely from conventional, commercially available parts. Each axle assembly 176 includes a conventional central differential structure 178, two transversely extending conventional axle structures 180, 181 mounted thereto and two conventional hub structures 182 mounted to the free ends of the axle structures 180, 181. The axle assembly shown in FIGS. 7–9 can be, for example, a drive axle with non-pivoting steering wheels such as any of axle models 12D0736, 12D0840, 14D1550, 14D1139, 14D1441, 15D1441, 15D1841, 1632149, 19D2746, 21D3747, 21D4354, 21D5073, 25D6847 or 25D7060 manufactured by Clark Components International, a Business Unit of Clark Equipment Company, of Statesville, N.C. or, alternatively, a pivotally steering drive axle such as any of axle models 12S0738, 12S0840, 14S1035, 14S1139, 14S1441, 16S2149, 16S1841, 16F1841, 16F1937 also manufactured by Clark Components International. Each Clark axle listed above can be provided with two hydraulic motors, such as MB and MC, in a conventional manner to independently power each wheel 36a, 36b. Other commercially available transaxles that are contemplated include Series 70 Transaxles manufactured by the Sauer Sundstrand Company, specifically Sauer Sunstrand Model 310-0750 or Model 210-2510L. Axles manufactured by Fluidrive, Inc. can also be used.

FIG. 7 shows a coil spring suspension system, generally designated 183, in isolation that can be used with the axle assembly 176. The coil spring suspension system 183 includes a plurality of coil spring members 184, which can be conventional coil springs, mounted on a portion of the axle assembly 176. These coil springs 184 bias the axle assembly 176 downwardly so as to maintain the wheels in ground contact and thus may be considered axle biasing devices. It can be appreciated that the free end of each spring member 184 is mounted to the frame structure 12 in a conventional manner. Because FIG. 7 is exemplary, one skilled in the art will understand that it is within the scope of the invention to use a coil spring suspension system with any of the axle types disclosed herein, including single axles, half axles and transaxles.

FIGS. 8 and 9 show, respectively, a leaf spring suspension system, generally designated 186, and a damped or, alternatively, hydraulically controlled, fluid filled cylinder suspension system, generally designated 188. The exemplary suspension systems in FIGS. 8 and 9 are mounted on a transaxle, but it is understood that each suspension system can be used with any axle type. Again, these leaf springs 186 or cylinders 188 bias the axle downwardly and thus may be considered axle biasing devices.

The leaf spring suspension system 186 of FIG. 8 includes conventional leaf spring members 190 secured to the axle assembly 176 by conventional means. The free ends of each leaf spring member 190 are secured to the main frame structure 12 (not shown) of the vehicle 10 using any means known to one skilled in the art.

The cylinder suspension system 188 shown in FIG. 9 is a passive damped suspension system or, alternatively, a hydraulically powered system that actively repositions the axle assembly with respect to the track assembly in response to commands from the control module 44. When a damping system is constructed according to FIG. 9, the fluid filled cylinders 192 can have any known fluid means including air, inert gas, oil or other viscous liquid. Connection of the cylinder between the axle assembly and the frame structure 12 can be accomplished by any conventional method.

Figure 10:
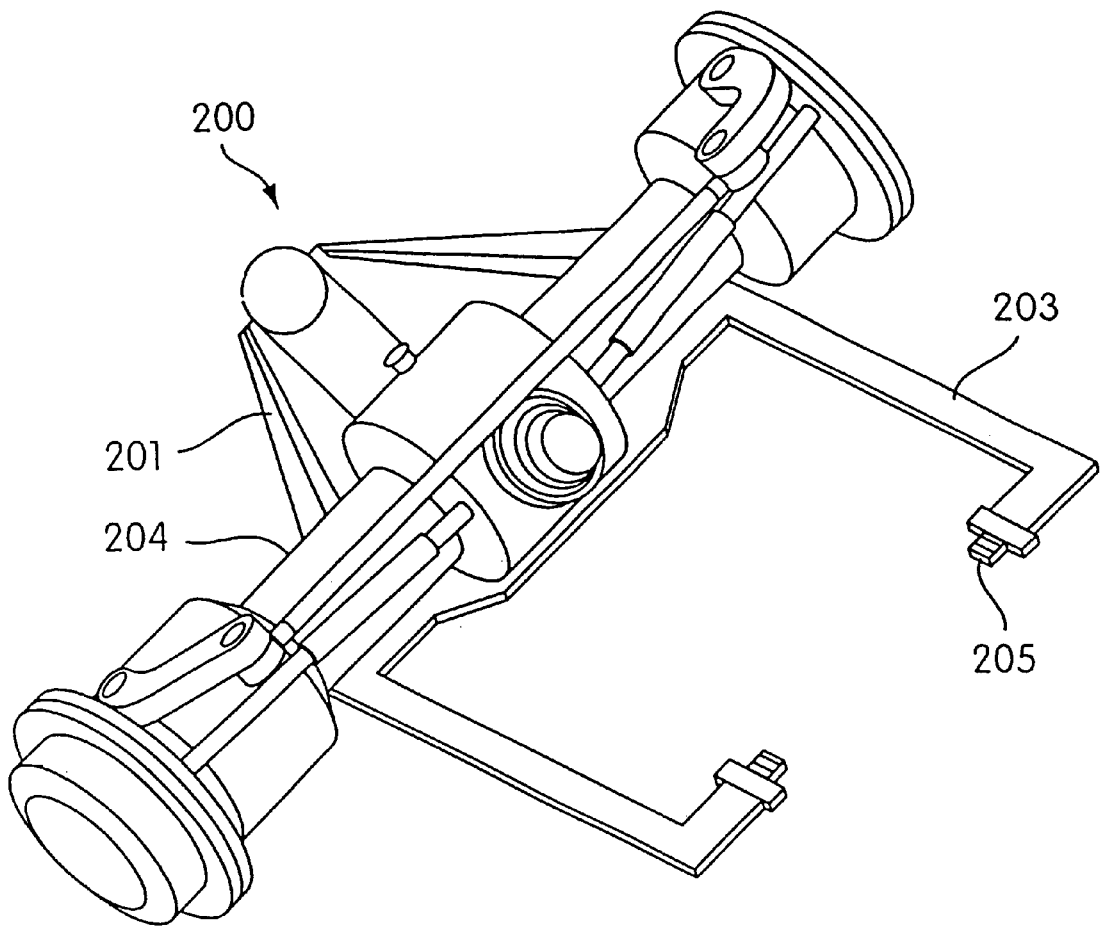
FIG. 10 is a perspective view of a rigid axle assembly of the vehicle.
Figure 11:
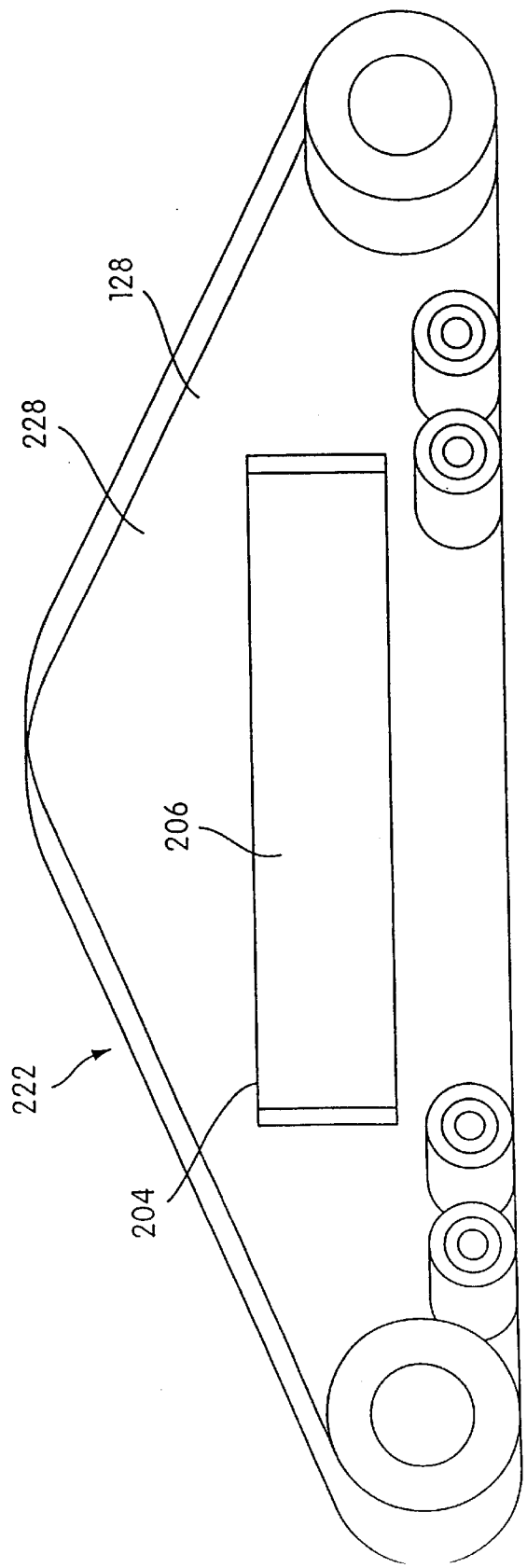
FIG. 11 is a schematic view of a side of the track assembly showing a block therein which indicates a general area in which a repositionable subframe member may be mounted to provide a movable support structure for an axle assembly of the wheel assembly.

An example of a single rigid axle assembly, generally designated 200, is shown in FIG. 10. The exemplary embodiment shown is a Model 1150 steerable axle (i.e., the axle 200 is provided with pivotally steerable wheels) manufactured by the John Deere Corporation of Waterloo, Iowa. This rigid axle, when installed in the vehicle 10, can be rigidly attached to the frame structure 12 or movably mounted for selective powered repositioning within the envelope 28 of the track assembly. The axle assembly 200 can be movably mounted within the envelope 28 in a plurality of ways. The assembly 200 can be mounted for vertical movement with respect to the frame structure 12 by using a pneumatic bag device (not shown).

This mounting for selective repositioning by using a pneumatic bag is fully disclosed in the above-incorporated '748 patent. It is contemplated to use basically the same mounting in the vehicle described herein. It is also contemplated to movably mount any of the axle assemblies disclosed herein using any of the methods disclosed in the '748 patent for movably mounting an axle assembly within the envelope. The concept of movably mounting an axle assembly is not intended to be limited to the rigid axle structure shown in FIG. 10.

These embodiments which use the pneumatic bag or the movable member are also intended to illustrate a general concept of providing a movable structure within the envelope 28 of the track assembly 22 that supports the wheel assembly. This general concept is illustrated schematically in FIG. 11 which shows a movable subframe 204 movably mounted within the track assembly 222. It is contemplated to provide the track assembly 222 with a movable subframe 204 which defines a movable sub-envelopee 206 within the larger envelope 128. The power unit 51, the wheel assembly 38 or both could be mounted within the subframe 204. A plurality of movable subframes and a plurality of methods and structures for mounting the subframe within the envelope 28 are disclosed in the incorporated '748 patent and will not be repeated herein.

This subframe 204 can be movably mounted within the frame structure 12 using bearings, a pneumatic device such as a pneumatic bag, can be slidably mounted on a ramp structure or mounted for movement with respect to the track assembly 222 using any means known to one skilled in the art. The subframe 204 may be used with any axle assembly disclosed herein and may contain the axle assembly alone or may contain the axle assembly and portions of the power drive structure (not shown in FIG. 12) such as the engine 52, the gear box 54, and/or the pumps 55, 56, 57, as well. It can be appreciated that moving the subframe 204 moves the center of gravity and repositions the wheels 36 with respect to the track assembly 222. The subframe concept therefore represents a means for placing the repositioning of the center of gravity and the wheels under the control of the operator and/or a programmable logic control unit. This can aid in propelling and turning and stabilizing the vehicle.

It can be appreciated that a vertically moving wheel assembly can lift a portion of the track off of the ground so that the vehicle is supported by the two wheels and a portion of the track. This facilitates turning and minimizes destruction of the ground surface because a significant portion of the track assembly 22 is not engaged with the ground as it is turned. By rotating the wheels in opposite directions, for example, while the track is rotating or freewheeling, the vehicle can turn in place.

Figure 12:
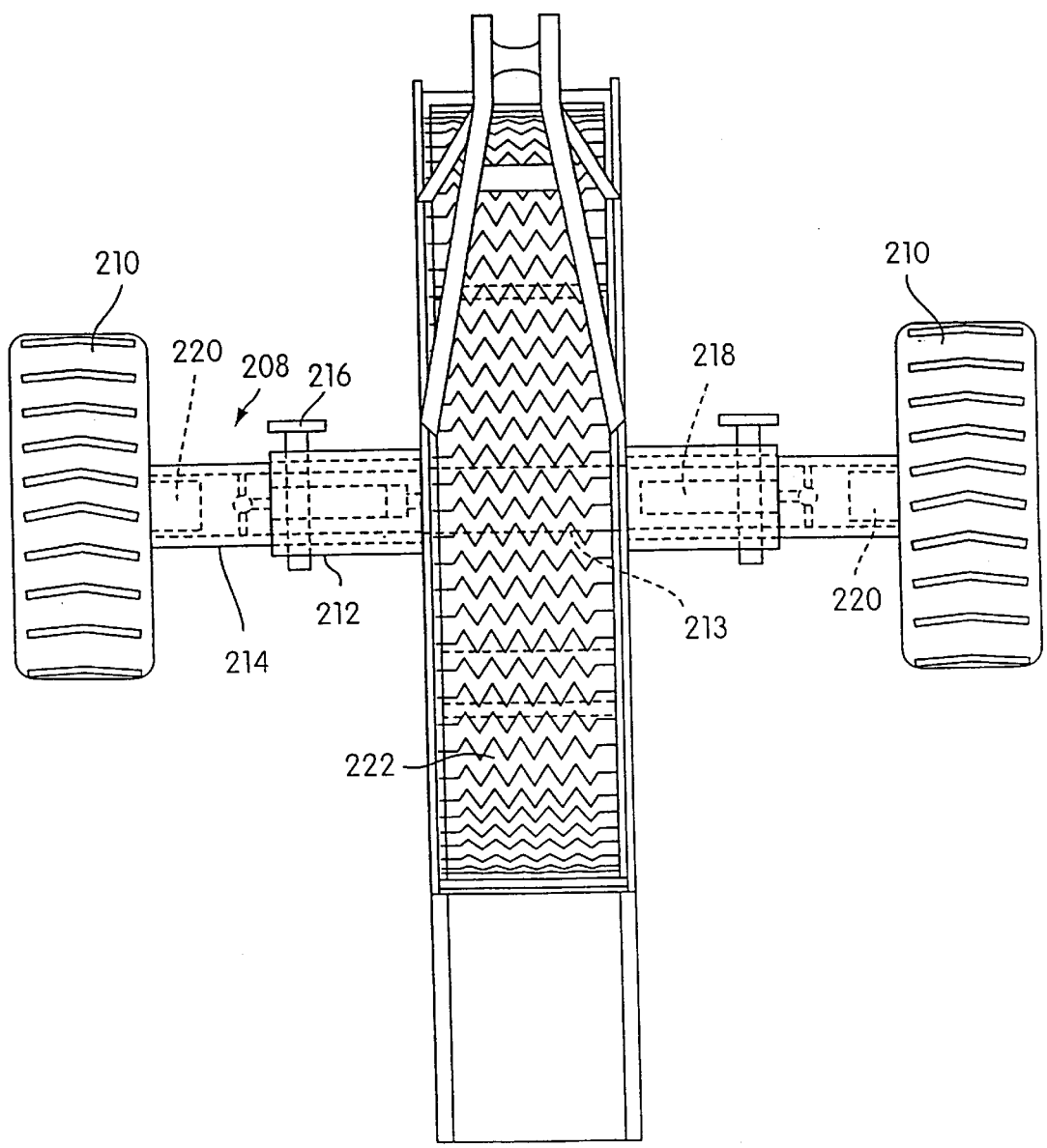
FIG. 12 is a schematic top plan view of an embodiment of the vehicle which incorporates a plurality of telescoping axle members in the wheel assembly thereof showing portions of the wheel assembly in phantom lines to reveal internal portions thereof.
Figure 13:
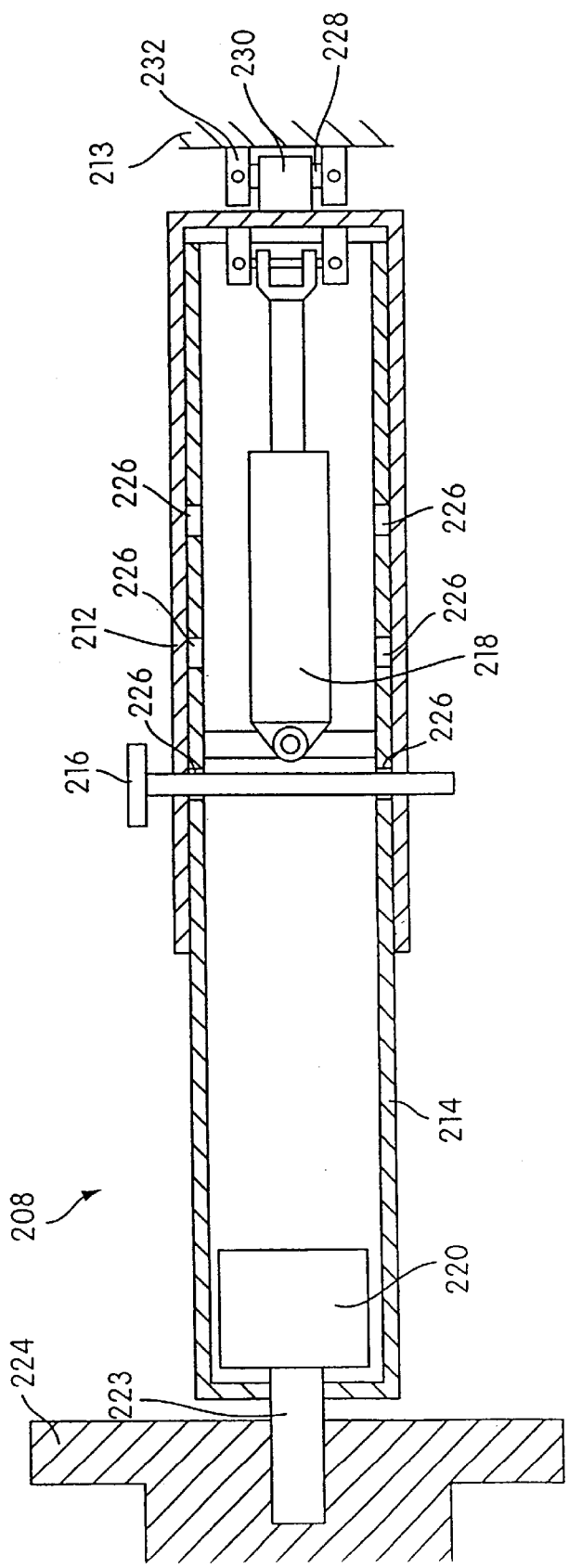
FIG. 13 is an enlarged sectional view of a portion of a wheel assembly which incorporates telescoping axle members showing a portion of the main frame structure in fragmentary view.

A telescoping axle assembly, generally designated 208, is shown in FIGS. 12–13. This axle assembly 208 provides the ability to independently reposition the wheels 210 laterally outwardly with respect to the track assembly 222 and lock them in a new adjusted operating position. FIG. 12 is a top plan view of the vehicle showing the telescoping wheel axle assembly 208 partially in phantom lines to reveal the internal structure thereof. Each axle assembly 208 includes a frame mounting portion in the form of an outer sleeve member 212 pivotally attached to the frame structure 213 and a wheel mounting portion in the form of an inner sleeve member 214 slidably mounted therein for telescopic movement with respect thereto.

The inner and outer sleeve members 212, 214 are generally cylindrical hollow metal structures. The sleeve members 212, 214 are releaseably locked together by a locking pin 216. A first end of a conventional hydraulic cylinder 218 is secured to the outer sleeve 212 and a second end of the cylinder 218 is secured to the inner sleeve 214 to effect the telescoping movement of the inner sleeve 214 with respect to the outer sleeve 212.

A motor 220, drive shaft 223, hub 224 and a wheel 210 are mounted to a distal end of each drive unit 208 to independently rotate the wheels 210 to drive and steer the vehicle. The wheel 210 and hub 224 can be non-pivotally attached to the inner sleeve 214 as shown for non-angular steering in the manner described below or, alternatively, can be pivotally attached to provide the vehicle with angular steering as in the '748 patent.

An enlarged cross sectional view of a single drive unit 208 on one side of the track assembly 222 is shown in FIG. 13. The inner and outer sleeves 212, 214 are provided with a plurality of aligned apertures 226 for releaseably locking the inner sleeve 214 to the outer sleeve 212 with the locking pin 216 to lock the wheel 210 in a given horizontal position with respect to the track assembly 222.

The outer sleeve member 212 can be rigidly attached to the main frame structure 213 or pivotally attached thereto as shown in FIGS. 12–13. A pivot rod 228 pivotally secures an apertured mounting structure 230 integral with the outer sleeve between apertured ear members 232 integral with the frame structure 213. When pivotally attached to the main frame structure 12, any one of the suspension systems shown or referenced herein can be used with each drive unit, including leaf springs, coil springs and fluid filled cylinders. Alternatively, any one of the powered axle assembly mounting structures disclosed herein or the equivalents thereof can be used to provide powered pivoting movement for the telescoping axle assembly with respect to the main frame structure 213. When a suspension system is used, for example, the suspension system can be mounted between main frame structure 213 and the outer sleeve 212 or, alternatively, between the main frame structure 213 and the inner sleeve 214. No suspension system or powered system is shown in FIGS. 12–13, however, in order to more clearly show the telescoping feature, although any of the suspension systems shown in FIGS. 3, 4, 5 or 6 can also be used with this telescoping drive unit.

The inner and outer sleeves 214, 212 are preferably constructed of steel and may both be hollow, rectangular-shaped or cylindrical structures. One or more steel locking pins 216 may be used with each telescoping unit 208.

The telescoping wheels 210 of the present invention can be independently repositioned horizontally easily by a single person. For example, a single wheel 210 can be horizontally repositioned with respect to the track assembly 222 by driving the track assembly 222 on, for example, a slightly raised surface so that one of both of the wheels 210 are suspended above the ground surface, removing the appropriate lock pin 216, actuating the fluid filled cylinder 218 to lengthen or shorten the same as appropriate to telescopically displace the inner sleeve 214 with respect to the outer sleeve 212, and replacing the locking pin 216 when the desired operating position of the wheel 210 with respect to the track assembly 222 is realized.

Alternatively, if the outer sleeve 212 is pivotably mounted to the frame structure 213, the outer sleeve 212 can be pivoted upwardly while the vehicle is disposed on a level surface to raise the wheel 210 associated therewith out of contact with the ground or, alternatively, to at least reduce the ground pressure on the wheel 210 while the wheel is still in contact with the ground. Then, after the locking pin 216 is removed, the wheel 210 can be horizontally repositioned by using the hydraulic cylinder 218 to telescopically displace the inner sleeve 214 with respect to the outer sleeve 212. The locking pin 216 is then reinserted to lock the sleeves 212, 214 together. A worker may have to assist the telescopic repositioning of the inner sleeve 214 by lifting, pushing or moving the associated wheel 210 side-to-side depending on several factors such as the weather and wheel weight, but the horizontal repositioning of the wheels can be accomplished quickly by one or two people.

It is within the scope of the present invention to provide any conventional means for powering the telescoping movement of the inner sleeve with respect to the outer sleeve. The fluid cylinder is preferably fluidly communicated to the hydraulic pump 234 (shown schematically in FIGS. 15–16) operatively connected to the gear box 54 of the power unit 51.

The telescoping driving units 208 provide many advantages and make the carrier vehicle 10 adaptable for a wide range of uses. When the vehicle 10 is used to cultivate or harvest row crops, for example, the telescoping ability of the drive units 208 can accommodate a wide range of crop row widths. Increased wheel assembly width provided by the telescoping structure also increases lateral stability when the vehicle 10 is used on uneven or sloped terrain. When the telescoping function is used in combination with any of the described suspension systems, the vehicle 10 provides positive ground contact between the wheels 210 and the ground surface even on severely uneven terrain.

It can be appreciated that the choice of whether to include various features of the vehicle 10 depends on the use to which the vehicle will be put. For example, an embodiment of the vehicle 10 in which the outer sleeves 212 are rigidly attached to the frame structure 213 and without a suspension system may be appropriate for row cropping on level fields and other uses on level ground. On the other hand, the pivotal and suspension mounting of the drive units 208 may be more appropriate when the vehicle will encounter rough, uneven or unknown terrain.

FIGS. 14–17 are schematic illustrations of a plurality of hydraulic circuits for the vehicle 10. Each component represented in the hydraulic circuits represents a conventional, readily available part. One skilled in the art will appreciate that conventional hydraulic lines are represented by solid lines that connect the conventional hydraulic components and that conventional electrical connections are represented by broken lines drawn from the control module 44 to various components within the circuit.

Figure 14:
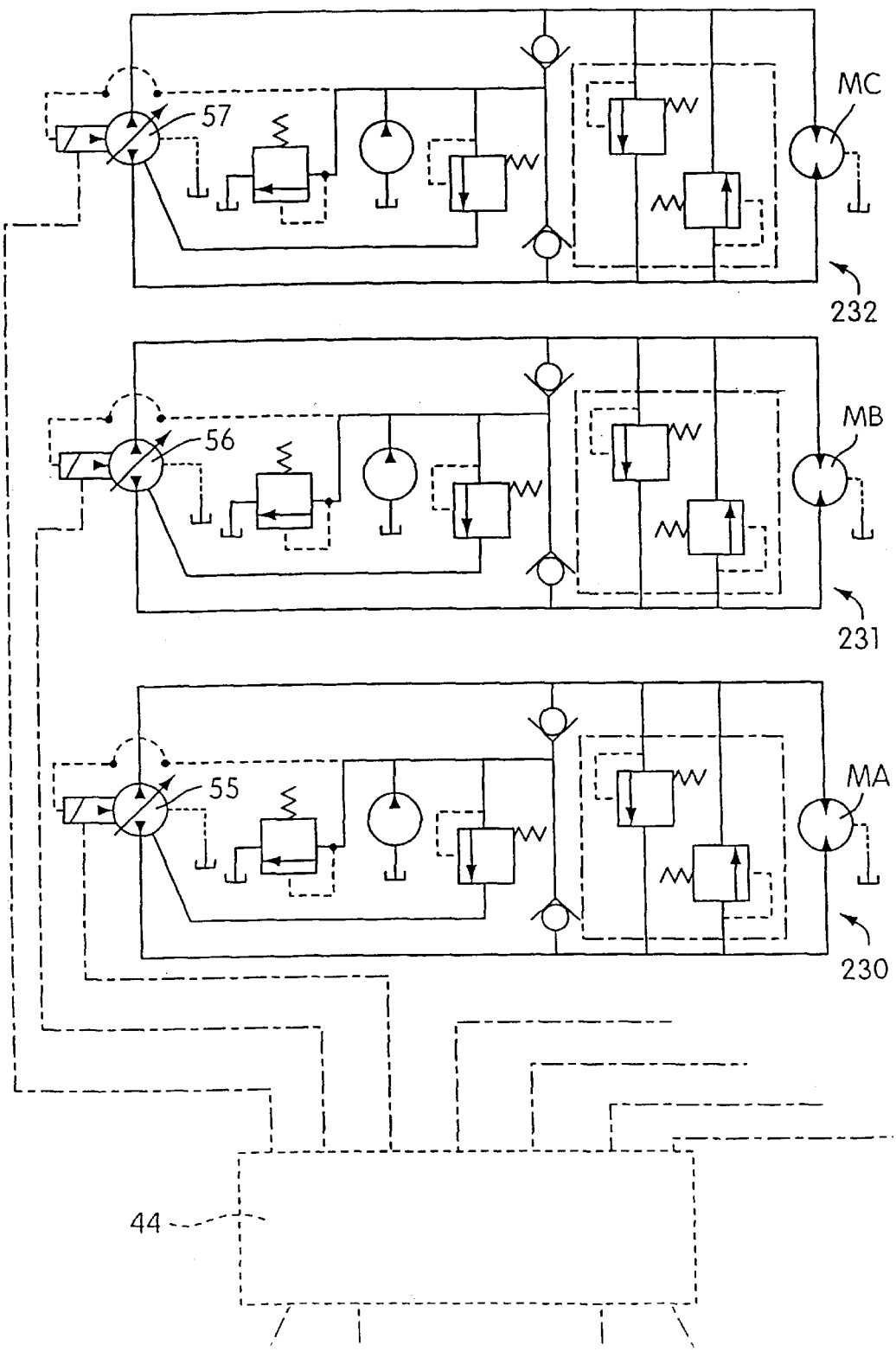
FIG. 14 is a schematic illustration of a first portion of an electronically controlled hydraulic circuit of the vehicle of the invention for driving the wheels and central track thereof.

It will be recalled that it is preferred that the vehicle locomotion is effected by three separate hydraulic motors MA, for driving the track 26 and second and third motors, generally designated MB and MC, respectively, for the driving the flanking wheels 36. Hydraulic circuit diagrams which include the motors MA, MB, MC are shown in FIG. 14. Each motor MA, MB, MC has a separate closed loop hydrostatic transmission circuit, generally designated 230, 231 and 232, respectively, and each motor is provided with a separate hydraulic pump respectively designated 55, 56 and 57.

Each hydrostatic pump 55, 56, 57 has an integral charge pump system and cross-over relief valves. Each charge pump system provides the make-up fluid required for leakage compensation and cooling; each charge pump system also provides the hydraulic pressure needed to affect the hydraulic displacement in response to a command signal as explained hereinbelow.

Alternatively, a functionally equivalent locomotion system can be constructed which uses a plurality of hydraulic motors, as, for example, motors MA, MB, MC, operated by a single hydrostatic pump. In a single pump locomotion system, a plurality of conventional hydraulic valves are used to in a manner well known to one skilled in the art to correctly proportion the flow of hydraulic fluid among the plurality of motors of the locomotion system. A single pump locomotion system, however, is less efficient than the preferred multiple pump system.

One skilled in the art will recognize that the multiple pump hydraulic system shown in FIGS. 14–17 is more efficient than a single pump system because the hydraulic pumps 55, 56 and 57 need only generate as much pressure as is required by the motor associated therewith. A single pump system, on the other hand, has only one pump and one valve control. This reduces efficiency because the pressure demand for the locomotion hydraulic circuit would equal the maximum required by the associated hydraulic motors plus the loss caused by the valve control.

When a multiple pump system is used, the pump displacements of the hydrostatic pumps are controlled by a conventional speed, steering and ground control module, generally designated 44. The control module 44 can be, for example, a Campbell Mpde; CR10X-2M programmable control module. This control module 44 is a programmable logic device which can accept both digital and analog inputs and generates both digital and analog outputs. The control module 44 is easily reprogrammable to change the relationships between the inputs and outputs. As will be explained, the control module 44 accepts input signals from various instruments in the control assembly 42, as for example the steering wheel, and generates output controls signals to control such vehicle functions as ground pressure and steering cylinder position.

The flow rate of hydraulic fluid to the driven motors MA, MB, MC of the locomotion system, and, hence, the individual motor speeds, is proportional to pump displacement of pumps 55, 56, 57, respectively. The logic circuitry within the control module 44 determines individual pump 55, 56, 57 displacements, and hence, individual motor MA, MB, MC speed, as functions of target speed and direction selected by the vehicle driver.

For example, when the vehicle driver wishes to negotiate a right turn, he turns the steering wheel 45 to the right. A steering wheel position signal is generated in response by the rotary potentiometer and sent to the control module 44. In response, the logic circuitry in the control module 44 generates appropriate control signals to increase or decrease the displacement of the pumps 55, 56 and 57. If the right turn is gradual, for example, the left pump MB displacement would be increased, the track pump 55 displacement may be adjusted and the right pump MC displacement may be decreased. If, on the other hand, the right turn is sharp, the right pump MC may be set to zero displacement or, alternatively, reversed which would, in turn, reverse the rotational direction of the right wheel 36a.

Figure 15:
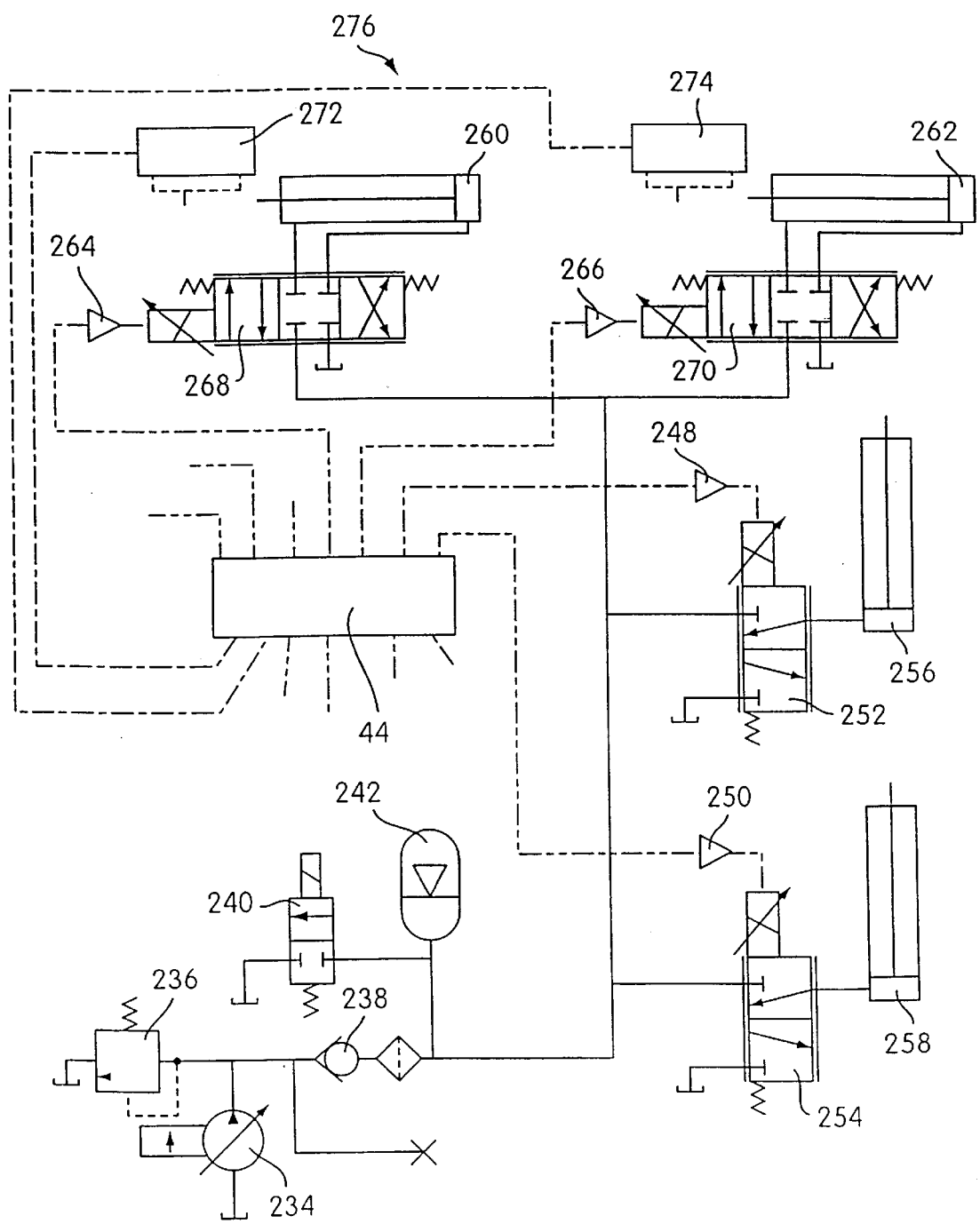
FIG. 15 is a schematic illustration of a second portion of the electronically controlled hydraulic circuit of FIG. 14 of the vehicle of the invention for controlling steering angle and wheel ground pressure.
Figure 16:
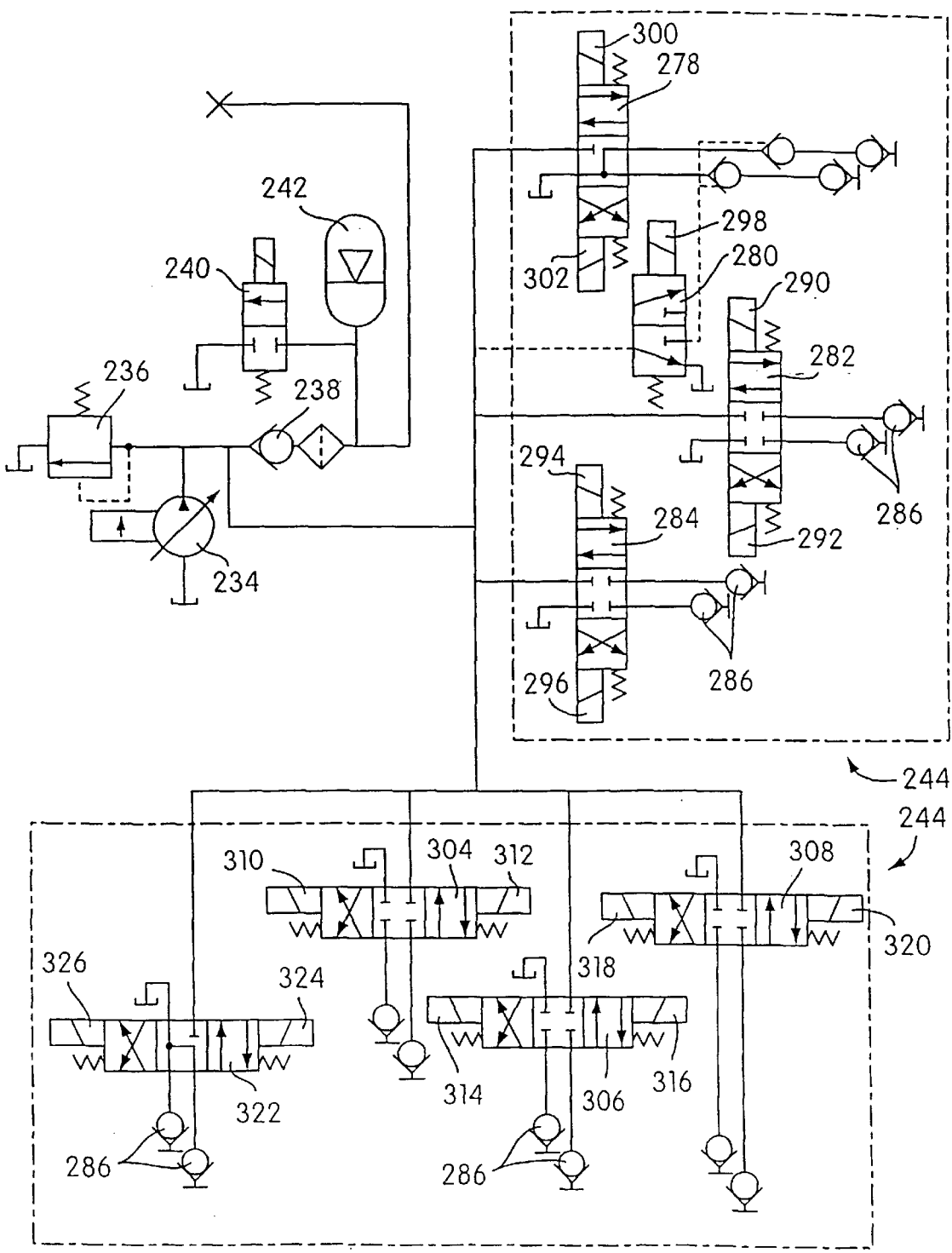
FIG. 16 is a schematic illustration of a third portion of the electronically controlled hydraulic circuit of FIG. 14 of the vehicle of the invention showing stack valve sets for front and rear attachments.
Figure 17:
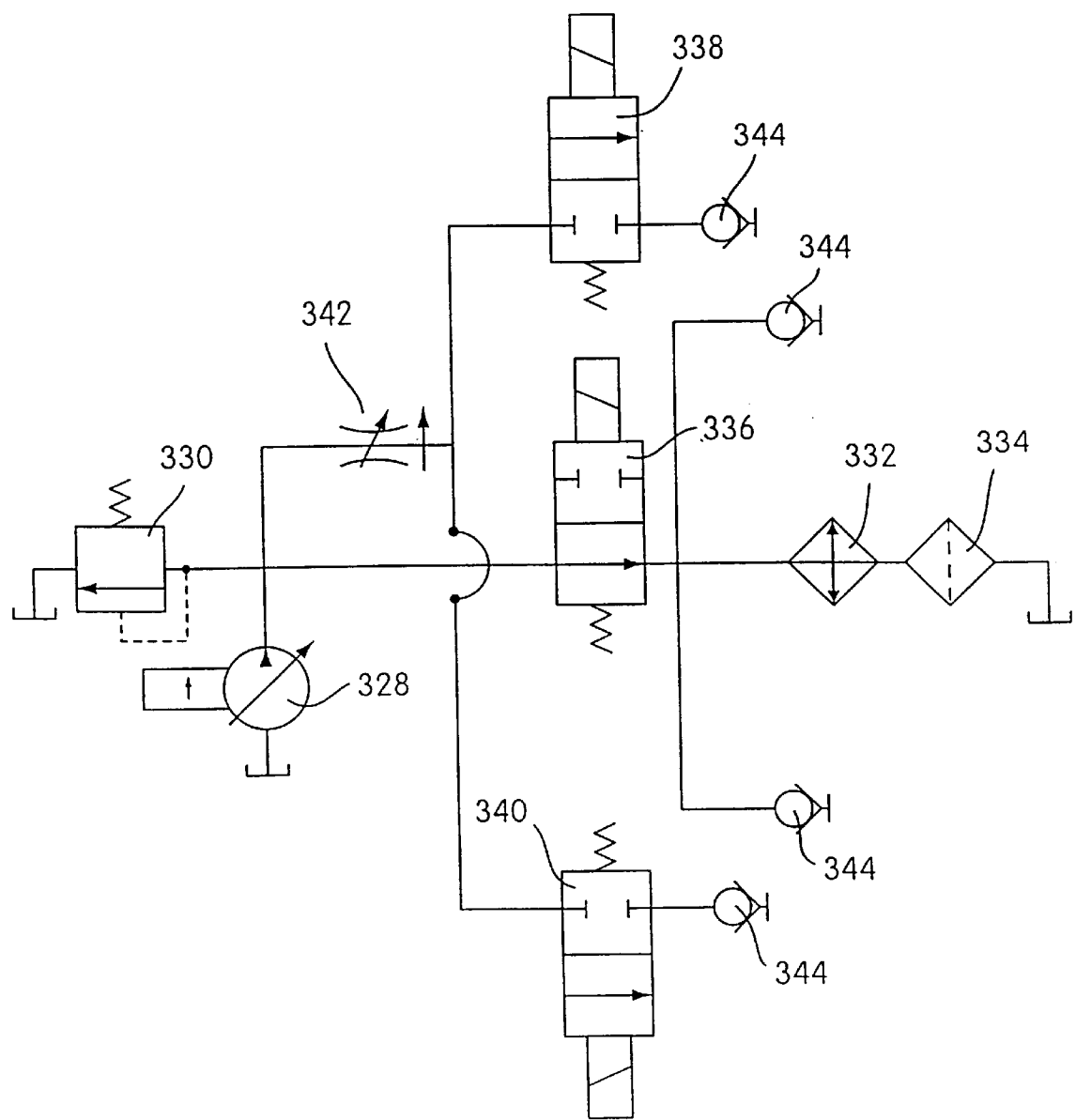
FIG. 17 is a schematic illustration of a fourth portion of the electronically controlled hydraulic circuit of FIG. 14 of the vehicle of the invention for oil conditioning and for powering attachments.

A separate, single pump hydraulic circuit provides hydraulic power for steering (for embodiments of the vehicle which are provided with pivotally steerable wheels), for ground pressure control for the flanking wheels 36, oil conditioning, and for motors to drive attachments mounted on the vehicle. A schematic diagram for such a single open loop pump hydraulic circuit is shown in FIGS. 15–17. A pressure compensated pump 234, a relief valve 236, a check valve 238, a solenoid valve 240 and an accumulator 242 are shown as part of both the attachment and steering circuits, generally designated 244 and 246, respectively, in FIGS. 15–16. The pump 234, is preferably realized by connecting two small pumps in parallel because this arrangement is less expensive than one large pump. Pump 234, however, will be discussed as a single pump. It can be appreciated that this open loop pump 234 provides fluid for all tractor functions except locomotion. These functions include steering (when pivotally steerable wheels are provided), ground pressure control, attachment drives and oil conditioning (i.e., filtering and cooling). Pump 234 can be two 45L07PC25 pumps commercially available from the Steffen Company whose main office is located at 623 West $7^{th}$ Street, Sioux City, Iowa 51103. Pump 234 can also be a Series 45 pump manufactured by the Sauer Sunstrand Company. The Series 45 pump has a 3.5 cubic inch per revolution displacement and a 3000 p.s.i. maximum pressure. The Sunstrand Series 45 pump is pressure compensated and has a horsepower limiting option.

The relief valve 236 limits the hydraulic pressure in the circuit to within a safe upper limit. The check valve 238 prevents pressurized oil stored for steering and ground pressure control (priority functions) from being used to operate any attachments. The solenoid operated on/off valve 240 discharges the accumulator in response to a signal from a conventional timing circuit. The timing circuit may, for example, signal the solenoid valve 240 to discharge the accumulator a predetermined amount of time after the engine has been turned off. This decrease in hydraulic pressure facilitates safe maintenance or repair of any of the components of the ground pressure and steering circuit. The solenoid valve 240 is conventional and can be a Waterman 12CR5S-F12-T6; the Waterman valve has a capacity of less than five gallons per minute and a maximum p.s.i. of 3000.

The accumulator 242 can be a conventional Tobul 9A30-40 accumulator manufactured by the Tobul Company commercially available from Winco Fluid Power, Inc., 2955 Terwood Road, Willow Grove, Pa. 19090. The accumulator 242 preferably has a 10 gallon total capacity and is a piston type accumulator. The accumulator(s) 242 in the circuit store energy in the form of pressurized fluid to allow the pump flow rate capacity to be lowered by a longer term "maximum average". Peaks in the flow demand for steering and for following ground contour would be provided by the accumulators. The accumulators also provide a limited amount of emergency fluid pressure for steering.

Control signals generated by the control module 44 control the ground pressure of the flanking wheels 36. More specifically, the ground pressure control signals are sent to conventional valve drivers 248 and 250, sometimes also referred to as valve amplifier cards, which, in turn, control conventional proportional pressure control valves 252 and 254. The proportional pressure control valves 252, 254 control the pressure applied to the cap end of the wheel cylinders 256 and 258. The schematically illustrated wheel cylinders 256 and 258 may be the fluid cylinder 146 shown in FIGS. 3 and 4 which controls the ground pressure and vertical positioning of an associated wheel.

The pressure reducing valves 252, 254 can be HYDRAFORCE Proportional Electric Pressure Reducing Valves model TS10-36A-M-8T-N-12DG and the valve drivers 248, 250 can be HYDRAFORCE Proportional Control Amplifiers model 7114920. The proportional pressure control valves 252, 254 control pressure to the ground pressure control cylinders 256, 258 and hence control the pressure between the tires and the ground (and hence between the track and the ground also). The amplifier cards 248, 250 receive control signals from the control module 44 and send proper pulse width modulation signals to the valves 252, 254.

A sample of the control logic for the ground pressure function is as follows. Generally, to turn the vehicle, the driver turns the steering wheel in the desired turn direction. The farther the steering wheel is turned in a given direction, the shorter the turning radius. To negotiate a significant turn, ground pressure under the wheels would be increased in order to reduce the ground pressure of the central track. The conventional rotary potentiometer (not shown in the schematic drawings) interconnected to the steering wheel shaft (not shown in the drawings) generates an appropriate electrical input signal that is sent to the control module 44 which input signal indicates the desired turn direction and turn radius.

The control module 44, in response, sends a control signal to the valve amplifier cards 248 and 250. The valve amplifier cards 248, 250 control the proportional pressure control valves 252, 254 which control the pressure applied to the cap end of the wheel cylinders 256, 258 in a conventional manner. The pressure applied to the wheel cylinders 256, 258 forces the wheels downwardly with respect to the central track to thereby relieve the weight carried by the track as the vehicle turns.

A ground pressure control override system is provided which allows the operator to control the maximum pressure exerted by the ground pressure control cylinders 256, 258. Left and right wheel ground pressure override input signals are sent to the control module 44. The override system provides the operator with the capability to "dial in" or program in override system characteristics appropriate for the current driving conditions. For example, the operator may lessen ground pressure of both flanking wheels in response to soil conditions or may lessen ground pressure of one wheel, the uphill wheel, when driving across, that is, generally perpendicular to, the gradient of a slope.

When steerable wheels are provided, the flow of hydraulic fluid to the steering cylinders 260 and 262 is controlled by proportional valves 268 and 270 which are, in turn, powered by amplifier cards 264 and 266. The amplifier cards 264, 266 are actuated by control signals from the control module 44. Feedback position transducers 272 and 274 provide feedback to the control module 44 based on the position of the steering cylinders 260, 262. The position transducers can be, for example, Linear Motion Potentiometers model number M1326-8-103 manufactured by the Maurey Company commercially available from Servo Systems Company, 115 Main Road, P.O. Box 97, Montville, N.J. 07045-0097 as stock number PR259. The position transducers 272, 274 provide feedback to the control module 44 which indicates the actual position of the steering cylinders and, therefore, tire angle. Comparisons of the actual position of the wheels with the desired position based on the rotational position of the steering wheel determine the control signals sent to the valve controllers 264, 266. The proportional valves 268, 270 are conventional and can be Model KDG4V35-2C-15x manufactured by the Waterman Company. These valves 268, 270 have ten gallon per minute capacity and a maximum pressure of 3000 p.s.i. The valve drivers 264, 266 are conventional and can be model APCI/10-12 drivers manufactured by the Waterman Company. The drivers 264, 266 accept an analog input and PWM output devices.

As shown in FIGS. 15–17, the vehicle includes hydraulic circuits for attachments which require low hydraulic flow, for attachments which require large hydraulic flow and for oil conditioning. Lift attachments and other with low flow requirements are powered by the open loop pump 234 that also powers the steering and ground pressure circuits. All of the valves in the low flow hydraulic circuit are of relatively small capacity, typically 10 g.p.m.. Front attachments are controlled by a stackable valve set which includes valves 278, 280, 282, and 284. Connections to the attachments are made through quick coupler sets 286. A plurality of coupler sets are indicated at several locations in the schematic diagrams; coupler sets with identical reference numerals are identical structures. Two valves 282 and 284 provide forward, reverse and hold functions depending upon which solenoids 290, 292, 294 or 296 are powered.

The solenoids are powered by simple on/off rocker type switches or by any other appropriate switching device. The valves are conventional; valve 278 is a solenoid operated, three position directional valve such as Model D64V35-xx-MFW manufactured by the Waterman Company. It has a 10 g.p.m. capacity, a 3000 p.s.i. maximum pressure and is a float center type valve. The valves 282, 284 are solenoid operated, 3 position directional valves such as model D64V35-xC-MFW manufactured by the Waterman Company. These valves 282, 284 have a 10 g.p.m. capacity, a 3000 p.s.i. maximum pressure and are of the closed center type. The quick couplers 286 are conventional female adapters which have ASAE standard dimensions and a 3000 p.s.i. maximum pressure capability.

One pair of valves 278 and 280 provide lift, lower, float and hold positions for a blade, a feller head or other attachment. If no solenoid is energized the associated attachment is held in a stationary position. Energizing solenoid 298 provides float. Energizing 300 and 298 provides lift and energizing 300 and 302 provides attachment lowering. Valve 280 is conventional and is a solenoid operated, 2 position directional valve; valve 280 can be a Waterman model D64V35-2A-MFW which has a 10 g.p.m. capacity and a 3000 p.s.i. maximum pressure.

The rear attachment stackable valve set is similar to the front attachment circuit. Connections to the attachments are made through a plurality of quick coupler sets 286 located at various positions in the hydraulic circuit. Three valves 304, 306 and 308 provide forward, reverse and hold functions depending on which solenoids 310, 312, 314, 316, 318, and 320 are energized. One valve 322 provides float, forward and reverse functions for control of the winch depending upon which solenoid is energized, none, 324 or 326, respectively. Valve 322 is a solenoid operated, three position directional valve such as Model D64V35-xx-MFW manufactured by the Waterman Company. It has a 10 g.p.m. capacity, a 3000 p.s.i. maximum pressure and is a float center type valve. Valves 304, 306, 308 are solenoid operated, 3 position directional valves such as model D64V35-xC-MFW manufactured by the Waterman Company. These valves 304, 306, 308 have a 10 g.p.m. capacity, a 3000 p.s.i. maximum pressure and are of the closed center type.

Attachments which require a large fluid flow such as a feller head or winch are powered by an open loop pump 328 shown in FIG. 17. The relief valve 330 limits the pressure in the circuit to a safe upper limit. If no solenoids are energized, the oil from pump 328 flows through the air cooler 332 and the filter 334. The air cooler 332 removes heat from the oil. The filter 334 removes particulate matter from the oil and helps maintain a clean supply of oil in the reservoir. The air cooler and the filter can both be conventional parts. The air cooler can be a model AOHM-35 oil cooler manufactured by Thermal Transfer Products, Ltd. The open loop hydraulic pump 328 is conventional and can be, for example, a Series 45 pump made by the Sunstrand Company. This pump has a 3.5 cubic inch/revolution displacement and a 3000 p.s.i. maximum pressure. This pump is pressure compensated and has a horsepower limiting option. The adjustable relief valve 330 is conventional and has a 3000 p.s.i. maximum pressure rating. The return line filter 334 is conventional and preferably has a 35 g.p.m., 500 p.s.i. capacity.

When the solenoids associated with valves 336 and 338 are energized, the rear attachment (e.g., a winch) is powered. When the solenoids associated with valves 336 and 340 are energized, the front attachment (e.g., a feller head) is powered. The oil that flows from pump 328 always flows through the conditioning loop which is comprised of the cooler and the filter, even if the oil is returning from a motor circuit. A flow control valve 342 controls the flow rate to the motor circuits and hence controls the motor speed. The connection between the power unit and the motor circuits is effected through the quick coupler pairs 344 which are shown in two places in the schematic drawings.

The adjustable relief valve 330 has a 3000 p.s.i. maximum pressure capacity. The valves 336, 338, 340 are conventional and can represent solenoid operated, 2 position directional valves manufactured by the Waterman Company, model 21C-1S-F12-T16. These valves have a 35 g.p.m. capacity and a 3000 p.s.i. maximum pressure capacity. The quick coupler 344 is conventional and is preferably a female adapter with a 35 g.p.m. capacity and a 3000 p.s.i. maximum pressure capacity.

An alternative embodiment of the vehicle hydraulic system is shown in FIGS. 18–21. This embodiment is similar to the preferred embodiment shown in FIGS. 14–17 and identical part are given identical reference numbers but are not discussed in detail. All components represented schematically in FIGS. 14–21 are conventional, commercially available parts.

Figure 18:
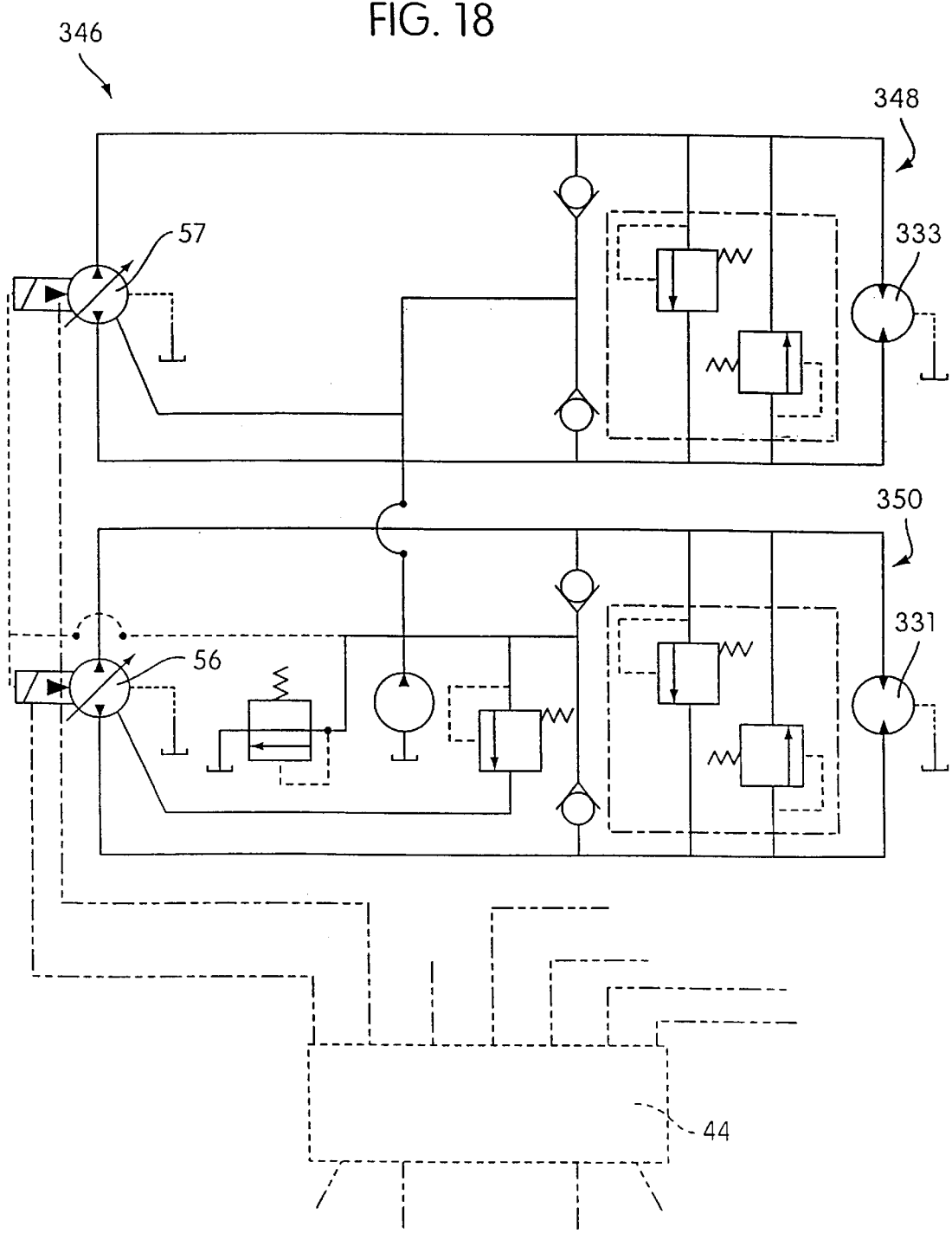
FIG. 18 is a schematic representation of a first portion of an alternative embodiment of an electronically controlled hydraulic circuit for the vehicle showing a portion of a locomotion circuit for powering the flanking wheels of the vehicle.

FIG. 18 represents a portion of the locomotion circuit for the vehicle which shows the hydraulic locomotion circuits for the left and right wheel hydrostatic transmission circuits. The locomotion circuit, generally designated 346, include separate hydraulic circuits for the left wheel drive assembly, generally designated 348, the right wheel drive assembly, generally designated 350, and the central track assembly (not shown). The left and right wheel circuits 348, 350 include separate left and right wheel drive motors 331 and 333, respectively; a separate center track drive motor (not shown) is provided in the central track circuit. Separate pumps 56 and 57 are provided for each motor 331 and 333, respectively; a separate pump (not shown) is provided for the central track drive motor (not shown). One skilled in the art will appreciate that any conventional hydraulic circuit configuration which includes a motor and pump on a closed loop circuit for the central track, such as the one shown in FIG. 14 herein, can be provided to drive the central track 22. The control and operation of the locomotion system shown in FIG. 14 are similar to that of the preferred embodiment. As explained above, the locomotion system could be replaced by a system that includes a single pump which drives the three motors, but this decreases efficiency.

Figure 19:
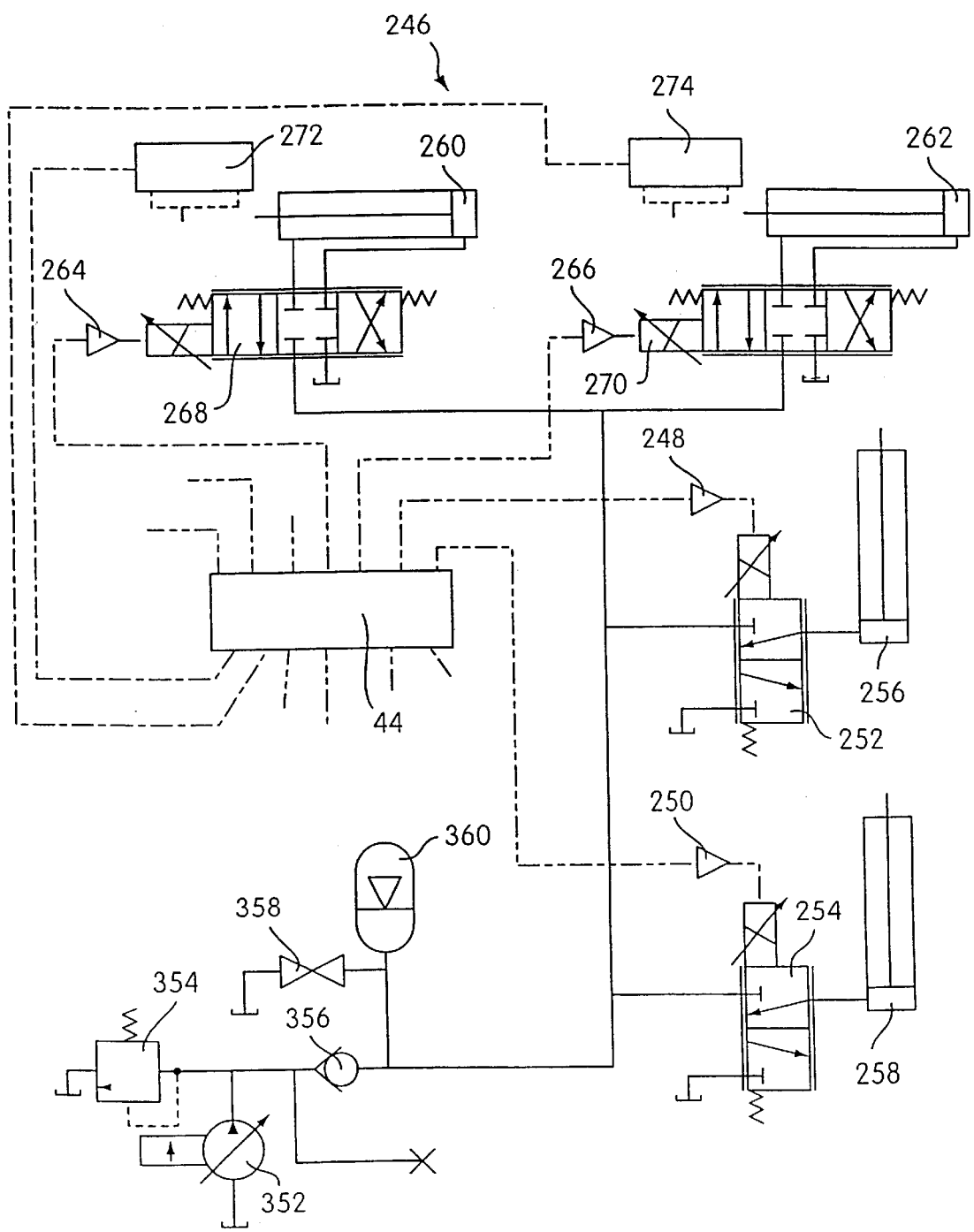
FIG. 19 is a schematic representation of a second portion of the alternative embodiment of the electronically controlled hydraulic circuit of FIG. 18 showing a steering and ground pressure control circuit.

The alternative steering and ground pressure control circuit is shown in FIG. 19. The pressure compensated pump 352, relief valve 354, check valve 356, manual valve 358, and accumulator 360 are also shown on the attachment and oil conditioning circuits shown in FIGS. 19–20, but are the same physical devices. The manual valve 358 allows the accumulator to be discharged for maintenance or repair of components in the ground pressure and steering circuit.

One skilled in the art will recognize that the control module 44, valve drivers 248 and 250, pressure control valves 252 and 254, and the wheel cylinders 256 and 258 function in essentially the same way described above to change ground pressure and/or steer the vehicle.

Similarly, the steering cylinders (optional) 260 and 262, valves 268 and 270, amplifier cards 264 and 266 and feedback position transducers 272 and 274 function in essentially the same way as described above when discussing the preferred embodiment of the hydraulic circuit.

Figure 20:
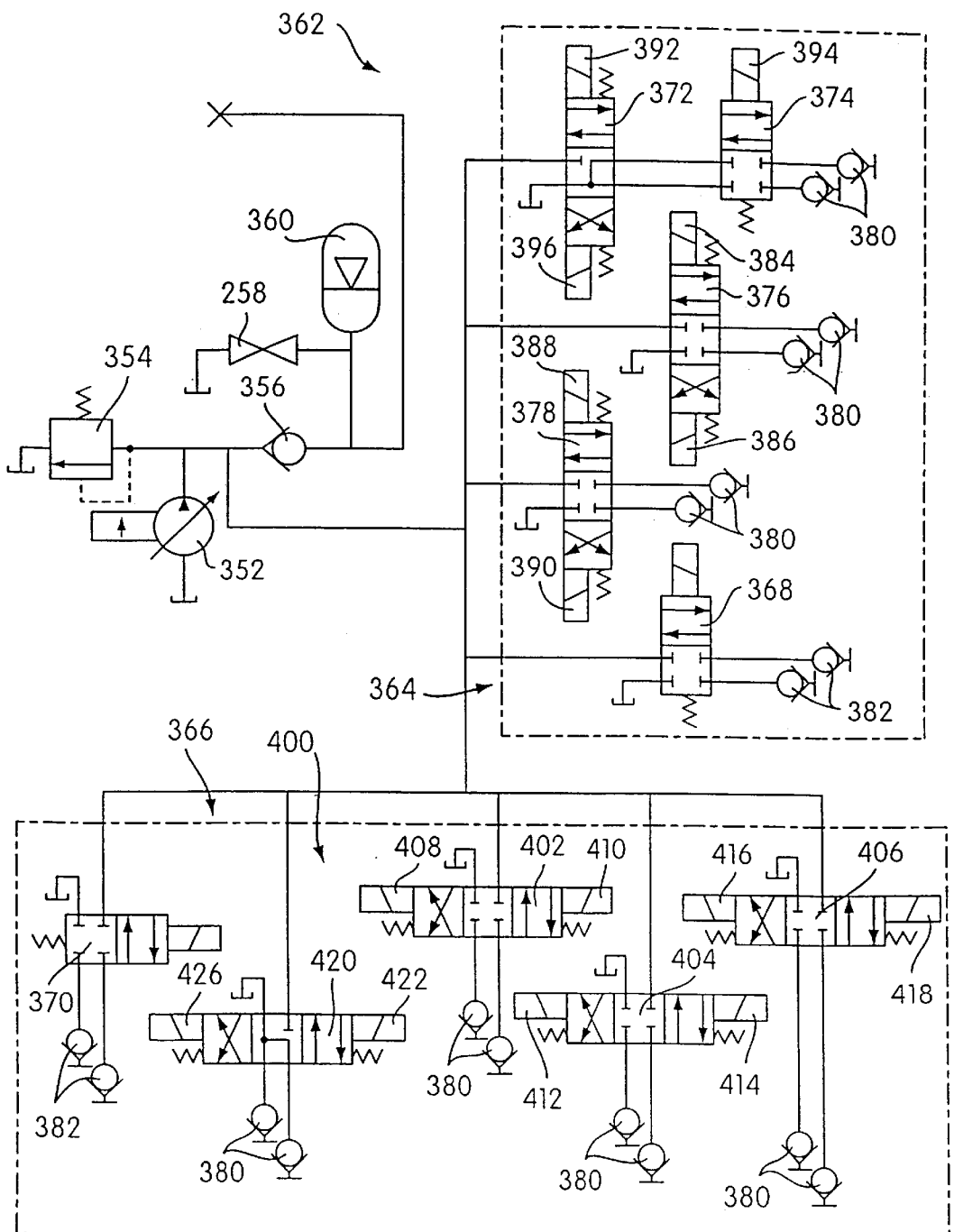
FIG. 20 is a schematic representation of a third portion of the alternative embodiment of the electronically controlled hydraulic circuit of FIG. 18 showing an attachment circuit.

An attachment circuit, generally designated 362, is shown in FIG. 20. The attachment circuit 362 includes a front attachment circuit, generally designated 364, and a rear attachment circuit, generally designated 366. The attachments are powered by an open loop pump 352. This pump 352 also powers the steering and the ground pressure circuits 246. All valves in the attachment circuit 362 are of relatively small capacity, preferably ten (10) gallons per minute, with two exceptions, valves 368 and 370.

Front attachments (such as a bulldozer blade or various mine detecting equipment) are controlled by a stackable valve set comprised of the valves 372, 374, 376, 378 and 368. Connections to the attachments are made through a plurality of quick coupler sets indicated by the reference numerals 380 and 382.

Two valves 376, 378 provide forward, reverse and hold functions depending on which solenoids 384, 386, 388 or 390 are powered. Powering of the solenoids 384, 386, 388, and 390 is controlled by conventional off/on rocker-type switches located in the operating compartment. One pair of valves 372 and 374 provide lift, lower, float and hold positions for a blade, feller head or other attachment. When no solenoid is energized, the attachment is held stationary. Energizing solenoid 394 results in float. Energizing solenoids 392 and 394 lift and energizing solenoids 396 and 392 results in attachment lowering.

A larger capacity valve 368 is used to power a motor circuit. This valve is of approximately thirty five (35) gallon per minute capacity. The motor circuit is used to power various attachments such as a feller head saw.

The rear attachment circuit 366 includes a rear attachment stackable valve set 400. This valve set 400 is similar to the front attachment circuit. Connections to rear attachments are made through a plurality of quick coupler sets, generally designated 380 and 382. Three valves 402, 404, and 406, provide forward, reverse and hold functions, depending on which solenoids 408, 410, 412, 414, 416, and 418 in the rear attachment circuit 366 are energized. A valve 420 in the rear attachment circuit provides float, forward and reverse functions for a winch control, depending upon which solenoid associated therewith, none, 422 or 426, is energized. A larger capacity valve 370 is used to selectively power a motor circuit for an attachment such as a winch.

Figure 21:
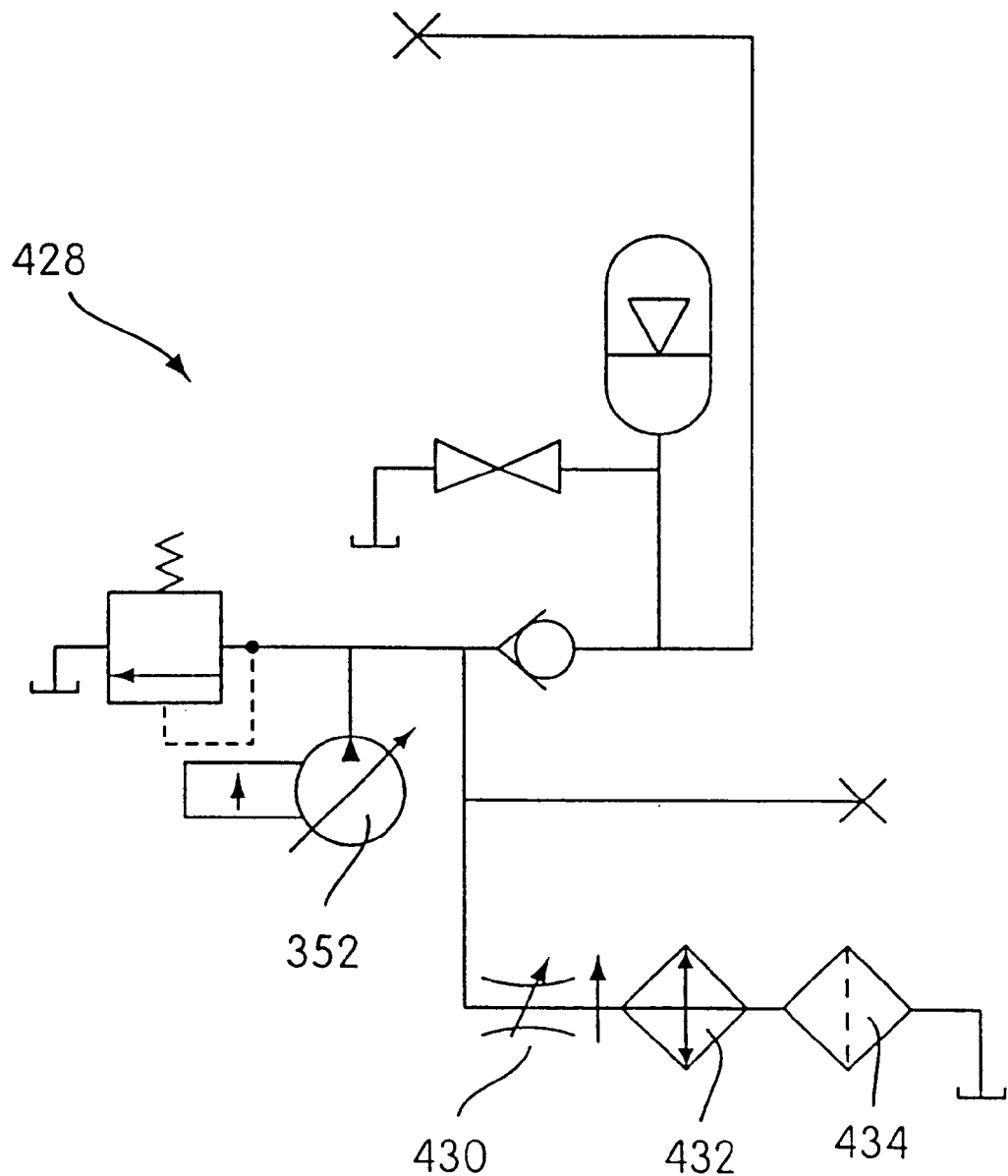
FIG. 21 is a schematic representation of a fourth portion of the alternative embodiment of the electronically controlled hydraulic circuit of FIG. 18 showing a cooling and filtration circuit.

An oil conditioning circuit is shown in FIG. 21 and is generally designated 428. A fraction of the hydraulic oil flowing from the open loop pump 352 is directed to the conditioning loop for oil cooling and oil filtration. The pressure compensated flow control valve 430, the oil to air cooler 432 and the filter 434 function in this circuit as described above in reference to the preferred circuit.

Figure 22:
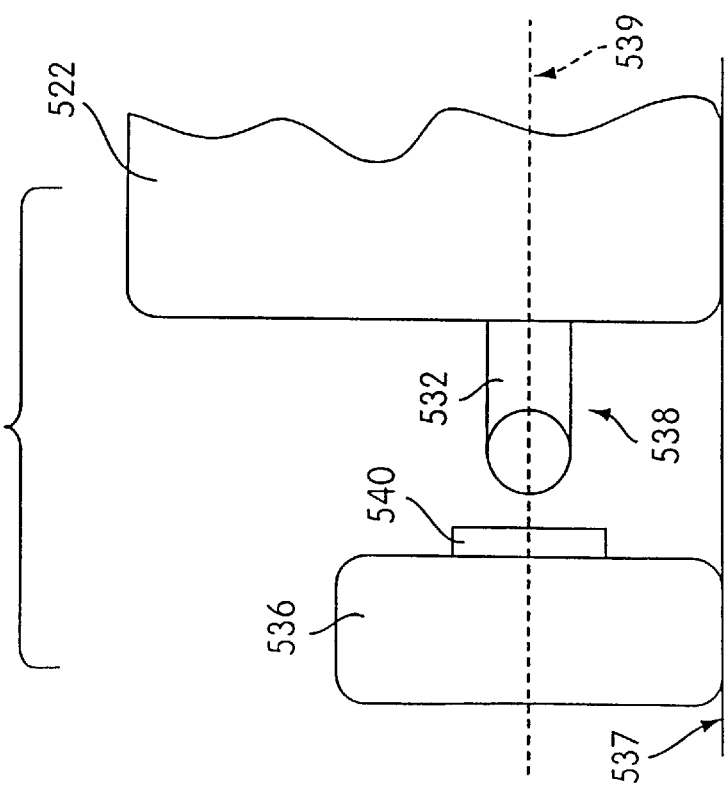
FIG. 22 is a fragmentary schematic front elevational view of a vehicle showing portions of the axle assembly mounted to a center wheel drive motor assembly shown in exploded view mounted to a wheel.

FIG. 22 is a front elevational view of the vehicle 10 showing the flanking wheels 536 in exploded relationship to the track assembly 522. The operator compartment is not shown to more clearly show the invention. A hollow cylindrical portion 532 of the axle assembly 538 secured to the main frame structure (not visible in FIG. 17) extends transversely therefrom essentially parallel to the ground surface 537. It will be understood that this hollow cylindrical portion 532 is a schematic representation of a portion of the axle assembly 538 and represents any of the axle structural types disclosed herein, both those that provide independent wheel rotation to effect steering through differential wheel speed or, alternatively, pivoting steerable wheels, including a half axle, a telescoping half axle, a transaxle with independent wheel rotation or a rigid axle structure.

A reference line designated 539 indicates the vertical position of the center of the wheel cylinder which is the rotational center of each wheel 536 and of the center of a center drive hub assembly 540 which may include a hydraulic motor unit to drive the associated wheel. It can be appreciated that the hollow cylindrical portion 532 of the axle assembly 538 and the hub assembly 540 are axially aligned with the reference line 539 which passes through the rotational center of each wheel 536. The hollow cylindrical portion 532 of the axle assembly 538 attaches to the center of the center drive hub assembly 540.

Figure 23:
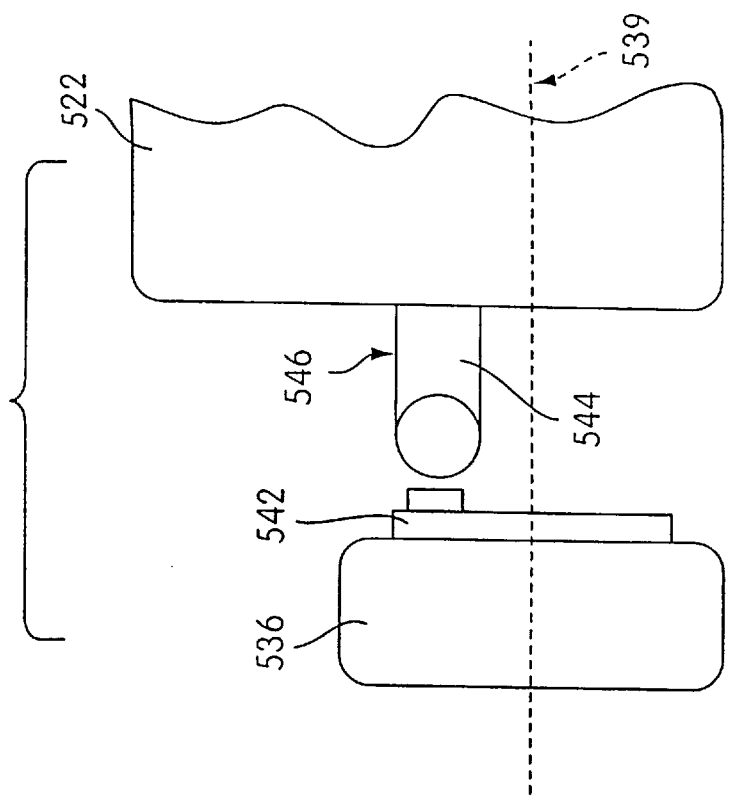
FIG. 23 is a view similar to FIG. 22 showing the axle assembly mounted to the wheel with an off-set gear drive assembly.

FIG. 23 is a view similar FIG. 22 but showing that an offset gear or chain wheel drive assembly 542 associated with each wheel 536 can be used in lieu of center drive hub assembly 540. Each wheel 536 is independently powered by a motor (not shown), as for example a hydraulic motor, to power the offset gear drive assembly 542. The hollow cylindrical portion 544 of the axle assembly 546 is fixed to the main frame structure (not visible) of the track assembly 522 at a higher vertical position than the position shown in FIG. 17. The reference line 539 is in the same vertical position relative to the ground surface, the track assembly 522 and the wheels 536 as in FIG. 22. The reference line passes through the center of the wheel cylindrical of each wheel 536 which is the rotational center of each wheel.

It can be appreciated that the hollow cylindrical portion 532 attaches to the wheel drive assembly 542 at a position off set from the center thereof and that a plurality of cooperating gear structures couple the motor (not shown) to the hub (not shown). It will be understood that the offset drive assembly 542 can be used with any of the axle assemblies shown or described herein including transaxles, half axles and rigid axles and can be used in conjunction with any of the suspension systems and/or any of the methods of mounting the axle assembly to the main frame structure of the track assembly.

It will be readily understood by one skilled in the art that both the center drive hub assembly 540 and the offset drive assembly 542 are schematic representations of broad categories of hub assemblies and are meant to be exemplary and not limiting.

Figure 24:
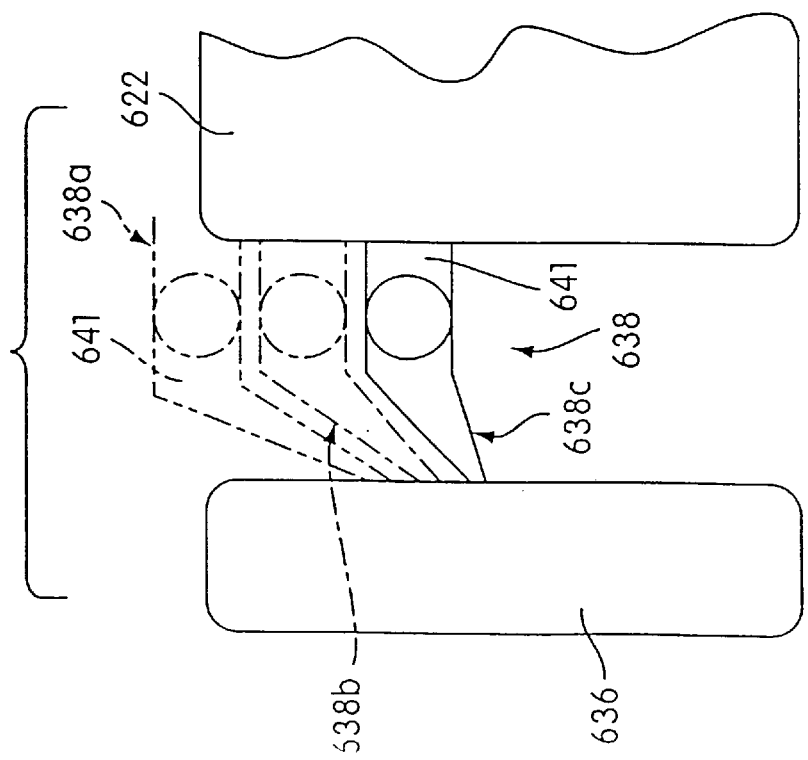
FIG. 24 is a fragmentary schematic front elevational view of a portion of the carrier vehicle showing various alternative positions in which an axle member thereof could be pivotally mounted to the main frame structure of the vehicle, including a first position shown in solid lines and second and third positions shown in phantom lines.

FIG. 24 illustrates that it is within the scope of the present invention to provide a plurality of embodiments of a high clearance axle assembly, generally designated 638, for the vehicle 10 which provide a wide range vertical clearance heights for a transverse portion 641 of the axle assembly 438 which extends between the track assembly 622 and an adjacent wheel 636. The various representative embodiments of the high clearance axle assembly 638 shown in FIG. 24 are designated 638a, 638b and 638c for reference and are schematic representations which show the range of structures contemplated and within the scope of the invention. A first representative embodiment designated 638a and drawn in phantom lines shows that is it within the scope of the invention to mount the axle assembly 638 above the track assembly 622 and for each end of the axle assembly 638 distal from the track assembly 622 to be mounted to an offset gear-type hub assembly (not shown).

FIG. 24 illustrates the configurations of two additional exemplary embodiments 638b and 638c of the axle assembly. These embodiments illustrate that the axle assemblies 638b, 638c can be secured to the track assembly 622 at various vertical locations within the envelope 28 and that the distal ends of each assembly 638b, 638c can be mounted at the center of the hub assembly (not shown) as in 638a or below the hub assembly (not shown). It can be appreciated that each embodiment of the axle assembly 638 represented in FIG. 24 is of the half axle type and each wheel 636 is independently, bi-directionally rotatable by, for example, a separate hydraulic motor associated with each wheel 636.

An advantage of the axle assembly 638 configurations shown in FIG. 24 is that various amounts of vertical clearance is provide between the transverse portion 641 of each axle assembly 638 and the ground. High amounts of clearance are advantageous in some applications of the vehicle 10 such as row cropping. It is contemplated that at least one embodiment of the vehicle 10 will be used for row cropping where the track assembly is driven between a row of crops and the wheels 636 are driven between adjacent spaces between rows. It will be understood that a row of crops will pass under each transverse portion 641 as the vehicle is driven between the crop rows.

FIG. 24 should not be taken to imply that all of the configurations of the axle assembly 638 would be on a single vehicle 10; rather, FIG. 24 illustrates in schematic form the various structural configurations the wheel assembly could assume and a possible position of each configuration of the wheel assembly on the vehicle 10.

The configuration of the axle assembly 638 shown in FIG. 24 is a basic configuration and it within the scope of the invention to provide a plurality of variations upon this structure by providing, for example, means for moving the axle assembly 638 vertically and/or longitudinally with respect to the track assembly 622 or means for repositioning the wheels 636 horizontally inwardly and outwardly with respect to the track assembly 222 by providing, for example, telescoping portions of the axle assembly 38 associated with each wheel 636. It is also contemplated to incorporate any of the suspension systems disclosed herein in the high clearance axle assembly 638. Some of these contemplated variations are shown schematically in FIG. 20.

Figure 25:
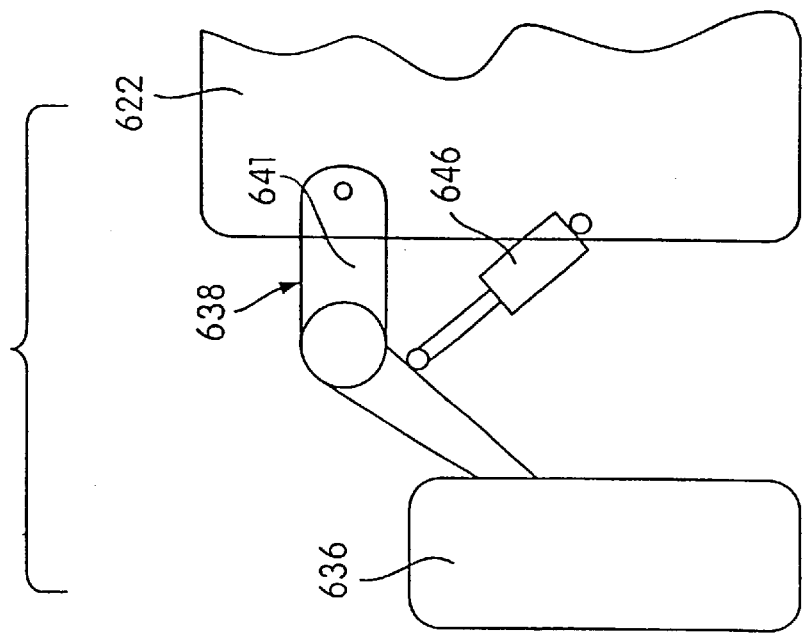
FIG. 25 is a fragmentary schematic front elevational view of a portion of the vehicle showing an example of a height adjustable axle assembly.

More specifically, FIG. 25 shows that either an independent suspension system can be combined with a high clearance axle assembly 638 configuration or a powered pneumatic cylinder can be combined with the axle assembly 638, or both. A cylinder structure 646 on each side of the track assembly 622 is mounted between the main frame structure and a portion of the axle assembly 638 and each cylinder structure 646 can represent either a damping cylinder or a hydraulic cylinder. When a suspension system is included in the axle assembly 638, one way in which the suspension may be provided is by providing a damping cylinder 646. Additional alternative embodiments of the suspension system can be provided by incorporating any of the suspension systems described or shown herein, including the suspension systems shown in FIGS. 7–9 in the high clearance axle assembly.

In the embodiments of the axle assembly 638 in which the cylinder 646 of FIG. 25 is a hydraulic cylinder, each inner portion 641 of the axle assembly 638 is pivotally connected to the main frame and can be vertically pivotally repositioned with respect to the track assembly 622 by extending or retracting the respective cylinder 646, each of which is in fluid communication with a hydraulic pump (such as pump 234) operatively connected to the gear box 54 of the power unit 51. Retracting the cylinder 646 pivots the inner portion 641 upwardly so that it may pass over particularly high rows of crops.

Figure 26:
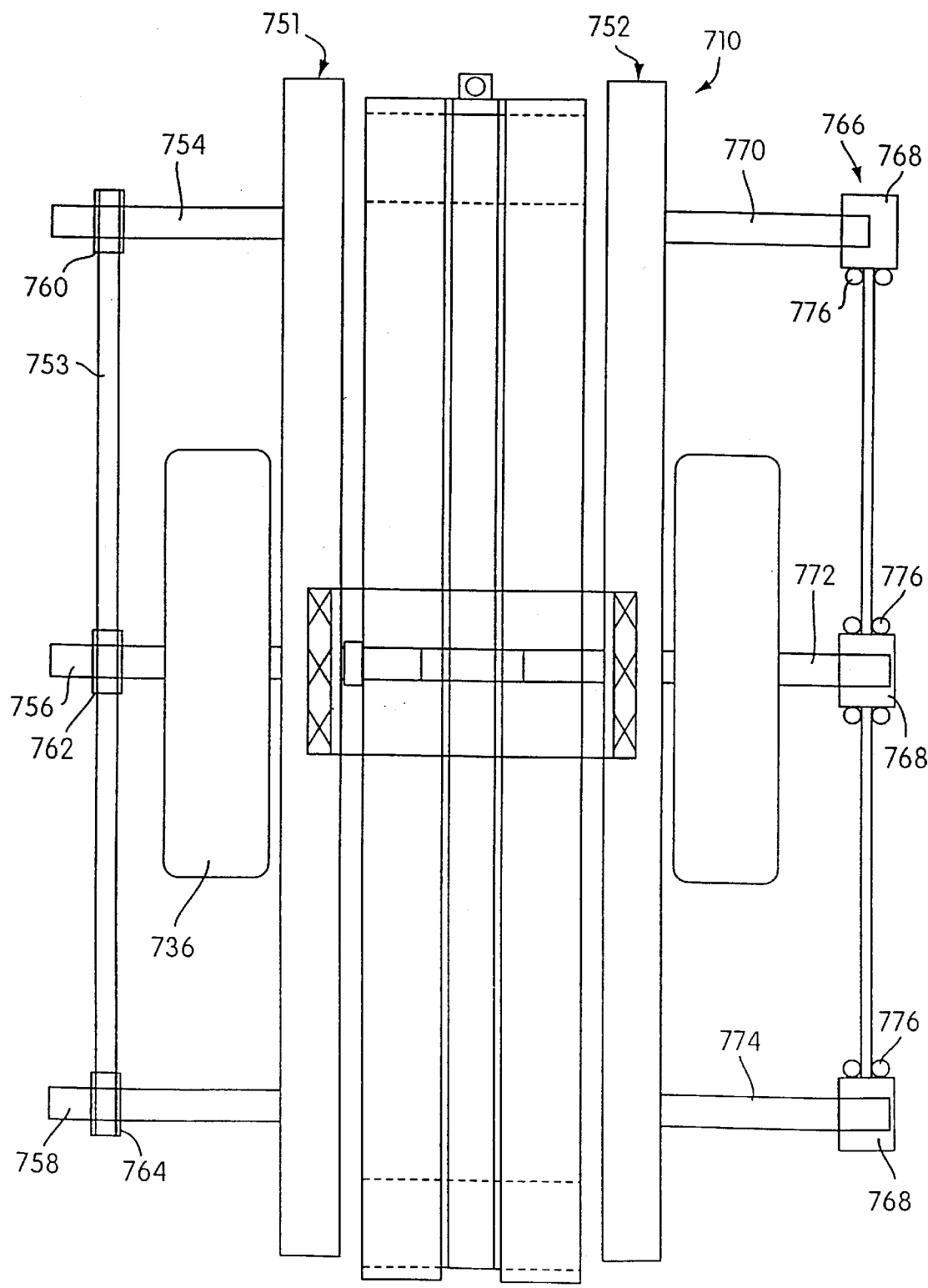
FIG. 26 is a schematic top plan view of the track assembly and the wheel assembly showing two alternative drive assemblies for the track and wheel assemblies including a chain or belt driven drive assembly and a gear driven assembly.

FIG. 26 is a schematic top plan view of the vehicle 10 that illustrates that a plurality of alternative mechanical drive mechanisms such as sprockets, belts or drive shafts can be incorporated in the vehicle 710 to transmit power from a power source mounted within or outside of the envelope (not visible in FIG. 26) of the track assembly 722 to drive the track 726 alone or to drive the track 726 and wheels 736, depending on the application to which the vehicle 710 is put and the operating conditions of the vehicle. The power source can be an internal combustion engine, a flywheel assembly or any other power source disclosed herein or know to one skilled in the art. It can be appreciated that, depending on the power source of the vehicle 710, the wheels 736 may drive the track 726 or the track 726 may drive the wheels 736. Various combinations using mechanical clutches or reversing clutches are within the scope of this invention.

A drive system is represented schematically in a block diagram indicated at 751. This block diagram represents a drive chain or drive belt 753 in the form of a closed loop interengaged with sprocket structures (not shown) or similar structures on a plurality of shafts 754, 756, 758 mounted at the center axes of front, middle and rear drive wheels 760, 762, and 764, respectively. The drive wheels 760, 762 764 are rotatably mounted within the envelope of the track assembly 722 to drive the track 726. All of these components would usually be located in the area marked off by block 751. However, in order to easily illustrate the various components, they are being shown outside of the block 751. In this drive system 752 one of the shafts, as for example the central shaft 756, is powered and the drive chain 753 transmits power from the powered shaft to the other shafts, 754 and 758 in this example. Clutch assemblies, one associated with each wheel 736, facilitate independent rotation of each wheel 736 for steering of the vehicle 710.

An alternative drive system, generally designated 766, is shown on the right hand side of FIG. 26. This drive system 766 can be installed in the location indicated by the blocks 751 and 752 and comprise a plurality of gear boxes 768, drive shafts 770, 772 and 774, (mounted in a manner similar to the drive shafts 754, 756 and 758, respectively) and clutch assemblies 776. It is contemplated to drive one of the shafts, as, for example, the central shaft 772, to selectively drive the shafts 770 and 774 by engaging the gears within the respective gear boxes 768.

Figure 27:
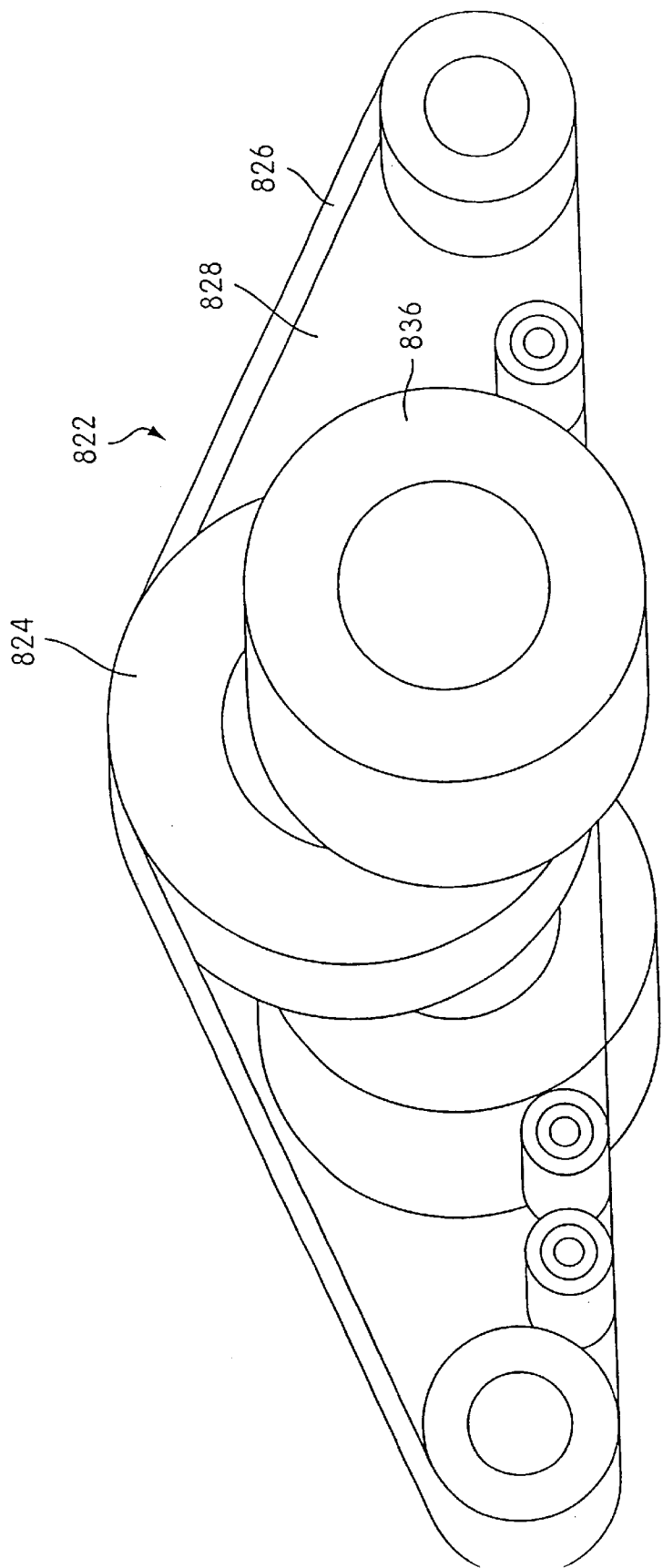
FIG. 27 is a schematic view of the track assembly and the wheel assembly showing the wheel assembly mounted to a central drive shaft of the track assembly.
Figure 28:
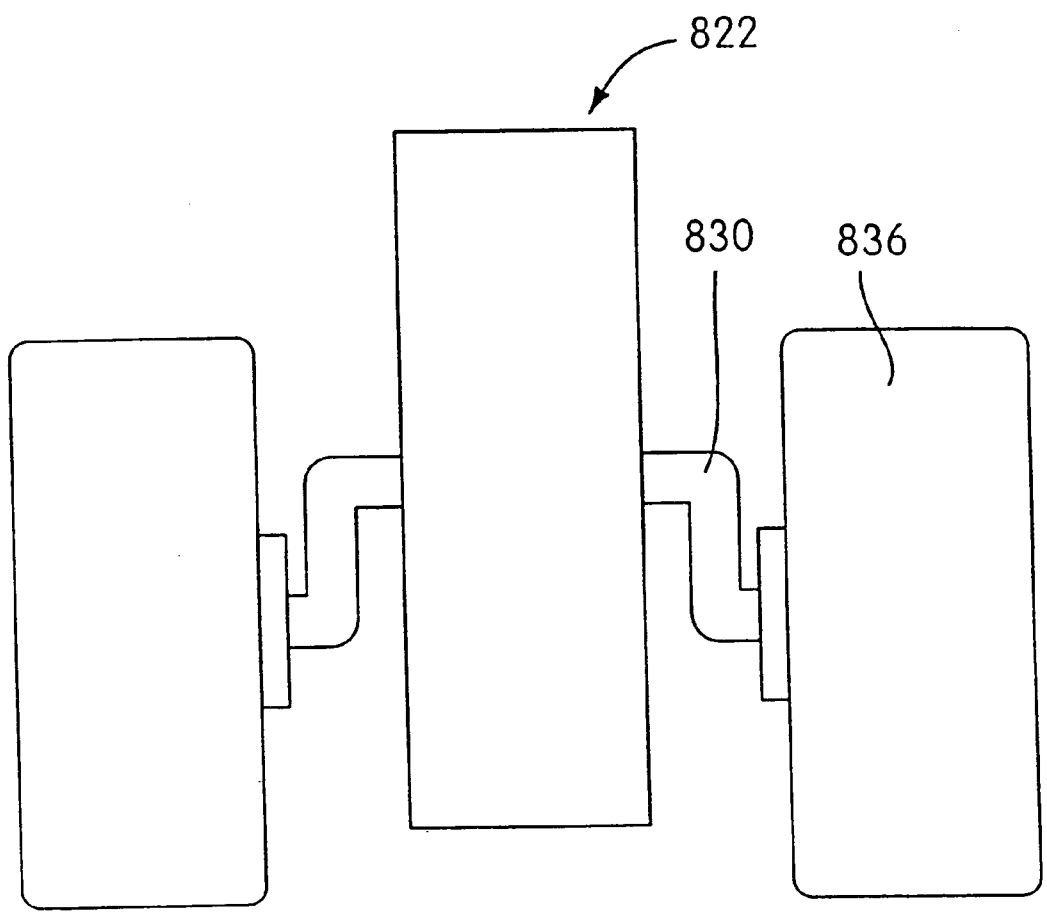
FIG. 28 is a schematic front elevational view of the track assembly and wheel assembly of FIG. 27.

FIGS. 27–28 shows a side elevational schematic view of a track assembly 822 showing a large central drive wheel 824 at the center of the envelope 828. The central drive wheel 824 is mounted on a central shaft 830 which is connected through a clutch assembly (not shown) and driven by the power unit (not shown). The central shaft 830 is connected through a series of gear structures and a clutch mechanism to each central flanking wheel 836 for selective, independent and variable speed rotation of the same.

It is contemplated to embody the central shaft structure as a straight through power shaft structure which drives the track 826 and the flanking wheel 836. When a straight through drive shaft is used, the central track drive wheel 824 and the two flanking wheels 836 are driven by a single central rigid axle. The rigid axle is driven by a power source such as a hydraulic motor or, alternatively, by an internal combustion engine which is coupled thereto by a conventional mechanical transmission. When the straight through power shaft structure is used the axes of rotation of the central wheel 826 and the two wheels 836 are linearly aligned. Vehicle steering can be accomplished by pivotally steering the wheels 836 or alternatively by rotating the wheels 836 at different rotational speeds relative to one another. When steering is provided by driving the wheels 836 at different rotational speeds, each wheel 836 can be individually clutched to provide independent free wheel operation for each wheel 836. Steering would then be accomplished by free wheeling one wheel and turning the vehicle by powering the other wheel.

The forward vehicle speed would be controlled by the hydraulic motor speed or, alternatively, by the gearing of the transmission in a conventional manner if a mechanical transmission were used.

One skilled in the art will also understand that this central shaft structure can be supported by any of the suspension systems disclosed herein and that because the central shaft structure is coupled to each wheel 836 through a clutch structure, the wheels are rotationally independent.

FIG. 29 is a schematic view similar to FIG. 27 except that FIG. 29 includes two central flanking track assemblies 810 that can be operated at different rotational speeds to steer the vehicle 10 left or right in either the forward or the reverse directions. The flanking tracks 840 are each capable of independent freewheel operation or opposite rotation to provide the turning modalities. Each flanking track 840 is preferably oval as shown in FIG. 29 in order to minimize the ground contact area and the ensuing damage to the ground when turning.

Each flanking track 840 can be independently powered by, for example, a separate hydraulic motor provided in each flanking track assembly. The hydraulic motors may be like motors MB and MC discussed above. The flanking tracks 840 can be either on opposite ends of a single transaxle or can each be mounted to the free end of a half axle which is pivotally or rigidly mounted to the main frame structure of the track assembly. Any appropriate suspension system or, alternatively, powered repositioning system, including those previously discussed, can be used with the flanking tracks. A telescoping axle can also be used with the flanking tracks. Likewise, any of the fixed or adjustable high clearance axle assemblies previously discussed may also be used in conjunction with the flanking tracks as well.

Figure 30:
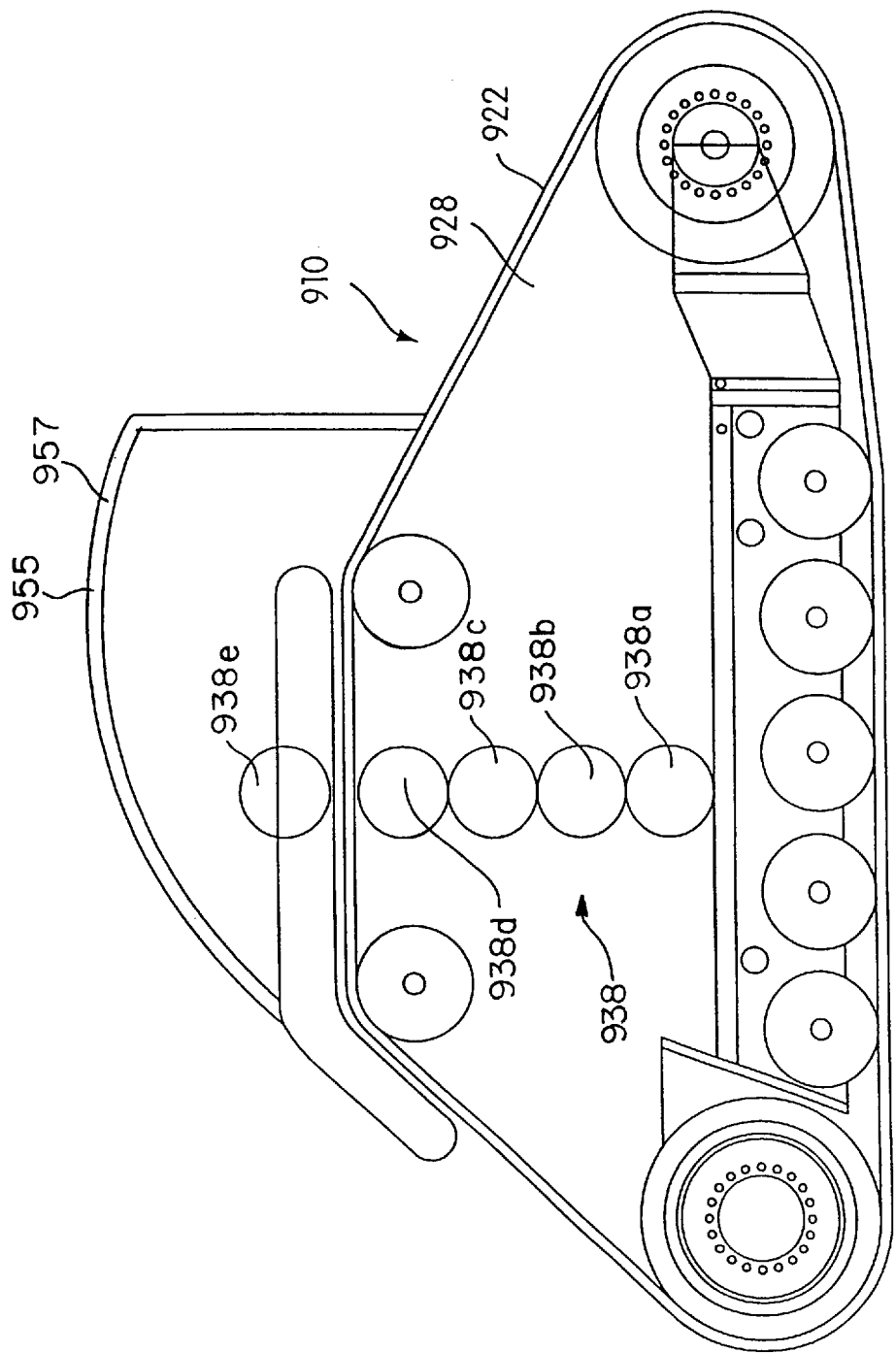
FIG. 30 is a schematic side elevational view of a portion of an embodiment of the vehicle showing a centrally positioned operator compartment and illustrating a plurality of alternative points of attachment for a wheel assembly.

The embodiment of the vehicle 910 shown in FIG. 30 illustrates various exemplary vertical positions that an axle assembly, generally designated 938, can assume with respect to the main frame structure 912 of the track assembly 922. These vertical positions are indicated by a series of circles, designated 938*a*–938*e*. Each circle is a schematic representation of an end view of the axle structure which extends from the main frame structure to the wheel hub. These various vertical positions can be realized in one of two ways: 1) by mounting the axle assembly 938 fixedly in one of these positions, in which case the circles 938*a*–938*e* would represent alternative positions at which the axle assembly is mounted to the main frame structure of the 922, or 2) by movably mounting the axle assembly 938 within the envelope 928, for selective vertical repositioning within the envelope 928 in which case the circles 938*a*–938*d* would represent various adjusted operating positions of a single axle assembly. In the latter case, the axle assembly 938 could occupy any vertical position within the range of positions represented by 938*a*–938*d*. It can be seen in FIG. 30 that the axle assembly 938 may also be mounted above the envelope 928 as mentioned above.

The axle assembly that is represented schematically in FIG. 30 can include any embodiments disclosed herein, including all telescoping embodiments. The embodiment in FIG. 30 also includes a centrally positioned operator compartment 955 which is covered by a rollover protection structure 957 which is preferably made of steel and is strong enough to resist significant deformation in the event of a rollover-type accident. It is also contemplated to provide a carrier vehicle constructed without the operator compartment, with the operator compartment located inside the envelope of the track assembly 222, or with the operator compartment located outside of the envelope in a forward, central or rearward position. It is contemplated to provide a vehicle without an operator compartment when the vehicle 10 will be used for computer controlled or remote controlled operations when a human operator is not occupying a portion of the vehicle.

Figure 31:
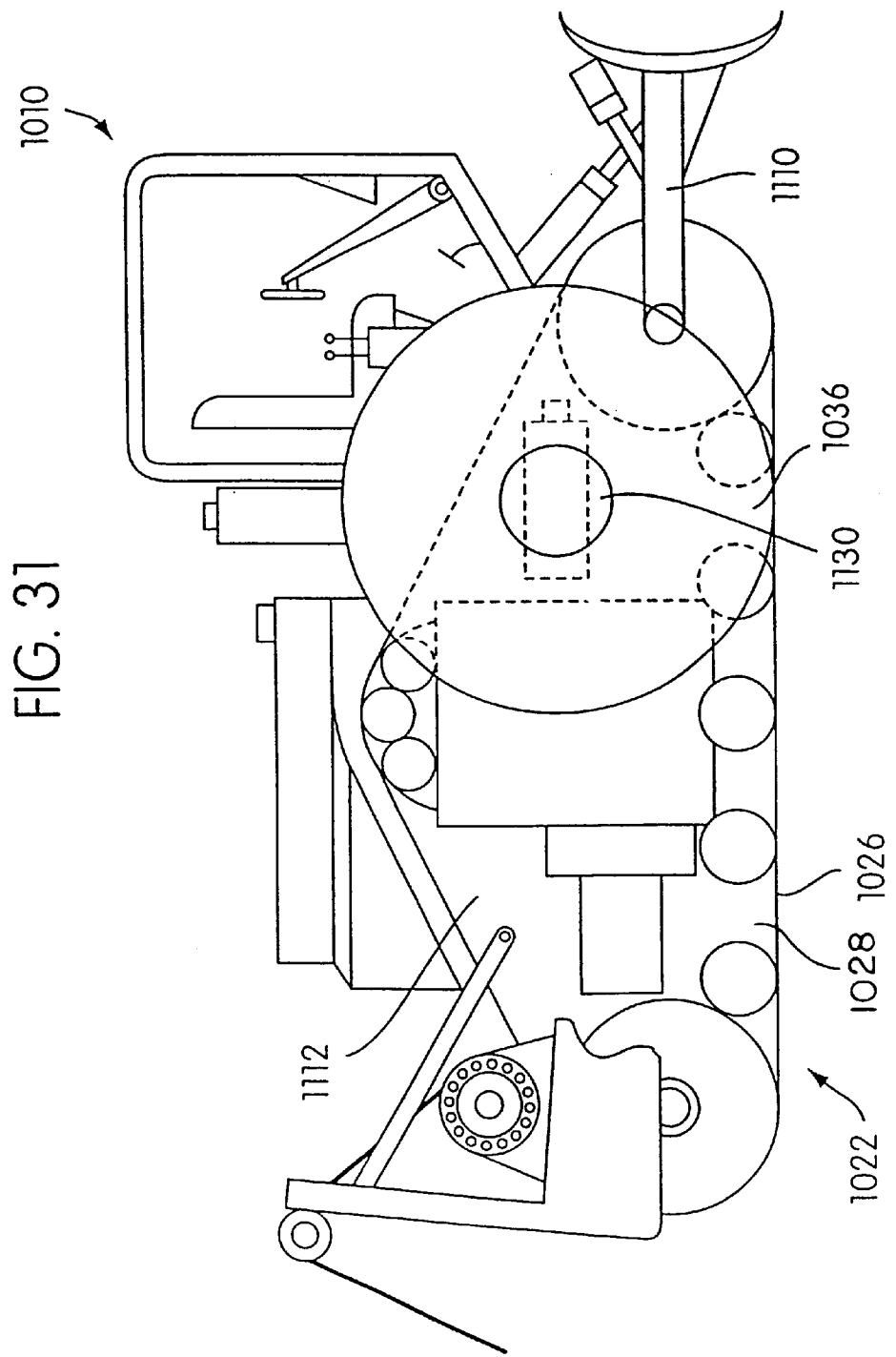
FIG. 31 is a schematic illustration of the vehicle of the invention having a vertically movable axle assembly.

FIG. 31 shows another embodiment of the carrier vehicle 1010 of the invention. The vehicle 1010 is employed as a bulldozer having a bulldozer attachment 1110. The axle assembly 1130 shown is a rigid axle like the one designated 200 shown in FIG. 10 and is movable vertically within the envelope of the track assembly by, for example, using a pneumatic bag mounting as disclosed in the '748 patent which has been incorporated in its entirety by reference. With reference to FIGS. 10 and 31, the pneumatic air bag device (not shown) may be mounted between an upper frame member of the frame structure 1112 and the hinged saddle 203 that extends to the back of the axle assembly 204. The saddle 203 is coupled to the frame structure 1112 via hinge pins 205.

Upon inflation, the air bag of the device pushes the axle assembly 200 and the wheels 1036 downwardly within the envelope, thereby raising the track 1126 off the ground at the fore end of the vehicle 1010 and increasing the ground bearing pressure at the wheels. Thus, the wheels 1036 and only the aft end of the track 1026 are in ground contact. In this position, it can be appreciated that turning of the wheels 1036 would result in turning of the vehicle 1010 about a small turning radius because the tractive forces are only at the wheels 1036 and at the aft end of the track 126. Because a portion of the driven track 1026 is out of ground contact, improved mobility of the vehicle 1010 is achieved. In addition, raising the fore and of the track 1026 off the ground reduces damage to the soil as the vehicle turns. Limit stops 201 (FIG. 10) may be provided between the air bag device and the axle assembly 200 for restricting oscillatory movement of the axle assembly 1130. When the air bag of the device is caused to deflate, the axle assembly 1130 will move to a vertical position such that the track 1026 and the wheels 1136 are each in full contact with the ground.

It can be appreciated that when any of the axle assemblies described herein is movably mounted within envelope 1028 shown in FIG. 31, the distribution of weight and tractive effort between the wheels 1036 and the track 1026 can be adjusted for improved driving and steering of the vehicle 1010.

In addition, other devices, such as hydraulic or air cylinders (not shown) coupled between, for example, the portions of the axle assembly 1130 and the main frame structure 1112 of the track assembly 1022, may also be used to raise or lower the axle assembly 1130 within the envelope 1028 of the track assembly 1122.

The power source shown schematically in FIG. 31 can represent an internal combustion engine, an electromechanical flywheel assembly, an electric generator, a battery, a fuel cell, a human powered mechanical power source or any type of energy storage device known to one skilled in the art. Also, the tractive drive or drives and the wheels drive or drives may be either electrically powered, hydraulically powered, mechanically powered, or powered by a combination thereof.

Figure 32:
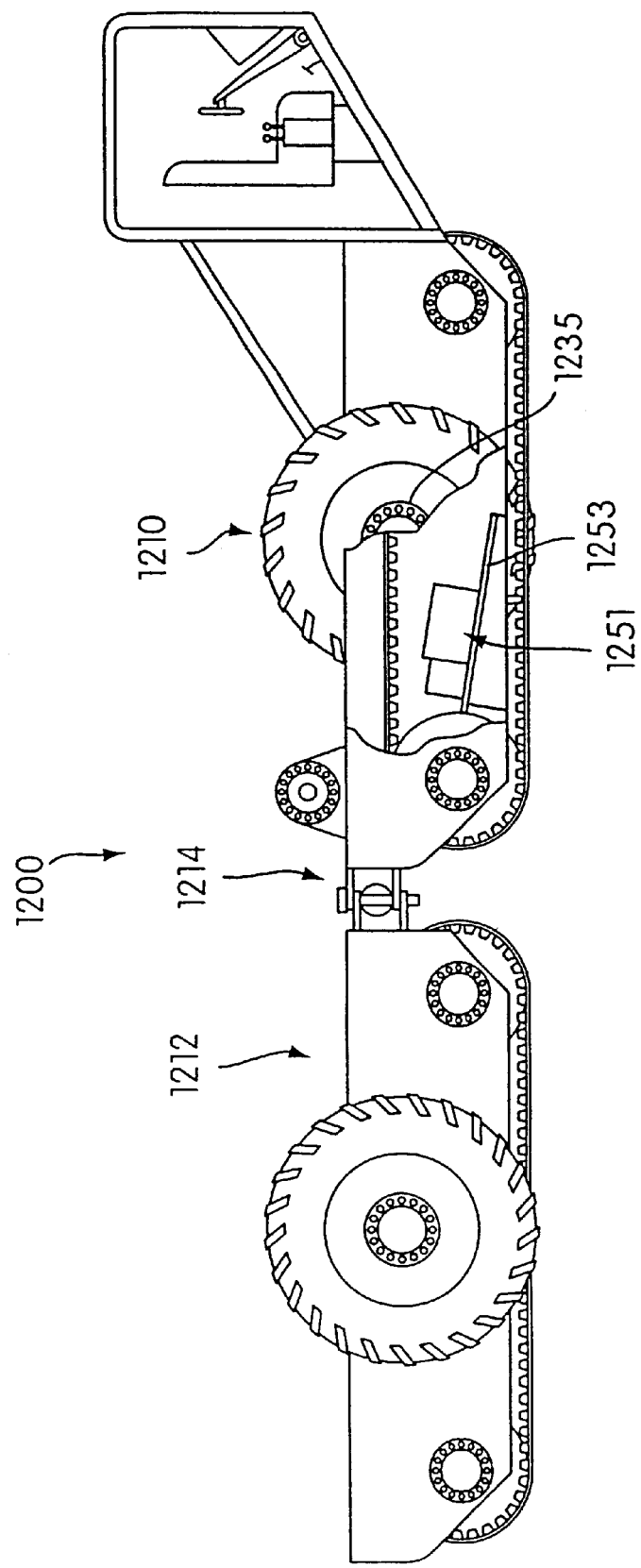
FIG. 32 is a schematic side elevational view of a tandem vehicle embodying the principles the present invention.

With reference to FIG. 32, it is within the scope of the present invention for the axle assembly 1235 and the power unit 1251 to be fixedly mounted on a movable member, shown schematically and generally indicated at 1253 in FIG. 32, so as to be selectively movable within the envelope 1228 in both the horizontal and vertical directions. The details of the construction, mounting and operation of the movable member 1253 are fully disclosed in the previously incorporated '748 patent and will not be repeated in detail herein. As shown in FIG. 32, the axle assembly 1238 and power unit 1251 are mounted on the movable member, generally indicated at 1253 so as to advantageously change the fore and aft center of gravity per the load or the attachment or to compensate for various surface conditions which may prevail, and to change the driving and steering geometry in any working conditions.

With continued reference to FIG. 32, a tandem carrier vehicle 1200 is shown therein, embodying the principles of the present invention. The tandem vehicle 1200 includes a front powered vehicle 1210, which is substantially similar to the vehicle 10 of FIG. 1. However, vehicle 1210 is provided with an articulated connection 214 at the aft end thereof. A rear vehicle 1212 is coupled to vehicle 1210 at the connection 1214. Each vehicle 1200, 1210, is provided with individually powered flanking wheels and each wheel in both vehicles is controlled by an appropriate control assembly in the operator compartment of the vehicle.

It is within the scope of the invention to provide vehicles 1210 and 1212 with track profiles which are shorter than the profile of the single vehicle 10 of FIG. 1. Further, the vehicle 1210 may be provided with a fixed axle assembly 1235, a vertically movable axle assembly or a movable axle assembly and movable power unit, with driven and steerable or non-steerable wheels, as discussed above. Any of these axle assemblies may optionally include any suspension system disclosed herein. Vehicle 1212 preferably has a fixed, axle assembly 1232.

The track and wheels of the rear vehicle 1212 are driven by the power drive structure 1251 of vehicle 1210. Thus, the rear vehicle 1212 includes the appropriate hoses originating from vehicle 1210 to provide the hydraulic power necessary to drive the track and wheels of the first and second vehicles simultaneously. The rear vehicle 1212 may also be provided with wheels capable of both different rates and directions of rotation to independently steer the rear vehicle 1212.

For the best results, the wheels 36 should be disposed at the center of gravity of the vehicle to increase their tractive force. Thus, even though the driven track 26 will try to maintain movement of the vehicle in the particular direction of vehicle travel, when the wheels 36 are rotated at different rotational rates to steer the vehicle 10, the track 26 will turn. This occurs because the wheels 36 exert sufficient ground bearing pressure to turn the track 26 and change the vehicle's direction of travel by virtue of the different rotational rates of the wheels 36. FIG. 1, however, shows that the wheels can be positioned at the fore or aft end of the vehicle, depending on the way the vehicle will be used.

Since the vehicle of the invention may traverse uneven terrain, there may be a need to compensate for any vehicle yaw. If one wheel rises with respect to the other, for example, if one wheel runs over a stump, oscillation of the vehicle and track mount may occur. This oscillation or yaw can be compensated for by providing, for example, shock absorbers, springs, or rubber blocks between the frame structure and wheel axles.

Figure 33:
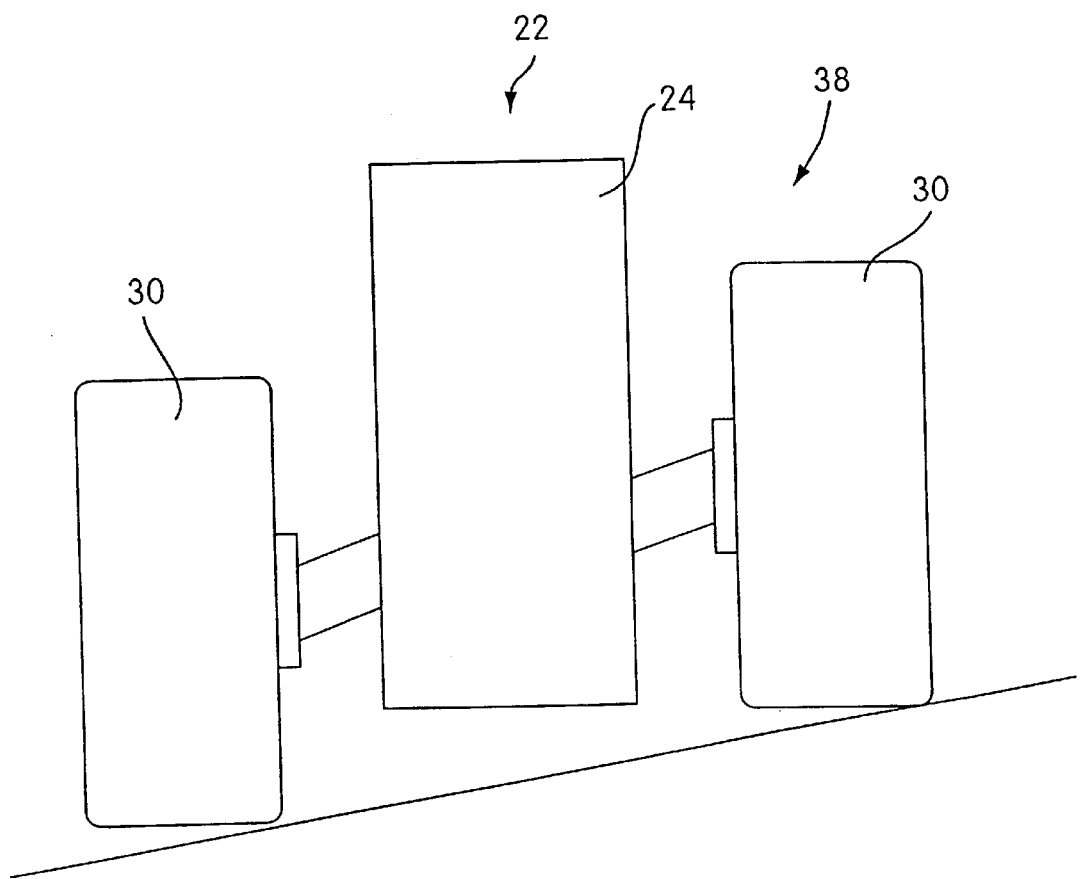
FIG. 33 is a front schematic view of the vehicle on a sloped surface showing the wheel assembly configured and positioned to provide lateral support therefor

Because the axles in many of the above described embodiments are pivotally attached to the main frame structure of the track assembly and because the wheel assembly can be constructed to provide lateral support and stability for the track assembly, a plurality of embodiments of the vehicle 10 can easily be constructed for stable operation on sloped surfaces. FIG. 33 schematically shows an exemplary embodiment of the vehicle with the wheels 30 thereof vertically repositioned for use on a sloped surface. The vehicle of FIG. 33 is positioned across the gradient of a sloped surface and each transversely extending portion of the axle assembly 38 is independently pivotable with respect to the track assembly. Any of the disclosed pivoting mechanisms described herein can be used to pivotally mount each axle assembly 38 to the main frame structure of the track assembly 222.

The pivotal movement of each axle assembly 38 is under the control of the vehicle operator so that the operator can easily position each wheel to maintain the track assembly 222 in an essentially upright position. Any of the disclosed suspension systems can be used with the pivoting wheels to increase stability and maximize the ground engagement on sloped and other surfaces.

Figure 34:
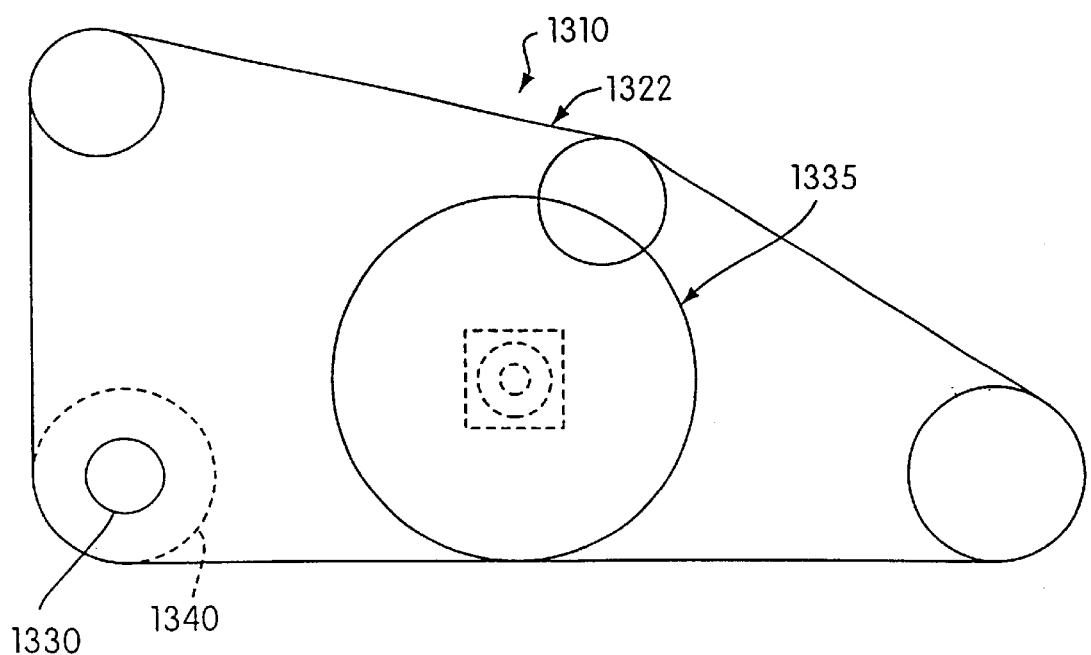
FIG. 34 is a schematic side elevational view of an alternative embodiment of the vehicle showing a track drive drum, a wheel drive motor, a drive shaft and an axle housing in phantom lines.
Figure 35:
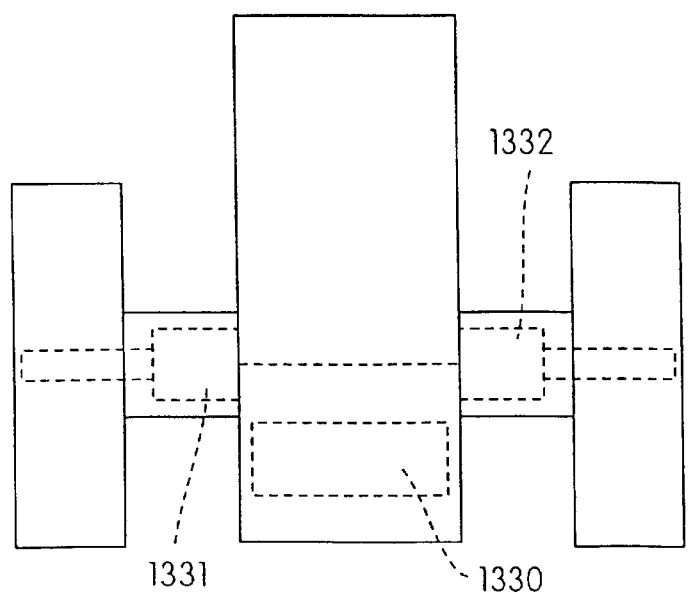
FIG. 35 is a schematic front elevational view of the vehicle of FIG. 34 showing a track drive motor, a plurality of wheel drive motors and a plurality of drive shafts in phantom lines.

FIGS. 34 and 35 are schematic representations of the locomotion system for the track assembly 1322 and the flanking wheels. The front elevational schematic of FIG. 35 shows the general locations of the track drive motor 1330 and the wheel drive motors 1331, 1332. The positions of the track drive motor and the wheel drive motors within the envelope is indicated in the side elevational schematic of FIG. 34. A conventional drive track drum 1340 indicated in phantom lines.

The hydrostatic transmission motor 1330 is directly coupled to the track drive drum 1340. The linear velocity of the track, and hence the vehicle velocity, is proportional to the flow rate of the fluid in the driving motor. Because the flow rate of the fluid is proportional the fluid displacement of the associated pump, a change in the pump displacement changes the track velocity. Motors 1330, 1331 and 1332 are conventional and can be the same commercial embodiments listed above for motors MA, MB and MC, respectively.

Figure 36:
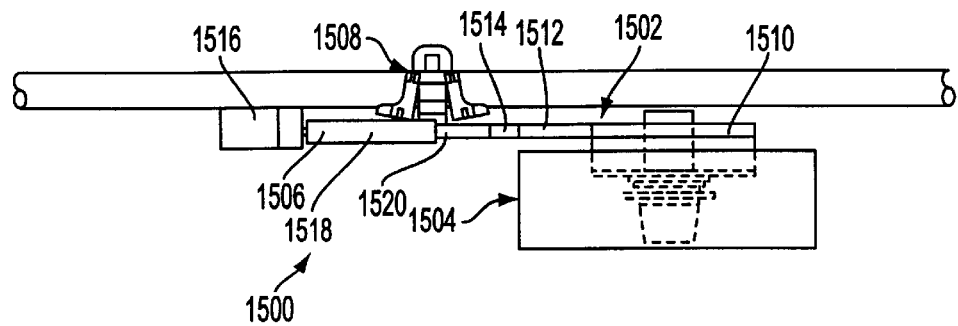
FIG. 36 is a partial top view showing an alternative axle assembly with an arm extending generally rearwardly along side the track.
Figure 37:
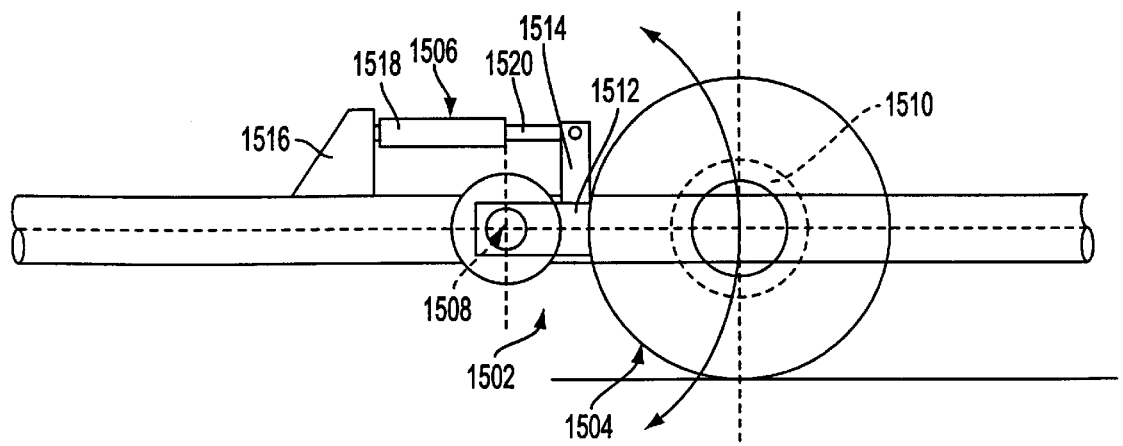
FIG. 37 is a partial side view of the alternative axle assembly of FIG. 36.

FIGS. 36 and 37 show top and side views, respectively, of an alternative secondary driving assembly 1500. Only one secondary driving assembly 1500 is shown, but it is to be understood that there is a secondary driving assembly 1500 mounted on each side of the vehicle. The secondary driving assembly 1500 includes an axle assembly 1502, a wheel 1504, and a vertical axle moving device in the form of a hydraulically operated extensible and retractable piston 1506. The axle assembly 1502 has a frame mounting portion 1508 pivotably mounted to the main frame structure (which may be the frame of any embodiment of the vehicle described hereinabove) and a wheel mounting portion 1510 on which the wheel 1504 is rotatably mounted. The wheel mounting portion 1510 houses a hydraulic motor, such as motors MB and MC discussed above, for rotating the wheel 1504 using pressurized fluid from the engine assembly of the vehicle (which may be any of the engine assemblies or power drive structures described hereinabove).

The axle assembly 1502 also includes an arm 1512 that extends generally rearwardly from the frame mounting portion 1508 to the wheel mounting portion 1510 alongside the track assembly (not shown), preferably parallel to the track assembly. An arm connecting bracket 1514 extends upwardly from the arm 1512 and a frame connecting bracket 1516 is provided on the frame structure. One end of the hydraulic cylinder (preferably the end of its cylinder 1518) is pivotably connected to the frame connecting bracket 1516 and the other end of the hydraulic cylinder (preferably the end of its extendible rod 1520) is pivotably connected to the arm connecting bracket 1514.

To move the wheel 1504 generally downwardly, pressurized fluid is supplied to the cylinder 1506 such that the rod 1520 thereof extends to pivot the arm 1512 about the axle assembly's frame connecting portion 1508. As shown in FIG. 37, the arm 1512 will pivot in a clockwise manner. This action moves the wheel 1504 downwardly in a generally vertical manner. Conversely, to move the wheel 1504 generally upwardly, pressurized fluid is withdrawn from the cylinder 1506 such that the rod 1520 thereof retracts to pivot the arm 1512 about the axle assembly's frame connecting portion 1508. During this motion, the arm 1512 pivots counterclockwise as shown in FIG. 37 to move the wheel 1504 upwardly in a generally vertical manner. The advantage of this arrangement is that the wheel 1504 remains vertically aligned throughout its entire movement, thereby maintaining the bottom surface of the wheel 1504 generally parallel to the ground. In contrast, with axle assemblies that pivot about axes that extend parallel to the track, the vertical alignment of the wheels constantly changes, causing unnecessary wear on certain portions of the wheels and effecting its traction capabilities.

When the vehicle is used as an anti-personnel mine vehicle, the vehicle platform is a relatively small unit and is operated remotely. The low center of gravity and the two wheel/one track arrangement enable the vehicle to traverse the most difficult terrain. The vehicle has a very small footprint pressure of approximately one p.s.i. for a 21,000 twenty one thousand pound prototype. This ensures minimal disruption of the ground. The vehicle's low center of gravity allows it to travel side ways on slopes which are up to sixty degrees. The vehicle can make a three hundred and sixty degree turn in place. Sealed motor drives which have been developed by Solomon Technologies for marine applications make the vehicle usable in a broad range of environments from desert regions to swamps.

The preferred drive motors for demining operations have the trade name Electric Wheel. These motors contain highly efficient DC permanent magnet motors that have a transmission incorporated in the motor. The Electric Wheel is a relatively simple drive that has fewer than ten moving parts. The transmission portion ensures that sufficient torque is available for rugged terrain.

The preferred power plant is an electromechanical battery that has been developed and patented by U.S. Flywheel Systems of Newberry Park, Calif. These power plants are generally disclosed in U.S. Pat. Nos. 4,370,899, 5,124,605, 5,268,608, and 5,614,777, each of which are herein incorporated by reference in their entirety. These batteries have an energy density storage capacity twice that of a conventional lead acid batteries and a power density five to ten times greater than lead acid batteries.

The flywheel design results in an energy storage system that is safe, can be easily charged from a variety of electrical sources and can provide a reliable source of clean, stable electrical energy. The system uses a small commercially available internal combustion engine that is in the range of five to ten horsepower. The overall unit is therefore small, light and efficient. This results in a smaller vehicle platform that can access a wider range of places such as forests, rocky terrain and so on than currently available and used landmine vehicles.

The flywheel provides electric power to drive an electric motor. The electric motor powers a conventional gear box which drives the hydraulic pumps. Alternatively, the flywheel can drive an electric motor to power the wheels or it can drive transmission pump motors. The flywheel design also has ample energy not only to move the vehicle but also to supply electricity for detection and communications equipment on the vehicle. Enviromeasure has successfully developed gamma ray detection instruments and neutron activation analysis devices for rapid chemical composition analysis. These instruments can be used in various applications including identification of agricultural grains and the location of buried deplete uranium shells on military firing ranges. Because these instruments look for specific signature signals for elements found in explosives such as nitrogen and chlorine false positive signals are kept to a minimum.

It is contemplated to use multiple gamma ray detectors on a vehicle to obtain the profile of the ordinance buried in a particular area and to pinpoint their locations and depths. Because of the small cross-section capture of neutrons and gamma rays in soil, landmines buried up to a foot can be detected. The detection system built by Enviromeasure for detecting buried depleted urnamium shells was tested at the capital Yuma firing range and it accurately detected buried shells at speeds from one to two feet per second.

It is contemplated to use this same detection system for the land mine detection vehicle. Similar travel speeds should be attained. Because of recent advances in gamma ray detectors and neutron generators and because of advances made in computer processing for analytical instruments, the overall size of the detection system incorporated in a land mine detection vehicle would be less than fifty pounds and would have a power requirement of from one hundred to two hundred watts.

This detection system could easily be mounted on the above specified small platform vehicle. It is also contemplated to use the vehicle for mapping of detected mines using a GPS (Global Positioning System) satellite system, remote operation using a combination of video and artificial intelligence to traverse a particular area, automated destruction of located detected land mines, a radar sensor system to compliment the neutron activation analyzer and the development of multiple robot units that are controlled by a central mobile command station.

It is also contemplated to modify the hybrid electric flywheel powered system for use in the lumber, agriculture, construction and mining industries. This hybrid electric vehicle would have the tractive and propulsive of a bulldozer, the mobility of a four wheel loader and a lower footprint pressure than any tractor currently on the market. The vehicle would also have a smaller internal combustion engine and fewer components than any conventional vehicle. This means that the vehicle would be lighter, more efficient, less expensive and easier to maintain than conventional vehicles.

It is also contemplated to use the neutron activation detection system mounted on the vehicle for various environmental and industrial site inspections to locate various environmental contaminants.

The vehicle may also be used in the location of various metal ores during deep mining or strip mining operations.

The vehicle of the present invention may also be designed so as to be suitable for unmanned underwater operations. Such an unmanned underwater vehicle would be equipped with appropriate technologies for use in very shallow water (VSW)/surface zone (SZ) mine countermeasure missions (MCM).

The vehicle would be equipped with appropriate sensory, communications, navigation, signaling and neutralization equipment to enable the detection, classification, identification, mapping/reporting and neutralization of moored, bottomed and buried mines in the near shore very shallow water (VSW) region in support of Explosive Ordnance Disposal and VSW mine countermeasures missions. VSW missions are nominally considered to be 10 feet to 40 feet in depth.

It can be appreciated that the vehicle 10 of the invention can be modified without departing from the principles of the invention. For example, although hydraulic power is disclosed for operating the vehicle, other known modes of power can be used. It is also within the contemplation of the invention to adjust the size of the vehicle so as to be employed as a child's toy. Thus, manual power, such as pedaling, or battery power may be used to propel such a vehicle. Further, the vehicle may be adapted for use as a recreational vehicle.

In addition, although the engine and/or power unit is disclosed as being mounted within the envelope of the track, it is within the contemplation of the invention to mount the engine and/or power unit anywhere on the vehicle. For example, the engine and/or power unit may be mounted near the operator's compartment. Further, the engine and/or power unit need not be movable, but may be fixed with respect to the main frame structure.

It thus will be seen that the objects of this invention have been fully and effectively accomplished. It will be realized, however, that the foregoing preferred embodiments of the present invention have been shown and described for the purposes of illustrating the structural and functional principles of the present invention and are subject to change without departure from the spirit and scope of the appended claims.

What is claimed:

1. A vehicle comprising:
   a main frame;
   a driving track assembly mounted in supporting relation to said main frame, said driving track assembly including an endless ground engaging track that extends in a vehicle driving direction and a track operating motor constructed and arranged to move said track in driving relation to the ground;
   a pair of secondary driving and steering assemblies mounted on opposing lateral sides of said track assembly in flanking relation, each of said secondary driving and steering assemblies comprising:
   (i) a vertically movable mounting structure constructed and arranged to be moved in a generally vertical direction relative to said main frame independently of the mounting structure of the other secondary driving and steering assembly,
   (ii) a ground engaging structure movable in driving and steering relation to the ground mounted on said mounting structure such that movement of said mounting structure in the generally vertical direction moves said ground engaging structure generally vertically relative to said main frame,
   (iii) a secondary operating motor mounted to said mounting structure for generally vertical movement therewith, said secondary operating motor being constructed and arranged to move said ground engaging structure in driving and steering relation to the ground, and
   (iv) a power-operated mounting structure mover constructed and arranged to move said mounting structure in the generally vertical direction so as to move said ground engaging structure thereon generally vertically to vary an amount of ground bearing pressure said ground engaging structure applies to the ground;
   an engine assembly being constructed and arranged to supply power to each of (1) the track operating motor of the track assembly, (2) the secondary operating motors of said secondary driving and steering assemblies, and (3 said mounting structure movers of said secondary driving and steering assemblies;
   an electronic controller operable to control (1) an amount of power supplied from said engine assembly to said track operating motor, (2) an amount of power supplied from said engine assembly to one of said secondary operating motors, (3) an amount of power supplied from said engine assembly to the other of said secondary operating motors, (4) an amount of power supplied from said engine assembly to one of said mounting structure movers, and (5) an amount of power supplied from said engine assembly to the other of said mounting structure movers;
   said controller being operable to receive speed signals indicative of a selected speed at which said vehicle is to be driven and responsively control the amount of power supplied from said engine assembly to said track operating motor of said driving track assembly and said secondary operating motors so as to move said vehicle at said selected speed during said vehicle driving operation;
   a steering input device communicated to said electronic controller, said steering input device being operable to transmit a steering signal to said controller indicative of a selected angle at which said vehicle is to be turned;
   said controller being operable to process said steering input signal and responsively control (1) the respective amounts of power supplied from said engine assembly to the secondary operating motors so as to affect a vehicle steering operation wherein the movement imparted to said vehicle by one of said ground engaging structures is different than the movement imparted to said vehicle by the other of said ground engaging structures to thereby turn said vehicle at said selected angle, and (2) the respective amounts of power supplied from said engine assembly to said mounting structure movers so as to affect a ground pressure varying operation wherein the ground bearing pressure applied by and the load support carried by said ground engaging structures is increased during the vehicle steering operation to thereby decrease the ground bearing pressure applied by and the load support carried by said track assembly.

2. A vehicle according to claim 1, wherein said ground engaging structures are ground engaging rotatable wheels and wherein said controller is constructed and arranged to affect said vehicle steering operation by controlling said secondary operating motors so as to rotate one of said wheels at a different rotational speed than the other of said wheels.

3. A vehicle according to claim 2, wherein said engine assembly comprises an internal combustion engine and a hydraulic pump system operatively connected to said engine, said engine being constructed and arranged to operate said hydraulic pump system to pressurize a contained supply of hydraulic fluid;

said track operating motor being a hydraulic motor fluidly communicated with said hydraulic pump system, said track operating motor being constructed and arranged to move said track so as to affect said vehicle driving operation using pressurized fluid supplied thereto by said hydraulic pump system;

each of said secondary operating motors being a hydraulic motor fluidly communicated with said hydraulic pump system, said secondary operating motors being constructed and arranged to operate said ground engaging structures so as to affect said vehicle steering operation using pressurized fluid supplied thereto by said hydraulic pump system.

4. A vehicle according to claim 3, wherein said hydraulic pump system comprises a positive displacement hydraulic pump and two variable displacement pumps, said positive displacement pumps being fluidly communicated to said track operating motor, a first of said variable displacement pumps being fluidly communicated to a first of said secondary operating motors, and a second of said variable displacement pumps being fluidly communicated to a second of said secondary operating motors, said controller being operable to control said positive displacement hydraulic pump to control the amount of power supplied from said positive displacement hydraulic pump to said operating motor of said driving track assembly so as to move said vehicle at said selected speed during said vehicle driving operation, said controller being operable during said vehicle steering operation to individually control said first and second variable displacement hydraulic pumps to control the respective amounts of power supplied from said engine to said secondary operating motors so as to affect said vehicle steering operation by differential speeds imparted to said secondary operating motors.

5. A vehicle according to claim 4, wherein each of said mounting structures comprises an arm having a frame connecting portion pivotally mounted to said frame for pivotal movement about a horizontal transverse axis and a mounting portion on which the ground engaging structure and the secondary operating motor associated therewith is mounted.

6. A vehicle according to claim 5, wherein each of said mounting structure movers comprises a hydraulic piston and cylinder unit connected between an associated arm and said frame constructed and arranged to pivot said arm about the frame connecting portion with said arm maintaining a bottom surface of each wheel in generally parallel relation with respect to the ground.

7. A vehicle according to claim 6, wherein said arm of each mounting structure extends rearwardly generally alongside said track.

8. A vehicle according to claim 1, wherein said engine assembly comprises an internal combustion engine and a hydraulic pump system operatively connected to said engine, said engine being constructed and arranged to operate said hydraulic pump system to pressurize a supply of hydraulic fluid;

each of said mounting structure movers comprising an extendible and retractable hydraulic piston and cylinder unit fluidly communicated to said hydraulic pump system.

9. A vehicle according to claim 8, further comprising a pair of control valves constructed and arranged to fluidly control said piston and cylinder units, each of said control valves being operable to control the amount of fluid flowing from said hydraulic pump system to a respective one of said pistons and cylinder units to thereby control extension and retraction movements thereof, said electronic controller being operable during said vehicle steering operation responsively to control operation of said control valves to control the respective amounts of fluid flowing from said hydraulic pump system to said pistons and cylinder units so as to operate one or both of said pistons and cylinder units such that the ground bearing pressure applied by the ground engaging force imparting structure imparting the greater force in the vehicle driving direction to the vehicle during the vehicle driving operation is greater than the ground bearing pressure applied by the other ground engaging force imparting structure.

10. A vehicle according to claim 1, wherein said steering input device is a manually turnable steering wheel.

11. A vehicle comprising:

a main frame;

an engine assembly constructed and arranged to generate power;

a driving track assembly supporting said main frame, said driving track assembly including an endless ground engaging track, said driving track assembly being connected to said engine assembly in power supplying relation and being constructed and arranged to move said track in driving engagement with the ground using power from said engine assembly so as to move the vehicle along the ground;

a pair of secondary driving and steering assemblies mounted on opposing lateral sides of said track assembly in flanking relation, said secondary driving and steering assemblies each including a ground engaging driving and steering structure, said ground engaging driving and steering structures and said track assembly being mounted within said vehicle so as to enable said track assembly and said driving and steering structures to be moved generally vertically relative to one another to shift a distribution of vehicle weight between said driving and steering structures and said track;

said secondary driving and steering assemblies being operatively connected to said engine assembly in power supplying relation and being constructed and arranged to move said ground engaging driving and steering structures in driving engagement with the ground using power from said engine assembly so as to assist said track assembly in moving the vehicle along the ground;

power-operated structure operatively connected to said engine assembly in power supplying relation, said power-operated structure being constructed and arranged to affect the generally vertical relative movement between said driving and steering structures and said track assembly using power from said engine assembly to shift said distribution of the vehicle weight;

an electronic controller communicated to said power-operated structure and each of said secondary driving and steering assemblies;

a steering input device communicated to said electronic controller, said steering input device being operable to transmit a steering signal to said controller indicative of a selected angle at which said vehicle is to be steered;

said controller being operable to process said steering input signal and responsively control said secondary driving and steering assemblies and said power-operated structure to affect a vehicle steering operation wherein (1) said power-operated structure affects the generally vertical relative movement between said track assembly and said driving and steering structures so as to shift the distribution of vehicle weight from said track to said driving and steering structures, thereby providing said driving and steering structures with increased traction during movement thereof in driving engagement with the ground, and (2) said secondary driving assemblies move said driving and steering structures in driving engagement with the ground to thereby steer said vehicle at said selected angle.

12. A vehicle according to claim 11, wherein said ground engaging driving structures are ground engaging wheels rotatably mounted on said secondary driving and steering assemblies.

13. A vehicle according to claim 12, wherein said power-operated structure is operatively connected between said wheels and said frame and wherein said track assembly is fixed with respect to said frame, said controller being operable to control said power-operated structure during said vehicle steering operation such that said power-operated moving structure moves said wheels generally downwardly with respect to said track assembly so as to shift the distribution of vehicle weight from said track to said wheels.

14. A vehicle according to claim 13, wherein each of said secondary driving and steering assemblies includes (a) a vertically movable mounting structure having an associated one of said ground engaging wheels rotatably mounted thereto, each mounting structure being constructed and arranged to be moved in a generally vertical direction relative to said main frame independently of the mounting structure of the other secondary driving and steering assembly to provide for the generally vertical movement of said wheels relative to said track assembly, and (b) a wheel operating motor mounted to said mounting structure for generally vertical movement therewith, said wheel operating motors being connected to said engine assembly in power supplying relation and being constructed and arranged to rotate said wheels in driving engagement with the ground using power from said engine assembly.

15. A vehicle according to claim 14, wherein said engine assembly comprises an internal combustion engine and a hydraulic pump system operatively connected to said engine, said engine being constructed and arranged to operate said hydraulic pump system to pressurize a contained supply of hydraulic fluid;

said track assembly including a hydraulic track operating motor fluidly communicated with said hydraulic pump system, said track operating motor being constructed and arranged to move said track in driving engagement with the ground using pressurized fluid supplied thereto by said hydraulic pump system;

each of said wheel operating motors of said secondary driving and steering assemblies being a hydraulic motor fluidly communicated with said hydraulic pump system, said wheel operating motors being constructed and arranged to rotate said wheel in driving engagement with the ground using pressurized fluid supplied thereto by said hydraulic pump system.

16. A vehicle according to claim 15, wherein said hydraulic pump system comprises a positive displacement hydraulic pump and two variable displacement pumps, said positive displacement pumps being fluidly communicated to said track operating motor, a first of said variable displacement pumps being fluidly communicated to a first of said wheel operating motors, and a second of said variable displacement pumps being fluidly communicated to a second of said wheel operating motors, said controller being operable to control said positive displacement hydraulic pump to control the amount of power supplied from said positive displacement hydraulic pump to said operating motor of said driving track assembly, said controller being operable during said vehicle steering operation to individually control said first and second variable displacement hydraulic pumps to control the respective amounts of power supplied from said engine to said secondary operating motors so as to affect said vehicle steering operation by differential speeds imparted to said secondary operating motors.

17. A vehicle according to claim 14, wherein each of said mounting structures comprises an arm having a frame connecting portion pivotally mounted to said frame for pivotal movement about a horizontal transverse axis and a mounting portion on which the wheel and the secondary operating motor associated therewith is mounted.

18. A vehicle according to claim 17, wherein said power-operated structure comprises a pair of hydraulic piston and cylinder units, each of said piston and cylinder units being connected between an associated arm and said frame and being constructed and arranged to pivot said arm about the frame connecting portion with said arm maintaining a bottom surface of its associated wheel in generally parallel relation with respect to the ground.

19. A vehicle according to claim 18, wherein said arm of each mounting structure extends rearwardly generally alongside said track.

20. A vehicle according to claim 19, further comprising a pair of control valves constructed and arranged to fluidly control said piston and cylinder units, each of said control valves being operable to control the amount of fluid flowing from said hydraulic pump system to a respective one of said pistons and cylinder units to thereby control extension and retraction movements thereof, said electronic controller being operable during said vehicle steering operation responsively to control operation of said control valves to control the respective amounts of fluid flowing from said hydraulic pump system to said pistons and cylinder units so as to operate one or both of said pistons and cylinder units to shift the distribution of vehicle weight shifted from said track to said driving and steering structures.

21. A vehicle according to claim 11, wherein said engine assembly comprises an internal combustion engine and a hydraulic pump system operatively connected to said engine, said engine being constructed and arranged to operate said hydraulic pump system to pressurize a contained supply of hydraulic fluid;

said power-operated structure comprising a hydraulic piston and cylinder system constructed and arranged to be extended and retracted to affect the generally vertical relative movement between said driving and steering structures and said track assembly.

22. A vehicle according to claim 21, wherein each of said secondary driving and steering assemblies includes (a) a vertically movable mounting structure having an associated one of said ground engaging wheels rotatably mounted thereto, each mounting structure being constructed and arranged to be moved in a generally vertical direction relative to said main frame independently of the mounting structure of the other secondary driving and steering assembly to provide for the generally vertical movement of said wheels relative to said track assembly, and (b) a wheel operating motor mounted to said mounting structure for generally vertical movement therewith, said wheel operating motors being connected to said engine assembly in power supplying relation and being constructed and arranged to rotate said wheels in driving engagement with the ground using power from said engine assembly.

23. A vehicle according to claim 22, wherein said hydraulic piston and cylinder system comprises a pair of hydraulic piston and cylinder units, each of said piston and cylinder units being connected between an associated arm and said frame and constructed and arranged to pivot said arm about the frame connecting portion with said arm maintaining a bottom surface of its associated wheel in generally parallel relation with respect to the ground.

24. A vehicle according to claim 11, wherein said power-operated structure is constructed and arranged to affect the generally vertical relative movement between said driving and steering structures and said track assembly to an extent sufficient to lift a substantial portion of said track assembly out of ground contact about a longitudinal end portion thereof during vehicle steering operation to thereby distribute the weight of said vehicle over three spaced supporting points including said longitudinal end portion of said track and each of said driving and steering structures, and wherein in response to said steering input signal said controller is operable during said vehicle steering operation to affect the generally vertical relative movement between said driving and steering structures and said track assembly to an extent sufficient to lift said substantial portion of said track assembly out of ground contact about the longitudinal end portion thereof.

25. A vehicle according to claim 24, wherein said longitudinal end portion of said track assembly is a rear end portion of said track assembly.

26. A vehicle according to claim 24, wherein said driving and steering structures are ground engaging wheels rotatably mounted on said secondary driving and steering assemblies.

27. A vehicle according to claim 11, wherein said axle assembly comprises a single axle extending transversely of said frame.

28. A vehicle according to claim 11, wherein said power-operated structure is communicated to a supply of pressurized fluid and is constructed and arranged to affect said generally vertical relative movement between said driving and steering structures and said track assembly using said pressurized fluid.

29. A vehicle according to claim 28, wherein said supply of pressurized fluid is a supply of pressurized hydraulic liquid and wherein said power-operated structure includes hydraulic cylinders operatively connected to said driving and steering structures.

30. A vehicle according to claim 29, wherein said engine assembly includes a hydraulic pump constructed and arranged to pressurize said supply of pressurized liquid.

31. A vehicle according to claim 28, wherein said supply of pressurized fluid is a supply of pressurized air and wherein said power-operated structure includes an air bag operatively connected to said wheels.

32. A vehicle according to claim 11, wherein said driving and steering structures are pivotally mounted to said frame for pivotal steering movement about a pair of generally vertical axes and wherein during said vehicle steering operation said controller is operable to pivot said driving and steering structures about said generally vertical axes so as to cause said driving and steering structures to move in driving engagement with the ground to steer said vehicle at said selected angle.

33. A vehicle according to claim 11, wherein said controller is a programmable logic controller.

34. A vehicle according to claim 11, wherein said steering input device is a remote control.

35. A vehicle according to claim 11, wherein said steering input device is carried on said frame and is manually operated by an occupant of said vehicle.

36. A vehicle according to claim 35, wherein said steering input device comprises a potentiometer operable to generate said steering signal responsive to manual operation of said steering input device.

37. A vehicle according to claim 36, wherein said potentiometer is a rotary potentiometer and wherein said steering input device comprises a steering wheel operatively connected to said rotary potentiometer such that rotational turning of said steering wheel responsively causes said potentiometer to generate said steering input signal.

38. A vehicle according to claim 11, wherein said driving and steering structures are oriented in generally the same direction as said endless track and wherein during said vehicle steering operation said controller is operable to control respective amounts of power flowing from said engine assembly to said secondary driving and steering assemblies such that said driving and steering structures are moved in driving engagement with the ground to impart different forces to the vehicle to thereby turn said vehicle at said selected angle.

39. A vehicle according to claim 38, wherein said driving and steering structures are rotatable wheels and wherein during said vehicle steering operation said controller is operable to control the respective amounts of power flowing from said engine assembly to said secondary driving and steering assemblies such that said wheels are rotated at different speeds in driving engagement with the ground to thereby turn said vehicle at said selected angle.

40. A vehicle according to claim 39, wherein during said vehicle steering operation said controller controls the respective amounts of power flowing from said engine assembly to said secondary driving and steering assemblies such that both of said wheels are rotated in driving engagement with the ground.

41. A vehicle according to claim 39, wherein during said vehicle steering operation said controller controls the respective amounts of power flowing from said engine assembly to said secondary driving and steering assemblies such that only one of said wheels is rotated in driving engagement with the ground and the other of said wheels is allowed to rotate in a freewheeling manner.

* * * * *